US012715941B2

(12) United States Patent
Yin et al.

(10) Patent No.: US 12,715,941 B2
(45) Date of Patent: Aug. 25, 2026

(54) METALLOCENE COMPOUND, AND PREPARATION METHOD THEREFOR AND APPLICATION THEREOF

(71) Applicants: CHINA PETROLEUM & CHEMICAL CORPORATION, Beijing (CN); SHANGHAI RESEARCH INSTITUTE OF CHEMICAL INDUSTRY CO. LTD., Shanghai (CN); XIAMEN UNIVERSITY, Xiamen (CN)

(72) Inventors: Zhaolin Yin, Maoming (CN); Yuanhong Mao, Maoming (CN); Yucai Cao, Shanghai (CN); Shengbiao Liang, Maoming (CN); Hongping Zhu, Xiamen (CN); Xiaofeng Ye, Shanghai (CN); Chen Ni, Shanghai (CN); Zhikang Chen, Xiamen (CN); Dongwen Zhong, Maoming (CN); Sha Song, Maoming (CN); Wenjun Jiang, Maoming (CN); Zhenyu Liu, Maoming (CN)

(73) Assignees: CHINA PETROLEUM & CHEMICAL CORPORATION, Beijing (CN); SHANGHAI RESEARCH INSTITUTE OF CHEMICAL INDUSTRY CO. LTD., Shanghai (CN); XIAMEN UNIVERSITY, Xiamen (CN)

( * ) Notice: Subject to any disclaimer, the term of this patent is extended or adjusted under 35 U.S.C. 154(b) by 979 days.

(21) Appl. No.: 17/755,538

(22) PCT Filed: Oct. 30, 2020

(86) PCT No.: PCT/CN2020/125121

§ 371 (c)(1),
(2) Date: Apr. 30, 2022

(87) PCT Pub. No.: WO2021/083309

PCT Pub. Date: May 6, 2021

(65) Prior Publication Data

US 2022/0389133 A1 Dec. 8, 2022

(30) Foreign Application Priority Data

Oct. 30, 2019 (CN) ......................... 201911046672.5
Oct. 30, 2019 (CN) ......................... 201911047955.1

(51) Int. Cl.
*C08F 110/06* (2006.01)
*C07F 17/02* (2006.01)

(52) U.S. Cl.
CPC ............ *C08F 110/06* (2013.01); *C07F 17/02* (2013.01)

(58) Field of Classification Search
None
See application file for complete search history.

(56) References Cited

U.S. PATENT DOCUMENTS 5,017,714 A 5/1991 Welborn, Jr.
5,120,867 A 6/1992 Welborn, Jr.
5,145,819 A 9/1992 Winter et al.
5,239,022 A 8/1993 Winter et al.
5,243,011 A 9/1993 Panandiker et al.
5,276,208 A 1/1994 Winter et al.
5,350,817 A 9/1994 Winter et al.
5,374,752 A 12/1994 Winter et al.
5,380,821 A 1/1995 Dournel et al.
5,391,790 A 2/1995 Rohrmann et al.
5,483,002 A 1/1996 Seelert et al.
5,616,747 A 4/1997 Rohrmann et al.
5,672,668 A 9/1997 Winter et al.
5,714,427 A 2/1998 Winter et al.
5,739,366 A 4/1998 Imuta et al.
5,741,868 A 4/1998 Winter et al.
5,770,753 A 6/1998 Kueber et al.
5,786,432 A 7/1998 Kueber et al.
5,840,644 A 11/1998 Kueber et al.
5,840,948 A 11/1998 Rohrmann et al.
5,852,142 A 12/1998 Rohrmann et al.
5,929,264 A 7/1999 Rohrmann et al.
5,932,669 A 8/1999 Rohrmann et al.

(Continued)

FOREIGN PATENT DOCUMENTS

CN 1339507 A 3/2002
CN 101157742 A 4/2008

(Continued)

OTHER PUBLICATIONS

Coates, Geoffrey W.; "Precise Control of Polyolefin Stereochemistry Using Single-Site Metal Catalysts"; Chem. Rev.; vol. 100; Year: 2000; pp. 1223-1252.

(Continued)

*Primary Examiner* — Fred M Teskin
(74) *Attorney, Agent, or Firm* — NKL Law; Allen Xue

(57) ABSTRACT

A metallocene compound having a structure shown by formula (I). A functional group connected to a bridging atom of the metallocene compound is an amine-substituted group and/or a metallocene-substituted group and/or a substituted metallocene group. A metallocene catalyst containing the metallocene compound has high catalytic activity, and can synthesize metallocene polypropylene having high isotacticity.

$$R^{I}R^{II}Z(Cp^{III})_{n}(E)_{2-n}ML^{IV}L^{V} \quad (I)$$

31 Claims, No Drawings

(56) References Cited

U.S. PATENT DOCUMENTS

| | | | |
|---|---|---|---|
| 6,051,522 | A | 4/2000 | Rohrmann et al. |
| 6,051,727 | A | 4/2000 | Kueber et al. |
| 6,057,408 | A | 5/2000 | Winter et al. |
| 6,087,291 | A | 7/2000 | Speca et al. |
| 6,114,479 | A | 9/2000 | Speca et al. |
| 6,124,230 | A | 9/2000 | Speca et al. |
| 6,218,558 | B1 | 4/2001 | Kato et al. |
| 6,228,795 | B1 | 5/2001 | Vizzini |
| 6,239,299 | B1 * | 5/2001 | Schottenberger ....... C08F 10/00 556/11 |
| 6,242,544 | B1 | 6/2001 | Kueber et al. |
| 6,252,097 | B1 | 6/2001 | Sugano et al. |
| 6,255,506 | B1 | 7/2001 | Kueber et al. |
| 6,255,515 | B1 | 7/2001 | Kato et al. |
| 6,288,254 | B1 | 9/2001 | Chen et al. |
| 6,376,407 | B1 | 4/2002 | Burkhardt et al. |
| 6,376,408 | B1 | 4/2002 | Burkhardt et al. |
| 6,376,409 | B1 | 4/2002 | Burkhardt et al. |
| 6,376,410 | B1 | 4/2002 | Burkhardt et al. |
| 6,376,411 | B1 | 4/2002 | Burkhardt et al. |
| 6,376,412 | B1 | 4/2002 | Burkhardt et al. |
| 6,376,413 | B1 | 4/2002 | Kuchta et al. |
| 6,376,627 | B1 | 4/2002 | Burkhardt et al. |
| 6,380,120 | B1 | 4/2002 | Burkhardt et al. |
| 6,380,121 | B1 | 4/2002 | Kuchta et al. |
| 6,380,122 | B1 | 4/2002 | Kuchta et al. |
| 6,380,123 | B1 | 4/2002 | Kuchta et al. |
| 6,380,124 | B1 | 4/2002 | Burkhardt et al. |
| 6,380,130 | B1 | 4/2002 | Meyer et al. |
| 6,380,134 | B1 | 4/2002 | Kunz et al. |
| 6,444,606 | B1 | 9/2002 | Bingel et al. |
| 7,342,078 | B2 | 3/2008 | Schottek et al. |
| 11,358,979 | B2 * | 6/2022 | Cheong .................. C07F 17/00 |
| 2001/0002175 | A1 | 5/2001 | Ooishi et al. |
| 2003/0008802 | A1 | 1/2003 | Hokkirigawa et al. |
| 2003/0014919 | A1 | 1/2003 | Diaz-Lopez |
| 2006/0011649 | A1 | 1/2006 | Erdman et al. |
| 2006/0025263 | A1 | 2/2006 | Sowul et al. |

FOREIGN PATENT DOCUMENTS

| | | | |
|---|---|---|---|
| CN | 108752509 | A | 11/2018 |
| EP | 3715382 | A1 | 9/2020 |
| JP | H07268014 | A | 10/1995 |
| JP | 2000313713 | A | 11/2000 |
| JP | 2001519436 | A | 10/2001 |
| JP | 2005503444 | A | 2/2005 |
| JP | 2008222899 | A | 9/2008 |
| JP | 2010280590 | A | 12/2010 |
| JP | 2019059723 | A | 4/2019 |
| JP | 2019059732 | A | 4/2019 |
| KR | 20190078516 | A | 7/2019 |
| WO | 9506071 | A1 | 3/1995 |

OTHER PUBLICATIONS

Wild, Ferdinand R.W.P. et al.; "Synthesis and Molecular Structures of Chiral ansa-Titanocene Derivatives With Bridged Tetrahydroindenyl Ligands"; Journal of Organometallic Chemistry; vol. 232; Year: 1982; pp. 233-247.

Wild, Ferdinand R.W.P. et al.; "ansa-Metallocene Derivatives : Vii. Synthesis and Crystal Structure of a Chiral ansa-Zirconocene Derivative With Ethylene-bridged Tetrahydroindenyl Ligands"; Journal of Organometallic Chemistry; vol. 288; Year. 1985; pp. 63-67.

Kaminsky, Walter et al.; "Polymerization of Propene and Butene with a Chiral Zirconocene an Methylalumoxane as Cocatalyst"; Angew. Chem. Int. Ed. Engl.; vol. 24, No. 6; Year: 1985; pp. 507-508.

Herrmann, Wolfgang A. et al.; "The First Example of an Ethylene-Selective Soluble Ziegler Catalyst of the Zirconocene Class"; Angew. Chem. Int. Ed. Engl.; vol. 28, No. 11; Year: 1989; pp. 1511-1512.

Spaleck,Walter et al.; "High Molecular Weight Polypropylene through Specifically Designed Zirconocene Catalysts"; Angew. Chem. Int. Ed. Engl.; vol. 31, No. 10; Year: 1992; pp. 1347-1350.

Resconi, Luigi et al.; "Selectivity in Propene Polymerization with Metallocene Catalysts"; Chemical Reviews; vol. 100, No. 4; Mar. 25, 2000; pp. 1253-1345.

Tian, Jun et al.; "Synthesis of and Olefin Polymerization Using Tethered, ansa-Metallocene Complexes"; Macromolecules; vol. 34, No. 10; Apr. 7, 2001; pp. 3120-3122.

* cited by examiner

METALLOCENE COMPOUND, AND PREPARATION METHOD THEREFOR AND APPLICATION THEREOF

CROSS-REFERENCE TO RELATED APPLICATIONS

This application is a U.S. national stage entry of PCT international application no. PCT/CN2020/125121, filed Oct. 30, 2020, which claims the priorities of the following patent applications filed on Oct. 30, 2019:

1. Chinese patent application CN201911047955.1, entitled "Transition metal catalyst with unsymmetrically bridged two indenyl groups, preparation method and use thereof"; and
2. Chinese patent application CN201911046672.5, entitled "Silicon bridged metallocene compound, preparation method, and use thereof", the content of which are incorporated herein by reference in their entireties.

FIELD OF TECHNOLOGY

The present disclosure is directed to a metallocene compound, preparation method and application thereof, and in particular to a metallocene catalyst containing the metallocene compound, preparation method and use of the catalyst. Specifically, the present disclosure is related to the technical field of metallocene catalysts.

BACKGROUND

Metallocene polypropylene (mPP) has good utility in fibers, injection molding and films, and thus the market demand thereof increases in recent years. These resin articles have high requirements on the stereoregular structure of polypropylene, and while the structure of polypropylene is adjusted and controlled by the structure of the catalyst.

Metallocene polypropylene with high isotactic structure is an important resin. Such metallocene polypropylene is synthesized by controlling the growth of the propylene chain through the stereo enantiomorphic site of the catalyst. The catalyst capable of controlling chain extension reaction through the stereo enantiomorphic site is required to have a C2 axis or a lower C1 axis symmetry (Chem. Rev. 2000, 100, 1223). The compounds of Group IV metals such as titanium, zirconium, or hafnium, and bridged diindene ring with racemic structure or derivatives thereof are with this characteristic. In the 1980s, Brintzinger team synthesized an ethyl diindene ligand with a racemic structure and the later ethyl bis(tetrahydroindene) ligand with a racemic structure (J. Organomet. Chem. 1982, 232, 233; 1985, 288, 63). The synthesized titanium and zirconium compounds catalyze propylene to form polypropylene with high isotactic structure under the action of a methylaluminoxane (MAO) additive, whereas the catalyst with meso structure cannot catalyze propylene to produce polypropylene with high isotacticity. The activity of these racemic catalysts, and the molecular weight and the isotacticity of the products are very sensitive to temperatures. In the range of from −20° C. to 60° C., the difference between the highest activity (84.43 kg PP/g Zr·h) and the lowest activity (0.88 kg PP)/g Zr·h) is nearly two orders of magnitude, the difference between the highest average molecular weight (300,000 Dalton) and the lowest one (12,000 Dalton) reached 25 times, whereas the molecular weight distribution of the polymer does not vary very much, which is in the range of from 1.9 to 2.6, and the isotacticity [mmmm] varies within the scope of 86.0-91.0 (Angew. Chem. Int. Ed. Engl. 1985, 24, 507). In 1989, Herrmann et al. synthesized racemic, silicon-based bridged indene zirconium compounds. Subsequently, Spaleck and Herrmann et al. modified the indene ring with substituents. The polypropylene catalytically produced at a higher temperature and under the action of MAO, reaches or almost reaches the industrial application level in terms of reactivity, molecular weight, molecular weight distribution and isotacticity (up to 98%, m.p. 152° C.) (Angew. Chem. Int. Ed. Engl. 1989, 28, 1511; 1992, 31, 1348). Since then, a series of Group IV metallocene catalysts of bridged biindene ring type and its derivative systems have been successively developed and used in isotactic and catalytic polymerization of propylene (Chem. Rev. 2000, 100, 1253).

Although the reaction conditions such as temperatures, pressures, times, and catalyst concentrations, solvents, auxiliary agents, impurity removal agents, hydrogen molecular regulators and other factors have great influence on the catalytic reaction for generating high isotactic polypropylene, the adjusting and controlling functions of the stereo enantiomorphic site of the racemic structure play an essential and decisive role. These structural features are mainly reflected in five aspects: an indene ring, a substituent on the indene ring, a bridging group, a central metal, and the group which is bonded to the central metal and can initiate chain growth. Those skilled in the art are well aware of the fact that any innovation in one of these five aspects would make the disclosure patentable.

The disclosure in this application mainly focuses on the important role of bridging groups. The bridging group S' is referred to as a silicon-containing bridge of 1-4 atoms selected from silanylene, silaalkylene, oxasilanylene, and oxasilaalkylene in the early U.S. Pat. Nos. 5,017,714 and 5,120,867. Subsequently, the U.S. Pat. No. 5,145,819 provides a broad definition and patent protection for the bridging structure group-$(CR^8R^9)_m$—$R^7$—$(CR^8R^9)_n$—, wherein $R^7$ is designated as -$M^2(R^{11})(R^{12})$—, -$M^2(R^{11})(R^{12})$-$M^2(R^{11})(R^2)$—, -$M^2(R^{11})(R^2)$—$(CR_2{}^{13})$—, —O-$M^2(R^{11})(R^{12})$—O—, —$C(R^{11})(R^{12})$—, —O-$M^2(R^{11})(R^{12})$—, =$BR^{11}$, =$AlR^{11}$, —Ge—, —Sn—, —O—, —S—, =SO, =$SO_2$, =$NR^{11}$, =CO, =$PR^{11}$ or =$P(O)R^{11}$, wherein $R^{11}$, $R^{12}$, $R^{13}$ can be identical or different and can be hydrogen, halogen atoms, a $C_1$-$C_{10}$ alkyl, $C_1$-$C_{10}$ fluoroalkyl, a $C_6$-$C_{10}$ aryl, a $C_6$-$C_{10}$ fluoroaryl, a $C_1$-$C_{10}$ alkoxy, a $C_2$-$C_{10}$ alkenyl group, a $C_7$-$C_{40}$ arylalkyl group, $R^{11}$ and $R^{12}$ as well as $R^{11}$ and $R^{13}$ are connected with each other through atoms and form a ring; $M^2$ is Si, Ge, or Sn; $R^8$ and $R^9$ can be identical or different and are defined in the same way as $R^{11}$; m and n can be identical or different and are 0, 1, or 2, or m+n is 0, 1, or 2. In these definitions, $R^7$ is preferably designated as —$C(R^{11})(R^{12})$—, —$Si(R^{11})(R^{12})$—, —$Ge(R^{11})(R^{12})$—, —O—, —S—, =SO, =$PR^{11}$ or =$P(O)R^{11}$. Based on the disclosure the above, U.S. Pat. No. 5,239,022 further defines that alkyl refers to linear or branched alkyl, and halogen atom refers to fluorine, chlorine, bromine, and iodine. U.S. Pat. No. 5,239,022 also gives preferable designations to $R^{11}$, $R^{12}$ and $R^{13}$ groups. For details, please refer to the original disclosure. The definitions of bridging groups in U.S. Pat. Nos. 5,243,011, 5,276,208, 5,350,817, 5,374,752, 5,483,002, 5,672,668, 5,714,427, 5,741,868, 6,087,291, 6,114,479, 6,124,230, 6,228,795B1, and US2003/0088022A1 are similar to the above. In U.S. Pat. No. 5,770,753, the bridging group is directly defined as $R^3$, which specially includes the following: -$M^2(R^{14})(R^{15})$—, -$M^2(R^{14})(R^{15})$-$M^2(R^{14})(R^{15})$—, —$C(R^{14})(R^{15})$—$C(R^{14})(R^{15})$—, —O-$M^2(R^{14})$ $(R^{15})$—O—, —$C(R^{14})(R^{15})$—, —O-$M^2(R^{14})(R^{15})$—, —$C(R^{14})(R^{15})$-$M^2(R^{14}R^{15})$—, —$C(R^{14})(R^{15})$—$C(R^{14}R^{15})$—$C(R^{14})(R^{15})$—, =$BR^{14}$, =$AlR^{14}$, —Ge—, —O—, —S—, =SO, =$SO_2$, =$NR^{14}$, =CO, =$PR^{14}$, or =$P(O)R^{14}$, wherein $R^{14}$ and $R^{15}$ can be identical or different, and can be hydrogen, halogen atoms, $C_1$-$C_{10}$ alkyl, $C_1$-$C_{10}$ fluoroalkyl, $C_1$-$C_{10}$ alkoxy, $C_6$-$C_{10}$ aryl, $C_6$-$C_{10}$ fluoroaryl, $C_6$-$C_{10}$ phenolic group, $C_2$-$C_{10}$ alkenyl, $C_7$-$C_{40}$ arylalkyl, $C_7$-$C_{40}$ alkylaryl, $C_8$-$C_{40}$ arylalkenyl, or $R^{14}$ and $R^{15}$ are connected each other through atom(s) and form one or more rings; $M^2$ is Si, Ge, or Sn. Subsequent patents, U.S. Pat. Nos. 5,786,432, 5,380,821, 5,840,644, 5,840,948, 5,852,142, 5,929,264, 5,932,669, 6,051,522, U.S. 60/517,272, U.S. Pat. Nos. 6,057,408, 6,242,544B1, 6,255,506B1, 6,376,407B1, U.S. 63/764,408B1, U.S. 63/764,409B1, U.S. 63/764,410B1, U.S. 63/764,411B1, U.S. 63/764,412B1, US2001/0021755A1, US2006/016490A1, and US2006/0252637A1 all refer to similar or substantially the same bridging group structures. In U.S. 63/764,413B1, the bridging group is defined as biphenyl $M^2(C_6R^{17}R^{18}R^{19}R^{20}$—$C_6R^{21}R^{22}R^{23}R^{24})$—, and the overall definitions of $R^{17}$ to $R^{24}$ are designated as $R^1$ and $R^2$, or two or more adjacent radicals $R^{17}$ to $R^{24}$, including $R^{20}$ and $R^{21}$, are connected each other through atoms and form one or more rings, and $R^{17}$ to $R^{24}$ are preferably H. $R^1$ and $R^2$ can be the same or different. They are one of H, $C_1$-$C_{10}$ alkyl, $C_1$-$C_{10}$ alkoxy, $C_6$-$C_{10}$ aryl, $C_6$-$C_{10}$ phenol, $C_2$-$C_{10}$ alkenyl, $C_7$-$C_{40}$ arylalkyl, $C_2$-$C_{40}$ alkylaryl, $C_8$-$C_{40}$ arylalkenyl, OH, a halogen atom, or conjugated diene (randomly substituted with one or more hydrocarbyl groups), three-carbon hydrogen silicon group or three-carbon hydrogen group, three-carbon hydrogen silicon substituted hydrocarbyl group (wherein the number of non-hydrogen atoms is up to 30). Such patents include U.S. Pat. Nos. 5,616,747, 6,376,627B1, 6,380,120B1, 6,380,121B1, 6,380,122B1, 6,380,123B1, 6,380,124B1, 6,380,130B1, 6,380,130B1, 6,380,134B1, etc. U.S. Pat. Nos. 5,391,790 and 5,616,747 directly indicate the bridging group with —$R^6$—, which is defined as -$[M^2(R^8)(R^9)]_p$—, wherein $M^2$ is C, Si, Ge, or Sn; $R^8$ and $R^9$ can be the same or different, and are designated as H, $C_1$-$C_{20}$ alkyl, $C_6$-$C_{14}$ aryl, $C_1$-$C_{10}$ alkoxy, $C_2$-$C_{10}$ alkenyl, $C_7$-$C_{20}$ arylalkyl, $C_7$-$C_{20}$ alkylaryl, $C_6$-$C_{10}$ phenol, $C_1$-$C_{10}$ fluoroalkyl, $C_6$-$C_{10}$ haloaryl, $C_2$-$C_{10}$ alkynyl, —$SiR^7_3$, halogen, or five-membered or six-membered heteroaromatic radical (containing one or more heteroatoms), and are connected by atom(s) to form one or more rings; p is 1, 2, or 3. U.S. Pat. No. 5,739,366 defines bridging group Y, which is designated as divalent $C_1$-$C_{20}$ hydrocarbyl groups, divalent $C_1$-$C_{20}$ halogenated hydrocarbyl groups, divalent silicon-containing groups, divalent germanium-containing groups, and divalent tin-containing groups, —O—, —CO—, —S—, —SO—, —$SO_2$—, —$NR^5$—, —$P(R^5)$—, —$P(O)(R^5)$—, —$BR^5$— or —$AlR^5$— ($R^5$ is H, a halogen atom, $C_1$-$C_{20}$ hydrocarbyl group, divalent $C_1$-$C_{20}$ halogenated hydrocarbyl group). In U.S. Pat. Nos. 6,218,558, 6,252,097B1 and 6,255,515B1 submitted by Japan Polymer Chemical Company, the benzene ring in the indene ring is expanded to a seven-membered ring, and the corresponding bridging group Q is defined as a divalent $C_1$-$C_{20}$ hydrocarbyl group, a divalent $C_1$-$C_{20}$ halogenated group, a silylene containing a $C_1$-$C_{20}$ hydrocarbyl group or a $C_1$-$C_{20}$ halogenated hydrocarbyl group, an oligosilylenyl group containing a $C_1$-$C_{20}$ hydrocarbyl group or a $C_1$-$C_{20}$ halogenated hydrocarbyl group, or a germanenyl group containing a $C_1$-$C_{20}$ hydrocarbyl group or a $C_1$-$C_{20}$ halogenated hydrocarbyl group, and connects with two five-membered rings. In U.S. Pat. Nos. 6,444,606B1, 7,342,078B2 and US2003/0149199A1, the bridging group $R^9$ is defined as —O-$M^2(R^{10})(R^{11})$—O—, —$C(R^{10})(R^{11})$—, —O-$M^2(R^{10})(R^{11})$—, —$C(R^{10})(R^{11})$-$M^2(R^{10}R^{11})$—, -$M^2(R^{10})(R^{11})$—, -$M^2(R^{10})(R^{11})$-$M^2(R^{10})(R^{11})$—, —$C(R^{10})(R^{11})$—$C(R^{10})(R^{11})$—, -$M^2(R^{10})(R^{11})$—$[C(R^{10}R^{11})]_x$-$M^2(R^{10})(R^{11})$—, —$C(R^{10})(R^{11})$—$C(R^{10}R^{11})$—$C(R^{10})(R^{11})$—, >$BR^{10}$, >$AlR^{10}$, —Ga—, —O—, —S—, >SO, >$SO_2$, >$NR^{10}$, >CO, >$PR^{10}$, >$P(O)R^{10}$ or >$R(O)R^{10}$, wherein $R^{10}$ and $R^{11}$ can be the same or different and are hydrogen, a halogen atom, or $C_1$-$C_{40}$ group, such as $C_1$-$C_{20}$ alkyl, $C_1$-$C_{10}$ fluoroalkyl, $C_1$-$C_{10}$ alkoxy, $C_6$-$C_1$ aryl, $C_6$-$C_{10}$ fluoroaryl, $C_6$-$C_{10}$ phenol, $C_2$-$C_{10}$ alkenyl, $C_7$-$C_{40}$ arylalkyl, $C_7$-$C_{40}$ alkylaryl, $C_8$-$C_{40}$ arylalkenyl, or $R^{10}$ and $R^{11}$ are connected each other through atom(s) and form one or more rings, and $M^2$ is Si, Ge, or Sn.

The bridging group connects with two cyclopentadienyl groups, indenyl groups or fluorenyl groups. That is, the two groups are sterically defined. This bridging enhances the rigidity of the ligand structure and plays an important role in the formation of racemic structure characteristic of catalysts. The catalyst with the racemic structure can adjust and control the chain growth of the stereo enantiomorphic sites of propylene well and then produce metallocene polypropylene with high isotacticity.

Although many bridged metallocene catalysts have been reported, not many of them have industrial applications or application prospects. Because industrial applications have high requirements on the isotacticity of metallocene polypropylene. For example, the metallocene polypropylene produced by some companies, can only be used in resin products when its isotacticity [mmmm] is greater than 97%. China's polypropylene products are generally produced by using traditional Natta type catalysts. Some of these catalysts are added with simple metallocene compound components. There are nearly no reports on complete use of metallocene compounds as catalysts because of theoretical and technical difficulties in this regard.

China's polypropylene products are basically produced by using traditional supported Ziegler-Natta catalysts. There are few reports on the use of bridged two-group metallocene catalysts to control the production of polypropylene with high isotacticity because there are still technical difficulties in this regard.

SUMMARY

A first technical problem to be solved by the present disclosure is that the metallocene catalyst in the prior art has the technical problem that the activity is not high enough, to provide a new metallocene compound, wherein the group connecting to the bridge atom of the metallocene compound is a group substituted by an amino group, and/or a group substituted by a metallocene group and/or a substituted metallocene group. The special structure endows a high catalytic activity for the metallocene catalyst containing the metallocene compound; furthermore, with the metallocene catalyst, a high-regularity metallocene polypropylene can be synthesized.

A second technical problem to be solved by the present disclosure is to provide a preparation method of the metallocene compound for solving the first technical problem.

A third technical problem to be solved by the present disclosure is to provide a metallocene catalyst adopting the metallocene compound for solving the first technical problem.

A fourth technical problem to be solved by the present disclosure is to provide a preparation method of the catalyst for solving the third technical problem above.

A fifth technical problem to be solved by the present disclosure is to provide use of the metallocene compound the first technical problem above or the catalyst for solving the third technical problem.

In order to solve the first technical problem above, the present disclosure adopts a technical solution as follows.

Provided is a metallocene compound, having a structure as shown in formula (I):

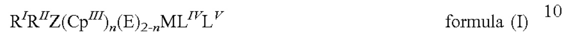

$R^I R^{II} Z(Cp^{III})_n(E)_{2-n} ML^{IV} L^V$ formula (I)

wherein in formula (I), $R^1$ and $R^{11}$ are the same or different, and at least one of $R^I$ and $R^{II}$ is selected from amino-substituted $C_1$-$C_{20}$ hydrocarbyl, amino-substituted $C_1$-$C_{20}$ halohydrocarbyl, amino-substituted $C_1$-$C_{20}$ alkoxy and amino-substituted $C_6$-$C_{20}$ phenolic group; and/or at least one of $R^I$ and $R^{II}$ is selected from metallocene group-substituted $C_1$-$C_{20}$ hydrocarbyl, metallocene group-substituted $C_1$-$C_{20}$ halohydrocarbyl, metallocene group-substituted $C_1$-$C_{20}$ alkoxy, and metallocene group-substituted $C_6$-$C_{20}$ phenolic group; and/or at least one of $R^I$ and $R^{II}$ is selected from metallocene groups substituted by $C_1$-$C_{20}$ hydrocarbyl, $C_1$-$C_{20}$ halohydrocarbyl, $C_1$-$C_{20}$ alkoxy or $C_6$-$C_{20}$ phenolic group;

Z is selected from carbon, silicon, germanium, and tin;

$Cp^{III}$ is cyclopentadienyl containing or not containing a substituent, indenyl containing or not containing a substituent, or fluorenyl containing or not containing a substituent, as shown in formula (II), wherein $R^i$, $R^{ii}$, and $R^{iii}$ are the substituents in the corresponding rings;

Formula (II)

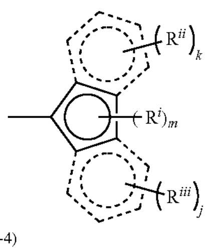

(k = 0-4)
(m = 0-4)
(j = 0-4)

$R^i$, $R^{ii}$ and $R^{iii}$ are the same or different, and each independently selected from hydrogen, and linear or branched, saturated or unsaturated $C_1$-$C_{20}$ hydrocarbyl with or without a heteroatom;

E is $NR^{iv}$ or $PR^{iv}$;

$R^{iv}$ is selected from hydrogen and linear or branched, saturated or unsaturated $C_1$-$C_{20}$ hydrocarbyl, with or without a heteroatom;

M is selected from IVB group metals;

$L^{IV}$ and $L^V$ are the same or different, and each independently selected from hydrogen and linear or branched, saturated or unsaturated $C_1$-$C_{20}$ hydrocarbyl with or without a heteroatom; and n is 1 or 2.

According to the present disclosure, when n is 1, $Cp^{III}$ is any one of the above cyclopentadienyl, indenyl, or fluorenyl; when n is 2, $Cp^{III}$ is two of the above cyclopentadienyl, two of the above indenyl, or two of the above fluorenyl, or $Cp^{III}$ is two of the above cyclopentadienyl, indenyl, or fluorenyl. When n is 2, the two $Cp^{III}$ groups can be are the same or different.

According to a preferred embodiment of the present disclosure, the amino is as shown in formula (III):

formula (III)

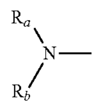

wherein in formula (III), $R_a$ and $R_b$ are the same or different, and each independently selected from hydrogen, $C_1$-$C_6$ alkyl, $C_6$-$C_{18}$ aryl, $C_7$-$C_{20}$ arylalkyl, and $C_7$-$C_{20}$ alkylaryl, preferably $C_1$-$C_6$ alkyl, $C_6$-$C_{12}$ aryl and $C_7$-$C_{10}$ arylalkyl, and more preferably $C_1$-$C_4$ alkyl, phenyl and $C_7$-$C_9$ arylalkyl.

According to a preferred embodiment of the present disclosure, the metal in the metallocene group is Fe, and preferably, the metallocene group is ferrocenyl.

According to a preferred embodiment of the present disclosure, in formula (I), $R^I$ and $R^{II}$ are the same or different, and at least one of $R^I$ and $R^{II}$ is selected from amino-substituted $C_1$-$C_{10}$ hydrocarbyl, amino-substituted $C_1$-$C_{10}$ halohydrocarbyl, amino-substituted $C_1$-$C_{10}$ alkoxy and amino-substituted $C_6$-$C_{10}$ phenolic group; and/or at least one of $R^I$ and $R^{II}$ is selected from metallocene group-substituted $C_1$-$C_{10}$ hydrocarbyl, metallocene group-substituted $C_1$-$C_{10}$ halohydrocarbyl, metallocene group-substituted $C_1$-$C_{10}$ alkoxy and metallocene group-substituted $C_6$-$C_{10}$ phenolic group; and/or at least one of $R^I$ and $R^{II}$ is selected from metallocene groups substituted by $C_1$-$C_{10}$ hydrocarbyl, $C_1$-$C_{10}$ halohydrocarbyl, $C_1$-$C_{10}$ alkoxy or $C_6$-$C_{10}$ phenolic group.

According to a preferred embodiment of the present disclosure, in formula (I), $R^I$ and $R^{II}$ are the same or different, and at least one of $R^I$ and $R^{II}$ is selected from amino-substituted $C_1$-$C_6$ hydrocarbyl, amino-substituted $C_1$-$C_6$ halohydrocarbyl, amino-substituted $C_1$-$C_6$ alkoxy, and amino-substituted $C_6$-$C_8$ phenolic group; and/or at least one of $R^I$ and $R^{II}$ is selected from metallocene group-substituted $C_1$-$C_6$ hydrocarbyl, metallocene group-substituted $C_1$-$C_6$ halohydrocarbyl, metallocene group-substituted $C_1$-$C_6$ alkoxy, and metallocene group-substituted $C_6$-$C_8$ phenolic group; and/or at least one of $R^I$ and $R^{II}$ is selected from metallocene groups substituted by $C_1$-$C_6$ hydrocarbyl, $C_1$-$C_6$ halohydrocarbyl, $C_1$-$C_6$ alkoxy or $C_6$-$C_8$ phenolic group.

According to a preferred embodiment of the present disclosure, in formula (I), $R^I$ and $R^{II}$ are the same or different, and at least one of $R^I$ and $R^{II}$ is selected from amino-substituted $C_1$-$C_6$ hydrocarbyl; and/or at least one of $R^I$ and $R^{II}$ is selected from metallocene group-substituted $C_1$-$C_6$ hydrocarbyl; and/or at least one of $R^I$ and $R^{II}$ is selected from metallocene group substituted by $C_1$-$C_6$ hydrocarbyl.

According to a preferred embodiment of the present disclosure, in formula (I), $R^I$ and $R^{II}$ are the same or different, and at least one of $R^I$ and $R^{II}$ is selected from amino-substituted $C_1$-$C_6$ linear alkyl; and/or at least one of $R^I$ and $R^{II}$ is selected from metallocene group-substituted $C_1$-$C_6$ linear alkyl; and/or at least one of $R^I$ and $R^{II}$ is selected from metallocene group-substituted by $C_1$-$C_6$ linear alkyl.

According to a preferred embodiment of the present disclosure, in formula (I), $R^I$ and $R^{II}$ are the same or different, and at least one of $R^I$ and $R^{II}$ is selected from substituted by amino-substituted $C_1$-$C_4$ linear alkyl; and/or at least one of $R^I$ and $R^{II}$ is selected from metallocene group-substituted $C_1$-$C_4$ linear alkyl; and/or at least one of $R^I$ and $R^{II}$ is selected from metallocene groups substituted by $C_1$-$C_4$ linear alkyl.

According to a preferred embodiment of the present disclosure, when only one group of $R^I$ and $R^{II}$ is selected from the groups as defined above, the other group can be selected from $C_1$-$C_{20}$ hydrocarbyl, $C_1$-$C_{20}$ halohydrocarbyl, $C_1$-$C_{20}$ alkoxy and $C_6$-$C_{20}$ phenolic group, preferably $C_1$-$C_{10}$ hydrocarbyl, $C_1$-$C_{10}$ halohydrocarbyl, $C_1$-$C_{10}$ alkoxy and $C_6$-$C_{10}$ phenolic group, more preferably $C_1$-$C_6$ hydrocarbyl, $C_1$-$C_6$ halohydrocarbyl, $C_1$-$C_6$ alkoxy and $C_6$-$C_8$ phenolic group, and further preferably $C_1$-$C_6$ hydrocarbyl.

According to the present disclosure, $R^i$, $R^{ii}$, and $R^{iii}$ refer to the substituents on the corresponding rings in the above formula. When $Cp^{III}$ is a cyclopentadienyl group, one or up to four $R^i$ can independently connect to the cyclopentadienyl group at any one, two, three, or all four positions (without selection) of the cyclopentadienyl group; when $Cp^{III}$ is an indenyl group, one or two $R^i$ can independently connect to the indenyl group at one of two positions of the five-membered ring or at all two positions without selection; one to four $R^{ii}$ can independently connect to the indenyl group at one, two, three, or all four positions (without selection) of the four positions in the six-membered ring; when the benzene ring on which $R^{iii}$ is a part of the indenyl ring, the definition of $R^{iii}$ is the same as $R^{ii}$; when $Cp^{III}$ is a fluorenyl group, one to four $R^{ii}$ and one to four $R^{iii}$ can independently connect the respective six-membered ring at any one, two, three or all four positions in the two six-membered rings. $R^i$, $R^{ii}$, and $R^{iii}$ each independently refer to hydrogen, linear or branched $C_1$-$C_{20}$ alkyl, $C_3$-$C_{20}$ cycloalkyl, $C_6$-$C_{20}$ aryl, $C_7$-$C_{20}$ alkylaryl, or $C_7$-$C_{20}$ arylalkyl groups, these groups optionally contain one or more heteroatoms, and can also be saturated or unsaturated. $R^i$, $R^{ii}$, and $R^{iii}$ may form a saturated or unsaturated cyclic groups, and these groups may optionally contain one or more heteroatoms.

According to a preferred embodiment of the present disclosure, in formula (II), $R^i$, $R^{ii}$ and $R^{iii}$ are the same or different, each independently selected from hydrogen, $C_1$-$C_{20}$ hydrocarbyl, $C_1$-$C_{20}$ haloalkyl, $C_6$-$C_{20}$ aryl, $C_6$-$C_{20}$ haloaryl, $C_7$-$C_{40}$ arylalkyl, $C_7$-$C_{40}$ alkylaryl, $C_3$-$C_{20}$ cycloalkyl, $C_3$-$C_{20}$ heterocycloalkyl, $C_2$-$C_{20}$ alkenyl, $C_2$-$C_{20}$ alkynyl, $C_1$-$C_{20}$ alkoxy, $C_6$-$C_{20}$ phenolic group, $C_1$-$C_{20}$ amino and a group containing a heteroatom selected from groups 13 to 17.

According to a preferred embodiment of the present disclosure, in formula (II), $R^i$, $R^{ii}$ and $R^{iii}$ are the same or different, and each independently selected from hydrogen, $C_1$-$C_{10}$ hydrocarbyl, $C_1$-$C_{10}$ haloalkyl, $C_6$-$C_{10}$ aryl, $C_6$-$C_{10}$ haloaryl, $C_7$-$C_{20}$ arylalkyl, $C_7$-$C_{20}$ alkylaryl, $C_3$-$C_{10}$ cycloalkyl, $C_3$-$C_{10}$ heterocycloalkyl, $C_2$-$C_{10}$ alkenyl, $C_2$-$C_{10}$ alkynyl, $C_1$-$C_{10}$ alkoxy, $C_6$-$C_{10}$ phenolic group, $C_1$-$C_{10}$ amino and a group containing a heteroatom selected from groups 13 to 17.

According to a preferred embodiment of the present disclosure, in formula (II), $R^i$, $R^{ii}$ and $R^{iii}$ are the same or different, and each independently selected from hydrogen, $C_1$-$C_6$ hydrocarbyl, $C_1$-$C_6$ haloalkyl, $C_6$-$C_6$ aryl, $C_6$-$C_6$ haloaryl, $C_7$-$C_{10}$ arylalkyl, $C_7$-$C_{10}$ alkylaryl, $C_3$-$C_6$ cycloalkyl, $C_3$-$C_6$ heterocycloalkyl, $C_2$-$C_6$ alkenyl, $C_2$-$C_6$ alkynyl, $C_1$-$C_6$ alkoxy, $C_6$-$C_6$ phenolic group, $C_1$-$C_6$ amino and a group containing a heteroatom selected from groups 13 to 17.

According to a preferred embodiment of the present disclosure, in formula (I), $R^{iv}$ selected from hydrogen and linear or branched, saturated or unsaturated $C_1$-$C_{10}$ hydrocarbyl with or without a heteroatom.

According to a preferred embodiment of the present disclosure, in formula (I), $R^{iv}$ selected from hydrogen and linear or branched, saturated or unsaturated $C_1$-$C_6$ hydrocarbyl with or without a heteroatom.

According to a preferred embodiment of the present disclosure, in formula (I), M is selected from Ti, Zr and Hf.

According to a preferred embodiment of the present disclosure, in formula (I), M is Zr.

According to a preferred embodiment of the present disclosure, $L^{IV}$ and $L^V$ are the same, and selected from hydrogen, chlorine, methyl, phenyl, benzyl and dimethylamino.

In order to solve the second technical problem, the present disclosure adopts any one of the following technical solutions.

Option 1:

A preparation method of the metallocene compound as mentioned above, when n is 2, the preparation method comprises:

S1. reacting a $H_2(Cp^{III})$ with an alkali metal-organic compound to form a corresponding $[H(Cp^{III})]^-$ alkali metal salt;

S2. reacting the $[H(Cp^{III})]^-$ alkali metal salt with a $R^IR^{II}ZX_2$ to form a $R^IR^{II}Z[H(Cp^{III})]_2$;

S3. reacting the $R^IR^{II}Z[H(Cp^{III})]_2$ with an alkali metal-organic compound to form a corresponding $R^IR^{II}Z(Cp^{III})_2^{2-}$ alkali metal salt;

S4. reacting the $R^IR^{II}Z(Cp^{III})_2^{2-}$ alkali metal salt with an $X_2ML^{IV}L^V$ for salt elimination reaction, to obtain a $R^IR^{II}Z(Cp^{III})_2ML^{IV}L^V$;

when n is 1, the preparation method comprises:

S1. reacting a $H_2(Cp^{III})$ and a $H_2(E)$ with an alkali metal-organic compound respectively, to form a corresponding $[H(Cp^{III})]^-$ alkali metal salt and a corresponding $[H(E)]^-$ alkali metal salt;

S2. reacting the $[H(Cp^{III})]^-$ alkali metal salt and the $[H(E)]^-$ alkali metal salt with a $R^IR^{II}ZX_2$ to form a $R^IR^{II}Z[H(Cp^{III})][H(E)]$;

S3. reacting the $R^IR^{II}Z[H(Cp^{III})][H(E)]$ with an alkali metal-organic compound to form a corresponding $R^IR^{II}Z(Cp^{III})(E)^{2-}$ alkali metal salt;

S4. reacting the $R^IR^{II}Z(Cp^{III})(E)^{2-}$ alkali metal salt with an $X_2ML^{IV}L^V$ for salt elimination reaction, to obtain a $R^IR^{II}ZCp^{III}EML^{IV}L^V$.

wherein X is selected from Cl, Br and I;

preferably, in S4, $R^IR^{II}Z(Cp^{III})_2^{2-}$ alkali metal salt or $R^IR^{II}Z(Cp^{III})(E)^{2-}$ alkali metal salt directly reacts with $X_2ML^{IV}L^V$ for salt elimination reaction without separation.

Option 2:

A preparation method of the metallocene compound as mentioned above, comprising:

preparing the metallocene compound by carrying out a Z hydrogenation reaction between a precursor $R^IHZ(Cp^{III})_n(E)_{2-n}ML^{IV}L^V$ and a precursor of the $R^{II}$;

wherein the precursor of the $R^{II}$ is a molecule containing a multiple bond, preferably, the molecule containing a multiple bond is selected from organic multiple bond molecules, CO and $CO_2$, wherein the multiple bond is selected from Groups 13 to 16 elements of the same or different atoms, preferably is one or more bonds of C═C, C═C, C═N, C≡N, C═O, C═P, N═N, C═S, C═C═C, C═C═N, C═C═O, and N═C═N.

According to the present disclosure, the above metallocene compound can be prepared by both options 1 and 2.

According to a preferred embodiment of the present disclosure, the above-mentioned metallocene compound is prepared by option 2. That is, the above-mentioned metallocene compound is prepared by addition reaction of the precursor $R^IHZ(Cp^{III})_n(E)_{2-n}ML^{IV}L^V$, $R^{II}HZ(Cp^{III})_n(E)_{2-n}ML^{IV}L^V$ or $H_2Z(Cp^{III})_n(E)_{2-n}ML^{IV}L^V$ and the molecule containing multiple bonds Z—H. Collins reported the step-by-step synthesis of $MeHZ(Cp)_2Zr(NMe_2)_2$ and $MeHZ(Ind)_2Zr(NMe_2)_2$ (Macromolecules 2001, 34, 3120), that is, the dimer ligands $MeHZ(CpH)_2$ and $MeHZ(IndH)_2$ are prepared respectively, and then react with $Zr(NMe_2)_4$ to generate $MeHZ(Cp)_2Zr(NMe_2)_2$ and $MeHZ(Ind)_2Zr(NMe_2)_2$. This method is similar to the synthesis method as described in the background art wherein a proton of metallocenel ring or non-metallocene compound is removed. The two compounds were reacted with excess $Me_3ZCl$ to obtain the compounds $MeHZ(Cp)_2ZrCl_2$ and $MeHZ(Ind)_2ZrCl_2$.

For the preparation of the precursors $R^IHZ(Cp^{III})_n(E)_{2-n}ML^{IV}L^V$, $R^{II}HZ(Cp^{III})_n(E)_{2-n}ML^{IV}L^V$ or $H_2Z(Cp^{III})_n(E)_{2-n}ML^{IV}L^V$, the technical solution adopted in the present disclosure can use this method, and can also use the salt elimination method as mentioned in the background art, but the one-pot method is preferred. The present disclosure provides a specific implementation of the one-pot method, and when the selected raw materials change, the implementation process of the one-pot method does not change.

When n is 2, $R^IHZX_2$ is selected to react with two moles of the $H(Cp^{III})$ alkali metal salt (when the $H(Cp^{III})$ is two different groups, each is one mole). The $H(Cp^{III})$ alkali metal salt is prepared by reacting a ligand $H_2$ $(Cp^{III})$ with an equivalent amount of an alkali metal-organic compound. The alkali metal-organic compound is selected from the group consisting of metal hydride, metal alkyl, alkenyl metal, aryl metal, and amine metal, and preferably metal alkyl; the alkali metal is selected from Li, Na, and K, preferably Li; X is selected from Cl, Br, and I, preferably Cl. The generated $R^IHZ[H(Cp^{III})]_2$ does not need to be separated and is directly used in the next reaction. There are two schemes as follows.

a) $R^IHZ[H(Cp^{III})]_2$ is reacted with $L^{vii}L^{viv}ML^{IV}L^V$ for eliminating a stable small molecule $HL^{viii}$ or $HL^{viv}$ to obtain $R^IHZ(Cp^{III})_2ML^{IV}L^V$, $L^{viii}$ and $L^{viv}$ are leaving groups, which can be the same or different, and selected from hydrogen, alkyl, aryl, amine. Preferably $L^{viii}$ and $L^{viv}$ are the same, and selected from methyl, phenyl and dimethylamino groups.

b) $R^IHZ[H(Cp^{III})]_2$ is reacted with two moles of an alkali metal-organic compound to form an alkali metal salt, wherein the definition of the alkali metal-organic compound is the same as above; and then the alkali metal salt is reacted with an $X_2ML^{IV}L^V$ salt for salt elimination to obtain $R^IHZ(Cp^{III})_2ML^{IV}L^V$, wherein X has the same definition as above.

When n is 1, $R^IHZX_2$ is selected to react with one mole of $H(CP^{III})$ alkali metal salt and one mole of H(E) alkali metal salt. The preparation of $H(Cp^{III})$ alkali metal salt is the same as that of H(E). The alkali metal salt is prepared by reacting $H_2(E)$ with an equivalent amount of an alkali metal-organic compound, and the definition of the alkali metal-organic compound is the same as above. The generated $R^IHZ[H(Cp^{III})][H(E)]$ does not need to be separated and is directly used in the next reaction. There are two schemes as follows:

a) $R^IHZ[H(Cp^{III})][H(E)]$ is reacted with $L^{viii}L^{viv}ML^{IV}L^VV$ for eliminating a stable small molecule $HL^{viii}$ or $HL^{viv}$ to obtain $R^IHZ(Cp^{III})(E)M^{IV}L^V$, wherein $L^{viii}$ and $L^{viv}$ are defined as above.

b) $R^IHZ[H(Cp^{III})][H(E)]$ is reacted with two moles of an alkali metal-organic compound to form an alkali metal salt, wherein the definition of the alkali metal-organic compound is the same as above; and then the alkali metal salt is reacted with an $X_2ML^{IV}L^V$ salt for salt elimination to obtain $R^IHZ(Cp^{III})_2ML^{IV}L^V$, wherein X has the same definition as above.

Selecting $R^{II}$ $HZX_2$ to prepare $R^{II}$ $HZ(Cp^{III})_n(E)_{2-n}ML^{IV}L^V$ or selecting $H_2ZX_2$ to prepare $H_2Z(Cp^{III})_n(E)_{2-n}ML^{IV}L^V$ is similar to the above schemes.

During the preparation of $R^IHZ(Cp^{III})_n(E)_{2-n}ML^{IV}L^V$, $R^{II}HZ(Cp^{III})_n(E)_{2-n}ML^{IV}L^V$ or $H_2Z(Cp^{III})_n(E)_{2-n}ML^{IV}L^V$, the reaction is carried out in a non-protic solvent. The solvent is selected from linear or branched alkane compounds, cycloalkane compounds, aromatic hydrocarbon compounds, halogenated hydrocarbon compounds, ether compounds and cyclic ether compounds, preferably toluene, xylene, chlorobenzene, heptane, cyclohexane, methylcyclohexane, dichloromethane, chloroform, tetrahydrofuran, ether and dixoane. Among them, $H_2(Cp^{III})$, $H_2(E)$, $R^IHZ[H(Cp^{III})]_2$, $R^{II}$ $HZ[H(Cp^{III})]_2$, $H_2Z[H(Cp^{III})]_2$, $R^IHZ[H(Cp^{III})][H(E)]$, $R^{II}$ $HZ[H(Cp^{III})][H(E)]$ or $H_2Z[H(Cp^{III})][H(E)]$ is reacted with the alkali metal-organic compound at a temperature of −60 to 140° C., the preferred temperature range is −20 to 110° C.; the reaction time is greater than 0.016 h, and the preferred range of the reaction time is 2-100 h. The reaction of $R^IHZX_2$, $R^{II}$ $HZX_2$, $H_2ZX_2$ with $H(Cp^{III})$ or H(E) alkali metal salt, and the reaction of $X_2ML^{IV}L^V$ with $R^IHZ[(Cp^{III})]_2$, $R^{II}$ $HZ[(Cp^{III})]_2$, $H_2Z[(Cp^{III})]_2$, $R^IHZ[(Cp^{III})][(E)]$, $R^{II}$ $HZ[(Cp^{III})][(E)]$ or $H_2Z[(Cp^{III})][(E)]$alkali metal salt are carried out at a temperature of −75 to 100° C., preferably the temperature range is −75 to 60° C.; and the reaction time is greater than 0.1 h, and preferably the reaction time range is 6-100 h. The reaction of $R^IHZ[H(Cp^{III})]_2$, $R^{II}HZ[H(Cp^{III})]_2$, $H_2Z[H(Cp^{III})]_2$, $R^IHZ[H(Cp^{III})][H(E)]$, $R^{II}$ $HZ[H(Cp^{III})][H(E)]$, or $H_2Z[H(Cp^{III})][H(E)]$ with $L^{viii}L^{viv}ML^{IV}L^V$ for eliminating a small molecule is carried out at a temperature of 0 to 160° C., and the preferred temperature range is 20 to 140° C.; and the reaction time is greater than 0.1 h, and preferably, the reaction time is in the range of 2-100 h.

The technical solution further provided by the present disclosure is preparing (I) by Z—H addition reaction between the precursor $R^IHZ(Cp^{III})_n(E)_{2-n}ML^{IV}L^V$, $R^{II}HZ(Cp^{III})_n(E)_{2-n}ML^{IV}L^V$ or $H_2Z(Cp^{III})_n(E)_{2-n}ML^{IV}L^V$ and a molecule containing a multiple bond. In the molecule containing a multiple bond, the multiple bond is selected from elements of groups 13 to 16, which may be the same kind of atoms or different kinds of atoms, preferably C═C, C≡C, C═N, C≡N, C═O, C═P, N═N, C═S, C═C═C, C═C═N, C═C═O, N═C═N. The Z—H addition reaction requires the participation of a catalyst. The catalyst is selected from transition metal catalysts and Lewis acid catalysts, preferably platinum catalysts of the transition meta catalysts and $B(C_6F_5)_3$ catalysts of the Lewis acids. In order to better achieve the purpose of the present disclosure, a catalyst that preferably has no effect on $L^{IV}$ and $L^V$ in the aforementioned precursor or does not affect the reaction of Z—H with multiple bonds is required. This means that when the catalyst interacts with the $L^{IV}$ and $L^{LV}$ in the aforementioned precursors and affects the addition reaction of Z—H with multiple bonds, the $L^{IV}$ and $L^{LV}$ groups need to undergo a group conversion reaction through the prepared related compounds. It is converted into a group that does not affect the reaction of Z—H with multiple bond. For example, when $L^{IV}$ and $L^V$ are methy, the $B(C_6F_5)_3$ catalyst will complex with the methyl to form $[MeB(C_6F_5)_3]$, and thus lose the catalytic effect. Then $L^{IV}$ and $L^{V}$ need to be converted to $NMe_2$ or other non-reactive group.

The reaction of Z—H in the precursor $R^{I}HZ(Cp^{III})_n(E)_{2-n}ML^{IV}L^{V}$, $R^{II}HZ(Cp^{III})_n(E)_{2-n}ML^{IV}L^{V}$ or $H_2Z(Cp^{III})_n(E)_{2-n}ML^{IV}L^{V}$ with the molecule containing a multiple bond is carried out in a non-protic solvent. The solvent may be selected from linear or branched alkane compounds, cycloalkane compounds, aromatic hydrocarbon compounds, halogenated hydrocarbon compounds, ether compounds and cyclic ether compounds, preferably toluene, xylene, chlorobenzene, heptane, cyclohexane, methylcyclohexane, dichloromethane, chloroform, tetrahydrofuran, ether and dioxane. The amount of catalyst used in the reaction is 0.00001-50% preferably 0.01-20% of the total mass of the reactants; the reaction is carried out at a temperature of −30 to 140° C., and the preferred temperature range is 0 to 90° C.; the reaction time is more than 0.1 h, and the reaction time is preferably in the range of 2-50 h. The target product (I) is separated or purified by recrystallization.

According to the present disclosure, "Z" is preferably silicon.

According to a preferred embodiment of the present disclosure, the Z hydrogenation reaction is carried out in the presence of a catalyst selected from transition metal catalysts and Lewis acid catalysts, preferably platinum catalysts of transition metal catalysts and $B(C_6F_5)_3$ of Lewis acid catalysts.

According to a preferred embodiment of the present disclosure, the amount of the catalyst used in the Z hydrogenation reaction is 0.00001-50%, preferably 0.01-20% of the total mass of the reactants.

According to a preferred embodiment of the present disclosure, the temperature of the Z hydrogenation reaction is −30 to 140° C., preferably 0 to 90° C.

According to a preferred embodiment of the present disclosure, the reaction time of the Z hydrogenation reaction is greater than 0.1 h, preferably 2-50 h.

According to a preferred embodiment of the present disclosure, the obtained precursor is separated or purified by recrystallization, and the solvent for the recrystallization is an aprotic solvent; preferably, it is selected from linear or branched alkane compounds and cycloalkane compounds, aromatic hydrocarbon compounds, halogenated hydrocarbon compounds, ether compounds and cyclic ether compounds; further preferably, selected from toluene, xylene, hexane, heptane, cyclohexane and methylcyclohexane.

According to a preferred embodiment of the present disclosure, the precursor $R^{I}HZ(Cp^{III})_n(E)_{2-n}ML^{IV}L^{V}$ is prepared by a one-pot method of chemical reaction.

According to a preferred embodiment of the present disclosure, when n is 2, the preparation method of the precursor $R^{I}HZ(Cp^{III})_n(E)_{2-n}ML^{IV}L^{V}$ comprises:

step 1), reacting a $H_2(Cp^{III})$ with an alkali metal-organic compound to form a corresponding $[H(Cp^{III})]^-$ alkali metal salt;

step 2), reacting the $[H(Cp^{III})]^-$ alkali metal salt with a $R^{I}HZX_2$ to form a $R^{I}HZ[H(Cp^{III})]_2$;

step 3), directly reacting the $R^{I}HZ[H(Cp^{III})]_2$ without separation, with a $L^{viii}L^{viv}ML^{IV}L^{V}$ for eliminating a stable small molecule $L^{viii}$ or $L^{viv}$, to obtain the precursor $R^{I}HZ(Cp^{III})_2ML^{IV}L^{V}$, and/or, directly reacting the $R^{I}HZ[H(Cp^{III})]_2$ without separation, with an alkali metal-organic compound to form an alkali metal salt; the obtained alkali metal salt is then reacted with an $X_2ML^{IV}L^{V}$ for salt elimination reaction, to obtain the precursor $R^{I}HZ(Cp^{III})_2ML^{IV}L^{V}$; and when n is 1, the preparation method of the precursor $R^{I}HZ(Cp^{III})_n(E)_{2-n}ML^{IV}L^{V}$ comprises:

step 1), reacting a $H_2(Cp^{III})$ and a $H_2(E)$ respectively with an alkali metal-organic compound to form a corresponding $[H(Cp^{III})]^-$ alkali metal salt and a corresponding $[H(E)]^-$ alkali metal salt;

step 2), reacting the $[H(Cp^{III})]^-$ alkali metal salt and the $[H(E)]^-$ alkali metal salt with $R^{I}HZX_2$ to form a $R^{I}HZ[H(Cp^{III})][H(E)]$;

step 3), directly reacting the $R^{I}HZ[H(Cp^{III})][H(E)]$ without separation, with a $L^{viii}L^{viv}ML^{IV}L^{V}$ by eliminating a stable small molecule $L^{viii}$ or $LV^{viv}$, to obtain the precursor $R^{I}HZCp^{III}EML^{IV}L^{V}$;

and/or, directly reacting the $R^{I}HZ[H(Cp^{III})][H(E)]$ without separation, with an alkali metal-organic compound to form an alkali metal salt; then reacting the obtained alkali metal salt with a $X_2ML^{IV}L^{V}$ for salt elimination reaction, to obtain the precursor $R^{I}HZCp^{III}EML^{IV}L^{V}$;

wherein X is selected from Cl, Br and I.

According to the present disclosure, when one pot method is used, $R^{I}$ is formed by the addition reaction of the Z—H bond in the precursor $R^{II}HZ(Cp^{III})_n(E)_{2-n}ML^{IV}L^{V}$ and the multiple bond in a molecule containing multiple bond, and $R^{II}$ is formed by the addition reaction of the Z—H bond in the precursor $R^{I}HZ(Cp^{III})_n(E)_{2-n}ML^{IV}L^{V}$ and a multiple bond in a molecule containing multiple bond, or both $R^{I}$ and $R^{II}$ are formed by the addition reaction of Z—H bond in the precursor $H_2Z(Cp^{III})_n(E)_{2-n}ML^{IV}L^{V}$ and a multiple bond in a molecule containing multiple bond; the multiple bond molecule is an organic multiple bond molecule, CO or $CO_2$, preferably an organic multiple bond molecule. Thus, $R^{I}$ and $R^{II}$ can be the same or different.

According to a preferred embodiment of the present disclosure, in each step, a reaction temperature of the reaction is −100° C. to 140° C., preferably −85° C. to 110° C.; and/or, ae reaction time is greater than 0.016 h, preferably 2 to 100 h.

According to a preferred embodiment of the present disclosure, in each step, the reaction materials are mixed at −100° C. to −20° C., preferably −85° C. to −10° C., react at 10° C. to 50° C., preferably 20° C. to 35° C. for 1 h to 100 h, preferably 5 h to 50 h.

According to a preferred embodiment of the present disclosure, in each step, the reaction is carried out in a non-protic acid solvent selected from linear or branched alkane compounds, cycloalkane compounds, aromatic compounds, halogenated hydrocarbon compounds, ether compounds and cyclic ether compounds, preferably toluene, xylene, chlorobenzene, heptane, cyclohexane, methylcyclohexane, dichloromethane, chloroform, tetrahydrofuran, ether and dioxane.

According to a preferred embodiment of the present disclosure, the alkali metal-organic compound selected from hydrogenated metal, alkyl metal, alkenyl metal, aromatic metal and amine metal, preferably alkyl metal, and more preferably $C_1$-$C_6$ alkyl metal.

According to a preferred embodiment of the present disclosure, the alkali metal is selected from Li, Na and K, preferably Li.

In order to solve the third technical problem, the present disclosure adopts the following technical solution.

A catalyst for α-olefin polymerization reaction, comprising: the metallocene compound as mentioned above or the metallocene compound prepared according to the above preparation method, a cocatalyst and a carrier.

According to a preferred embodiment of the present disclosure, the cocatalyst is selected from one or more of a Lewis acid and an ionic compound containing a non-coordination anion and a Lewis acid or containing a non-coordination anion and a Bronsted acid cation; preferably, the Lewis acid comprises one or more of alkyl aluminum, alkyl aluminoxane and organic borides; and/or the ionic compound containing a non-coordination anions and a Lewis acid or containing a non-coordination anion and a Bronsted acid cation is selected from compounds containing 1-4 perfluoroaryl substituted borate anions.

According to a preferred embodiment of the present disclosure, the alkyl aluminum includes trimethyl aluminum, triethyl aluminum, triisopropyl aluminum, tri-n-propyl aluminum, tri-isobutyl aluminum, tri-n-butyl aluminum, tri-isoamyl aluminum, tri-n-amyl aluminum, tri-isohexyl aluminum, tri-isoheptyl aluminum, tri-n-heptyl aluminum, tri-isooctyl aluminum, tri-n-octyl aluminum, tri-isononyl aluminum, tri-n-nonyl aluminum, tri-isodecyl aluminum and tri-n-decyl aluminum; and/or the alkyl aluminoxane includes methyl aluminoxane, ethyl aluminoxane and butyl modified aluminoxane; and/or the organic boride includes trifluoroborane, triphenylborane, tris (4-fluorophenyl) borane, tris (pentafluorophenyl) borane, tris (3,5-difluorophenyl) borane and tris (2,4,6-trifluorophenyl) borane.

According to a preferred embodiment of the present disclosure, the alkyl aluminum comprises trimethyl aluminum and triethyl aluminum.

According to a preferred embodiment of the present disclosure, the perfluoroaryl group is selected from perfluorophenyl, perfluoro naphthyl, perfluoro biphenyl and perfluoroalkyl phenyl, and the cation is selected from N, N-dimethylphenylammonium ion, triphenylcarboonium ion, trialkyl ammonium ion and triarylammonium ion.

According to a preferred embodiment of the present disclosure, the content of the metallocene compound in the catalyst is 0.001 mass % to 10 mass %, preferably 0.01 mass % to 1 mass %, based on M element; and/or the molar ratio of Al element in the cocatalyst to M element in the metallocene compound is (1-500):1, preferably (50-300):1

According to a preferred embodiment of the present disclosure, the catalyst has an asymmetric structure. The asymmetric structure can be multi-layered, which can refer to the asymmetry of $R^I$ and $R^{II}$ in metallocene compounds, the asymmetric structure formed by the interaction between metallocene compounds and additives, or the carrier loading after the interaction between metallocene compounds and additives to further strengthen the asymmetry.

In order to solve the fourth technical problem above, the technical solution adopted by the present disclosure is as follows.

A method for preparing the above-mentioned catalyst includes: combining the metallocene compound, the co-catalyst and the carrier under the action of a solvent to form the catalyst.

According to a preferred embodiment of the present disclosure, the conditions of the combination include: the temperature of the combination is −40° C. to 200° C., preferably 40° C. to 120° C.; the time of the combination is greater than 0.016 h, preferably 2 h-100 h.

According to a preferred embodiment of the present disclosure, the solvent is selected from linear hydrocarbons, branched hydrocarbons, cyclic saturated hydrocarbons and aromatic hydrocarbons, preferably toluene, xylene, n-butane, n-pentane, isopentane, neopentane, cyclopentane, methylcyclopentane, n-hexane, n-heptane, cyclohexane, methylcyclohexane, petroleum ether, isoheptane, and neoheptane.

According to a preferred embodiment of the present disclosure, the preparation method of the above-mentioned catalyst comprises:

i) mixing the co-catalyst, the carrier and the solvent to obtain a mixture A;

ii) mixing the mixture A with the metallocene compound to obtain a mixture B; preferably, mixing the metallocene compound in a solvent first, to form a mixture which is then mixed with the mixture A;

iii) separating a solid from the mixture B, and drying the solid to prepare the catalyst.

According to a preferred embodiment of the present disclosure, in step i), the carrier is calcinated. Preferably, conditions of the calcination treatment include: a calcination temperature of 50° C. to 700° C., and a calcination time of 0.5 h to 240 h.

According to a preferred embodiment of the present disclosure, the mixture A is heated. Preferably, conditions of the heating treatment include: a heating temperature of 30° C. to 110° C., and a heating time of 0.1 h to 100 h.

According to a preferred embodiment of the present disclosure, in step iii), conditions of the drying treatment include: a drying temperature of 30° C. to 110° C., and a drying time of 0.1 h to 100 h.

According to a preferred embodiment of the present disclosure, the solid is washed before the drying treatment, preferably the solid is washed with the solvent, and more preferably, the solvent after washing is washed until the solvent does not contain metal ions.

In order to solve the fifth technical problem above, the technical solution adopted by the present disclosure is as follows.

Use of the above-mentioned metallocene compound or the metallocene compound prepared according to the above-mentioned preparation method or the above-mentioned catalyst or the above-mentioned preparation method in the field of α-olefin polymerization.

According to a preferred embodiment of the present disclosure, polymerization reaction of the α-olefin is carried out in the presence of the above-mentioned metallocene compound or the metallocene compound prepared according to the above-mentioned preparation method or the above-mentioned catalyst or the above-mentioned preparation method, to obtain poly-α-olefin.

According to a preferred embodiment of the present disclosure, the polymerization reaction is carried out under a solvent-free condition.

According to a preferred embodiment of the present disclosure, conditions of the polymerization reaction include: a reaction temperature of −50° C. to 200° C., preferably 30° C. to 100° C.; and a reaction time of 0.01 h to 60 h, preferably 0.1 h to 10 h.

According to a preferred embodiment of the present disclosure, the metallocene catalyst or metallocene catalyst system is used in an amount of 0.001 mg to 1000 mg, preferably 0.01 mg to 200 mg, and more preferably 0.1 mg to 20 mg per gram of α-olefin.

According to a preferred embodiment of the present disclosure, the α-olefin includes $C_2$-$C_{20}$ α-olefin, preferably $C_2$-$C_{14}$ α-olefin, more preferably ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, preferably 1-butene, 1-pentene, 1-hexene, 1-heptene, 1-octene, 1-nonene, 1-decene, 1-undecene, 1-dodecene, 1-tridecene, and 1-tetradecene.

In some specific embodiments of the present disclosure, the α-olefin is propylene. When the α-olefin is propylene, the bulk polymerization reaction can be carried out with propylene and hydrogen as raw materials (this bulk polymerization reaction can be carried out in a tank reactor or a tubular reactor; it can be carried out batchwise or continuously), the amount of hydrogen can be 0 to 0.10 g/g propylene, preferably 0.00001 to 0.10 g/g propylene. In addition, when polymerizing propylene, impurity breakers can be used. The impurity breaker is a substance commonly used in the field, and its specific dosage can be 0-100 mmol/g propylene, preferably 0.001-10 mmol/g propylene.

In some specific embodiments of the present disclosure, the α-olefin is ethylene. When the α-olefin is ethylene, the gas phase polymerization reaction is carried out, and the reaction temperature is 0-200° C., preferably 20-140° C.; and/or, the reaction time is 0.016-60 h, preferably 0.1-20 h; and/or, ethylene. The pressure is 0.1-15 MPa, preferably 0.2-10 MPa, and/or the amount of catalyst is 0.00001-100 mg/g ethylene, and/or the amount of impurity removal agent is 0-100 mmol/g ethylene, and/or hydrogen The dosage is 0-0.01 g/g ethylene.

According to some embodiments of the present disclosure, the impurity removing agent is selected from alkyl aluminum compounds, aromatic aluminum compounds, aluminoxane compounds, borohydride compounds, alkyl magnesium compounds, aromatic magnesium compounds, alkyl zinc compounds, aromatic zinc compound, alkyl lithium compound, aromatic lithium compound, alkyl sodium compound, aromatic sodium compound, alkyl potassium compound and aromatic potassium compound; preferably, selected from trimethyl aluminum, triethyl aluminum, trimethyl aluminum Isobutyl aluminum, tri-n-butyl aluminum, tri-n-hexyl aluminum, tri-n-octyl aluminum, methyl aluminoxane, ethyl aluminoxane, isobutyl aluminoxane and modified aluminoxane, alkyl aluminum halides, dimethyl magnesium, diethyl magnesium, di-n-butyl magnesium, dimethyl zinc, diethyl zinc, di-n-butyl zinc, methyl lithium, n-butyl lithium and tert-butyl lithium.

In the present disclosure, the term "hydrocarbyl" may be alkyl, aryl, alkylaryl, arylalkyl, alkynyl, alkenyl and the like.

In the present disclosure, the term "heteroatom" may refer to a heteroatom such as oxygen, sulfur, nitrogen, and phosphorus.

In the present disclosure, the term "substituted" may refer to substitution by a substituent, which may be selected from halogens, non-carbon oxo acid groups and their derivatives, and optionally substituted alkyl, aralkyl and aryl groups. For example, a group substituted with an alkyl group, an aryl group, an amino group, a hydroxyl group, an alkoxy group, a carbonyl group, an oxa group, a carboxyl group, a thia group, a sulfur oxyacid, a halogen group, and a combination thereof.

In the present disclosure, the term "one-pot method" may refer to a continuous multi-step synthesis reaction carried out in the same reactor.

In the present disclosure, "Me" means methyl: "Et" means ethyl; "iPr" means isopropyl; "tBu" means tert-butyl; "iBu" means isobutyl; "iPr" Means isopropyl; "Ph" means phenyl; "Fc" means $CpFe(C_5H_4)$; "Flu" means fluorenyl.

In the present disclosure, "Tol" means toluene.

The beneficial effects of the present disclosure are at least:

1) At least one of the two different groups on the bridging atom of the metallocene compound used in the present disclosure is an amine substituted group and/or a metallocene substituted group and/or a substituted metallocene group, and thus it can promote the formation of a metallocene catalyst with a racemic structure. When combined with a co-catalyst and a carrier, it can realize the chain growth of olefins such as propylene and ethylene that is controlled by the stereo enantiomorphic sites to form high isotacticity metallocene polypropylene or metallocene polyethylene.
2) The method for preparing metallocene compounds provided by the present disclosure can effectively carry out group transformations of bridging atoms, and prepare bridging metallocene compounds with various structures and compositions. The bridged metallocene compound obtained after the hydrogenation of the bridged atom is combined with the cocatalyst and the carrier to form a metallocene catalyst, which has good thermal stability and catalytic activity, and can be used for the polymerization of ethylene or propylene and other alpha-olefins.

DETAILED DESCRIPTION OF THE EMBODIMENTS

The present disclosure will be further illustrated by the following examples.

In the following embodiments, unless otherwise specified, the aluminum/zirconium ratio is the molar ratio of aluminum to zirconium.

In the present disclosure, unless otherwise specified, the Al/Zr ratio refers to the molar ratio of Al element to Zr element.

In the present disclosure, unless otherwise specified, "%" means mass percentage.

In the present disclosure, the calculation formula of polymerization activity is: Polymerization activity=quality of polymerized product/(polymerization time×catalyst amount×zirconium content).

A. Preparation of Metallocene Compounds

Synthesis Example 1

Preparation of the metallocene compound as shown in formula 1:

40 mmol of 4-phenyl-2-methylindene was weighed and dissolved in 200 mL of $Et_2O$, and cooled to −78° C. 40 mmol of n-butyllithiumin in a hexane solution with a concentration of 2.4M was slowly dropwise added into the resulting mixture over 15 min. After the addition was completed, the mixture was naturally warmed to room temperature under stirring, and stirred for another 12 hours at room temperature to obtain a solution of indenyl lithium compound.

20 mmol of $Me(PhMeNH_2CH_2CH_2C)SiCl_2$ was weighed and dissolved in 100 mL of n-hexane, and cooled to −78° C. The solution of indenyl lithium compound prepared above was slowly dropwise added into the resulting mixture over 30 minutes. Then the mixture was naturally warmed to room temperature under stirring, and stirred for another 12 h at room temperature. The insoluble matter was removed by filtration, and the filtrate was passed through a silica gel column to obtain a yellow solution. The solvent was drained to obtain a yellow compound $Me(PhMeNH_2CH_2CH_2C)Si(4\text{-}Ph\text{-}2\text{-}MeC_9H_5)_2$, which was weighed 8.2 mmol, and the yield was 41%.

5 mmol of $Me(PhMeNH_2CH_2CH_2C)Si(4\text{-}Ph\text{-}2\text{-}MeC_9H_5)_2$ was weighed and dissolved in 100 mL THF, and cooled to −78° C. 10 mmol of n-butyllithiumin in a hexane solution with a concentration of 2.4M was slowly dropwise added into the resulting mixture over 15 minutes. The resulting mixture was naturally warmed to room temperature under stirring, and stirred at room temperature for another 12 hours to obtain a solution of silicon-bridged indenyl lithium compound.

5 mmol $ZrCl_4$ was weighed and added into 100 mL THF, and cooled to −78° C. With stirring, the solution of silicon-bridged indenyl lithium compound prepared above was slowly dropwise added into the resulting mixture over 15 minutes. The resulting mixture was then naturally warmed to room temperature under stirring, and stirred for another 12 h at room temperature. The insoluble matter was removed by filtration, the filtrate was collected, and the THF solvent in the filtrate was removed. The remaining solid was extracted with 100 mL of toluene. The extraction solution was crystallized at −20° C. to obtain an orange-red zirconocene compound $[Me(PhMeNH_2CH_2CH_2C)Si(4\text{-}Ph\text{-}2\text{-}MeC_9H_4)_2]ZrCl_2$ as shown in formula 1, which was weighed 1.2 mmol, and the yield was 24%.

The preparation methods of the metallocene compounds of formula 2 to formula 11 were similar to this, except that, $Me(PhMeNH_2CH_2CH_2C)SiCl_2$ in the second step was replaced with $Me(PhMeNH_2CH_2CH_2CH_2C)SiCl_2$, $Me(Me_2NH_2CH_2CH_2CH_2C)SiCl_2$, $Me(Me_2NH_2CH_2C)SiCl_2$, $Me(Me_2NH_2CH_2CH_2C)SiCl_2$, $Me(NH_2Pr_2NH_2CH_2CH_2C)SiCl_2$, $Me(iPr_2NH_2CH_2CH_2C)SiCl_2$, $Me(iBuMeNH_2CH_2CH_2C)SiCl_2$, $Me(iBuEtNH_2CH_2CH_2C)SiCl_2$, $Me(iPrEtNH_2CH_2CH_2C)SiCl_2$, $(Me_2NH_2CH_2C)(iBuMeNH_2CH_2CH_2C)SiCl_2$ respectively, finally to obtain zirconocene compounds $Me(PhMeNH_2CH_2CH_2CH_2C)Si(4\text{-}Ph\text{-}2\text{-}MeC_9H_4)_2ZrCl_2$ (formula 2, which was weighed 1.0 mmol, yield 20%), $Me(Me_2NH_2CH_2CH_2CH_2C)Si(4\text{-}Ph\text{-}2\text{-}MeC_9H_4)_2ZrCl_2$ (formula 3, which was weighed 1.4 mmol, yield 28%), $Me(Me_2NH_2CH_2C)Si(4\text{-}Ph\text{-}2\text{-}MeC_9H_4)_2ZrCl_2$ (formula 4, which was weighed 1.2 mmol, yield 24%), $Me(Me_2NH_2CH_2CH_2C)Si(4\text{-}Ph\text{-}2\text{-}MeC_9H_4)_2ZrCl_2$ (formula 5, which was weighed 1.0 mmol, yield 20%), $Me(NH_2Pr_2NH_2CH_2CH_2C)Si(4\text{-}Ph\text{-}2\text{-}MeC_9H_4)_2ZrCl_2$ (formula 6, which was weighed 1.3 mmol, yield 26%), $Me(iPr_2NH_2CH_2CH_2C)Si(4\text{-}Ph\text{-}2\text{-}MeC_9H_4)_2ZrCl_2$ (formula 7, which was weighed 1.0 mmol, yield 20%), $Me(iBuMeNH_2CH_2CH_2C)Si(4\text{-}Ph\text{-}2\text{-}MeC_9H_4)_2ZrCl_2$ (formula 8, which was weighed 0.9 mmol, yield 18%), $Me(iBuEtNH_2CH_2CH_2C)Si(4\text{-}Ph\text{-}2\text{-}MeC_9H_4)_2ZrCl_2$ (formula 9, which was weighed 0.8 mmol, yield 16%), $Me(iPrEtNH_2CH_2CH_2C)Si(4\text{-}Ph\text{-}2\text{-}MeC_9H_4)_2ZrCl_2$ (formula 10, which was weighed 0.9 mmol, yield 18%), $(Me_2NH_2CH_2C)(iBuMeNH_2CH_2CH_2C)Si(4\text{-}Ph\text{-}2\text{-}MeC_9H_4)_2ZrCl_2$ (formula 11, which was weighed 0.6 mmol, yield 12%) respectively.

The preparation methods of the metallocene compound of formula 12 to formula 14 were also the similar to this, except that $Me(PhMeNCH_2CH_2CH_2)SiCl_2$ in the second step was replaced with $Me[CpFe(C_5H_4)CH_2CH_2]SiCl_2$, $Me[CpFe(C_5H_4)CH_2CH_2CH_2]SiCl_2$, $Me[CpFe(C_5H_4)CH_2]SiCl_2$ respectively, and finally zirconocene compounds $Me[CpFe(C_5H_4)CH_2CH_2]Si(4\text{-}Ph\text{-}2\text{-}MeC_9H_4)_2ZrCl_2$ (formula 12, which was weighed 1.0 mmol, yield 20%), $Me[CpFe(C_5H_4)CH_2CH_2CH_2]Si(4\text{-}Ph\text{-}2\text{-}MeC_9H_4)_2ZrCl_2$ (formula 13, which was weighed 1.3 mmol, yield 26%), $Me[CpFe(C_5H_4)CH_2]Si(4\text{-}Ph\text{-}2\text{-}MeC_9H_4)_2ZrCl_2$ (formula 14, which was weighed 0.8 mmol, yield 16%) were obtained.

The preparation methods of the metallocene compound of formula 15 was the similar to this, except that, 4-phenyl-2-methyl indenyl in the first step was replaced with 4-(4-tert butyl)phenyl-2-methyl indenyl, and in the meantime, $Me(PhMeNCH_2CH_2CH_2)SiCl_2$ in the second step was replaced with $Me[CpFe(C_5H_4)CH_2CH_2]SiCl_2$, finally to obtain zirconocene compound $Me[CpFe(C_5H_4)CH_2CH_2]Si(4\text{-}(4\text{-}tBuC_6H_4)\text{-}2\text{-}MeC_9H_4)_2ZrCl_2$ (formula 15, which was weighed 1.0 mmol, yield 20%).

Synthesis Examples 2-12 Preparation of Precursor

Preparation of Hydrogen Silicon Bridged Bisindenyl Zirconocene Compound $MeHSi(2\text{-}Me\text{-}7\text{-}p\text{-}tBuC_6H_4C_9H_4)_2ZrCl_2$ (MS-1)

2-methyl-7-p-tert-butylphenylindene (5.24 g, 20 mmol) was weighed and dissolved in Tol (80 mL) solvent. N-butyllithium (2.4M, 8.5 mL, 20 mmol) was slowly dropwise added into the mixture at −78° C., gradually warmed to room temperature and reacted overnight to obtain a wine-red solution. Methyldichlorosilane (1.04 mL, 10 mmol) was slowly dropwise added into the mixture at −78° C., and gradually warmed to room temperature and stirred for more than 8 hours to obtain a yellow suspension. The yellow suspension was placed at −78° C., and n-butyllithium (2.4M, 8.5 mL, 20 mmol) was slowly dropwise added into the mixture. After warmed to room temperature, stirring was continued for 2 h to obtain an orange-yellow turbid solution. Zirconium tetrachloride (2.33 g, 10 mmol) from a glove box was put into a vial. followed by adding 40 mL of toluene, and being placed under the nitrogen protection, and was added into the above yellow turbid liquid at room temperature. Soon the color would gradually darken from orange-yellow to brown-black. Reaction was carried out for 1 day. The reaction solution was filtered under the protection of nitrogen, the obtained filtrate was drained of solvent, washed with n-hexane, filtered and drained to obtain a yellow solid. The yellow solid was recrystallized from toluene in multiple steps at −20° C. to obtain 1.76 g (24.2%) of racemic compound rac-MS-1 and 3.42 g (47.0%) of meso-MS-1 compound.

The two compounds were isomers and had the same elemental composition. One of them was selected to be elementally analyzed to confirm its composition. The composition was $C_{41}H_{48}Cl_2SiZr$(Mr=731.04): theoretical value: C, 67.36; H, 6.62; measured value: C, 67.54, H, 6.56.

Synthesis Example 2

Preparation of Aminoalkyl-Containing Silicon Bridged Bisindenyl Zirconocene Compound $Me(Me_2NCH_2CH_2)Si(2\text{-}Me\text{-}7\text{-}p\text{-}tBuC_6H_4C_9H_4)_2ZrCl_2$ (rac-MS-1a)

Rac-MS-1 (1.45 g, 2 mmol) was weighed and dissolved in Tol (100 mL) solvent. $Me_2NCH{=}CH_2$ (0.156 g, 2.2 mmol) and $B(C_6F_5)_3$ (0.051 g, 0.1 mmol, 5% dosage) were added into the mixture. The mixture was heated to 50° C. for 24 h. All the volatile components were removed by vacuuming at room temperature. The remaining solid was washed with a small amount (approximately 1.5 mL each time) n-hexane for 2 to 4 times. It was dried under vacuum for 6 hours to obtain 1.36 g (85.2%) of yellow solid rac-MS-1a.

The composition was $C_{45}H_{57}Cl_2NSiZr$(Mr=802.16): theoretical value: C, 67.38; H, 7.16; N, 1.75; measured value: C, 67.42; H, 7.19; N, 1.78.

Synthesis Example 3

Preparation of Aminoalkyl-Containing Silicon Bridged Bisindenyl Zirconocene Compound $Me(Me_2NCH_2CH_2)Si(2\text{-}Me\text{-}7\text{-}p\text{-}tBuC_6H_4C_9H_4)_2ZrCl_2$ (meso-MS-1a)

The implementation steps were the same as Synthesis Example 2, wherein rac-MS-1 was replaced with meso- MS-1 (1.45 g, 2 mmol), and finally 1.4 g (87.7%) of yellow solid meso-MS-1a was obtained.

The compound meso-MS-1 and the above-mentioned rac-MS-1 were isomers, and the composition was also $C_{45}H_{57}Cl_2NSiZr$(Mr=802.16): theoretical value: C, 67.38; H, 7.16; N, 1.75; measured value: C, 67.44; H, 7.18; N, 1.77.

Synthesis Example 4

Preparation of Aminoalkyl-Containing Silicon Bridged Bisindenyl Zirconium Compound Me(PhMeNCH$_2$CH$_2$)Si(2-Me-7-p-tBuC$_6$H$_4$C$_9$H$_4$)$_2$ZrCl$_2$ (rac-MS-1b)

The implementation steps were the same as Synthesis Example 2, wherein Me$_2$NCH═CH$_2$ was replaced with PhMeNCH═CH$_2$ (0.293 g, 2.2 mmol), and finally 1.65 g (95.9%) of yellow solid rac-MS-1b was obtained.

The composition was $C_{50}H_{59}Cl_2NSiZr$(Mr=864.23): theoretical value: C, 69.49; H, 6.88; N, 1.62; measured value: C, 69.45; H, 6.89; N, 1.65.

Synthesis Example 5

Preparation of Aminoalkyl-Containing Silicon Bridged Bis-Indenocyl Zirconocene Compound Me(Me$_2$NCH$_2$CH$_7$CH)Si(2-Me-7-p-tBuC$_6$H$_4$C$_9$H$_4$)$_2$ZrCl$_2$ (rac-MS-1c)

The implementation steps were the same as Example 1, wherein Me$_2$NCH═CH$_2$ was replaced with Me$_2$NCH$_2$CH═CH$_2$ (0.187 g, 2.2 mmol), and finally 1.35 g (83.2%) of yellow solid rac-MS-1c was obtained.

The composition was $C_{46}H_{59}Cl_2NSiZr$(Mr=816.18): theoretical value: C, 67.69; H, 7.29; N, 1.72; measured value: C, 67.65; H, 7.30; N, 1.70.

Synthesis Example 6

Preparation of Aminoalkyl-Containing Silicon Bridged Bisindenyl Zirconocene Compound Me(PhMeNCH$_2$CH$_2$CH$_2$)Si(2-Me-7-p-tBuC$_6$H$_4$C$_9$H$_4$)$_2$ZrCl$_2$ (rac-MS-1d)

The implementation steps were the same as Example 1, wherein Me$_2$NCH═CH$_2$ was replaced with PhMeNCH$_2$CH═CH$_2$ (0.324 g, 2.2 mmol), and finally 1.61 g (92.3%) of yellow solid rac-MS-1d was obtained.

The composition was $C_{51}H_{61}Cl_2NSiZr$(Mr=878.25): theoretical value: C, 69.75; H, 7.00; N, 1.59; measured value: C, 69.78; H, 7.02; N, 1.60.

Synthesis Example 7

Preparation of Aminoalkyl-Containing Silicon Bridged Bisindenyl Zirconocene Compound Me(iPr$_2$NCH$_2$CH$_7$CH$_2$)Si(2-Me-7-p-tBuC$_6$H$_4$C$_9$H$_4$)$_2$ZrCl$_2$ (rac-MS-1e)

The implementation steps were the same as Example 1, wherein Me$_2$NCH═CH$_2$ was replaced with iPr$_2$NCH$_2$CH═CH$_2$ (0.310 g, 2.2 mmol), and finally a yellow solid rac-MS-1e 1.54 g (88.8%) was obtained.

The composition was $C_{50}H_{67}Cl_2NSiZr$(Mr=872.29): theoretical value: C, 68.85; H, 7.74; N, 1.61; measured value: C, 68.83; H, 7.71; N, 1.63.

Synthesis Example 8

Preparation of Aminoalkyl-Containing Silicon Bridged Bisindenyl Zirconocene Compound Me(iBuMeNCH$_2$CH$_2$CH$_2$CH$_2$)Si(2-Me-7-p-tBuC$_6$H$_4$C$_9$H$_4$)$_2$ZrCl$_2$ (rac-MS-1f)

The implementation steps were the same as Example 1, wherein Me$_2$NCH═CH$_2$ was replaced with iBuMeNCH$_2$CH$_2$CH═CH$_2$ (0.310 g, 2.2 mmol), and finally a yellow solid rac-MS-if 1.57 g (90.62%) was obtained.

The composition was $C_{50}H_{67}Cl_2NSiZr$(Mr=872.29): theoretical value: C, 68.85; H, 7.74; N, 1.61; measured value: C, 68.82; H, 7.72; N, 1.63.

Synthesis Example 9

Preparation of Aminoalkyl-Containing Silicon Bridged Bisindenyl Zirconocene Compound Me(PhMeNCH$_2$CH$_2$CH$_2$CH$_2$)Si(2-Me-7-p-tBuC$_6$H$_4$C$_9$H$_4$)$_2$ZrCl$_{12}$ (rac-MS-1g)

The implementation steps were the same as Example 1, wherein Me$_2$NCH═CH$_2$ was replaced with PhMeNCH$_2$CH$_2$CH═CH$_2$ (0.354 g, 2.2 mmol), and finally a yellow solid rac-MS-1 g 1.64 g (92.52%) was obtained.

The composition was $C_{52}H_{63}Cl_2NSiZr$(Mr=892.28): theoretical value: C, 70.00; H, 7.12; N, 1.57; measured value: C, 70.04; H, 7.11; N, 1.59.

Synthesis Example 10

Preparation of Aminoalkyl-Containing Silicon Bridged Bisindenyl Zirconocene Compound Me(iPrEtNCH$_2$CH$_2$CH$_2$CH$_2$)Si(2-Me-7-p-tBuC$_6$H$_4$C$_9$H$_4$)$_2$ZrCl$_2$ (rac-MS-1h)

The implementation steps were the same as Example 1, wherein Me$_2$NCH═CH$_2$ was replaced with iPrEtNCH$_2$CH$_2$CH═CH$_2$ (0.310 g, 2.2 mmol), and finally a yellow solid rac-MS-1h 1.57 g (90.61%) was obtained.

The composition was $C_{50}H_{71}Cl_2NSiZr$(Mr=876.32): theoretical value: C, 68.53; H, 8.17; N, 1.60; measured value: C, 68.51; H, 8.18; N, 1.62.

Synthesis Example 11

Preparation of Ferrocenylalkenyl-Containing Silicon Bridged Bisindenyl Zirconocene Compound Me(FcCH═CH$_2$)Si(2-Me-7-p-tBuC$_6$H$_4$C$_9$H$_4$)$_2$ZrCl$_2$ (rac-MS-1i)

The implementation steps were the same as Example 1, wherein Me$_2$NCH═CH$_2$ was replaced with FcC≡CH (0.420 g, 2 mmol), and finally an orange-red solid rac-MS-1i 1.72 g (91.98%) was obtained. In FcC≡CH, Fc=CpFe(C$_5$H$_4$).

The composition was $C_{53}H_{58}Cl_2FeSiZr$(Mr=941.09): theoretical value: C, 67.64; H, 6.21; measured value: C, 67.71; H, 6.25.

Synthesis Example 12

Preparation of Ferrocenylalkenyl-Containing Silicon Bridged Bisindenyl Zirconocene Compound Me(FcCH$_2$CH$_2$)Si(2-Me-7-p-tBuC$_6$H$_4$C$_9$H$_4$)$_2$ZrCl$_2$ (rac-MS-1j)

The implementation steps were the same as in Example 1, wherein Me$_2$NCH═CH$_2$ was replaced of FcCH═CH$_2$ (0.424 g, 2 mmol), and finally an orange-red solid rac-MS-1j 1.63 g (87.17%). In FcCH═$CH_2$, Fc=CpFe($C_5H_4$).

The composition was $C_{53}H_{60}Cl_2FeSiZr$(Mr=943.10): theoretical value: C, 67.50; H, 6.41; measured value: C, 67.53; H, 6.43.

Synthesis Examples 13 and 14 Preparation of Precursors

Preparation of Hydrogen Silicon Bridged Bisindenyl Zirconocene Compound MeHSi(2-Me-7-p-$tBuC_6H_4C_9H_4)_2Zr(NMe_2)_2$ (rac-MS-2)

2-methyl-7-p-tert-butyl phenylindene (5.24 g, 20 mmol) was weighed and dissolved in tol (160 ml) solvent. N-butyl lithium (2.4 M, 8.5 ml, 20 mmol) was slowly dropwise added into the mixture at −78° C. After gradually warmed to the room temperature, the resulting mixture was reacted overnight to obtain a wine red solution. Methyldichlorosilane (1.04 ml, 10 mmol) was slowly dropwise added into the wine red solution at 78° C., followed by gradually warming to the room temperature and stirring for more than 8 hours to obtain a yellow suspension. The yellow suspension was filtered and LiCl precipitation was removed to obtain a yellow solution. tetramethylaminozirconium (2.68 g, 10 mmol) was added into the yellow solution under stirring, and heated to 70 to 100° C. for 12 hours. When it was cooled to room temperature, the volatile components were removed, and the remaining solid was recrystallized with toluene and hexane to obtain 4.83 g (64.9%) of orange crystalline solid rac-ms-2.

The composition was $C_{45}H_{60}N_2SiZr$(Mr=748.28): theoretical value: C, 72.23; H, 8.08; N, 3.74; measured value: C, 72.21; H, 8.05; N, 3.76.

Synthesis Example 13

Preparation of Aminoalkyl-Containing Silicon Bridged Bisindenyl Zirconocene Compound Me($PhMeNCH_2CH_2$)Si(2-Me-7-p-$tBuC_6H_4C_9H_4)_2Zr(NMe_2)$ (rac-MS-2a)

Rac-MS-2 (1.49 g, 2 mmol) was weighed and dissolved in Tol (100 mL) solvent. PhMeNCH═$CH_2$ (0.293 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain an orange solid rac-MS-2a 1.62 g (92.2%).

The composition was $C_{54}H_{71}N_3SiZr$(Mr=881.47): theoretical value: C, 73.58; H, 8.12; N, 4.77; measured value: C, 73.60; H, 8.14; N, 4.75.

Synthesis Example 14

Preparation of Ferrocenylalkenyl-Containing Silicon Bridged Bisindenyl Zirconocene Compound Me($FcCH_2CH_2$)Si(2-Me-7-p-$tBuC_6H_4C_9H_4)_2Zr(NMe_2)_2$ (rac-MS-2b)

The implementation steps were the same as Example 13, wherein PhMeNCH═$CH_2$ was replaced with FcCH═$CH_2$ (0.424 g, 2 mmol), and finally an orange-red solid meso-MS-1a 1.4 g (87.7%). In FcCH═$CH_2$, Fc=CpFe($C_5H_4$).

The composition was $C_{57}H_{72}N_2FeSiZr$(Mr=960.35): theoretical value: C, 71.29; H, 7.56; N, 2.93; measured value: C, 71.27; H, 7.56; N, 2.91.

Synthesis Examples 15 and 16 Preparation of Precursors

Preparation of Hydrogen Silicon-Based Bridged Bisindenyl Zirconocene Compound MeHSi(2-Me-7-$PhC_9H_4)_2ZrCl_2$ (MS-3)

2-methyl-7-phenylindene (4.13 g, 20 mmol) was weighed and dissolved in Tol (160 mL) solvent. N-butyllithium (2.4M, 8.5 mL, 20 mmol) was slowly dropwise added into the mixture at −78° C., gradually warmed to room temperature and reacted overnight to obtain a wine-red solution. Methyldichlorosilane (1.04 mL, 10 mmol) was slowly dropwise added into the solution at −78° C., and then gradually warmed to room temperature and stirred for more than 8 hours to obtain a yellow suspension. The yellow suspension was placed at −78° C., and n-butyllithium (2.4M, 8.5 mL, 20 mmol) was slowly dropwise added into the suspension. After warming to room temperature, stirring was continued for 2 h to obtain an orange-yellow turbid solution. Zirconium tetrachloride (2.33 g, 10 mmol) from a glove box was put into a vial, followed by adding 40 mL of toluene, and being placed under the nitrogen protection. Zirconium tetrachloride was added into the above yellow turbid liquid at room temperature, and soon the color would gradually darken from orange-yellow to brown-black. Reaction was carried out for 1 day. The reaction solution was filtered under the protection of nitrogen, the obtained filtrate was drained of solvent, washed with n-hexane, filtered and drained to obtain a yellow solid. The yellow solid was recrystallized from toluene in multiple steps at −20° C. to obtain 1.25 g (18.7%) of the racemic compound rac-MS-3 and 2.75 g (41.2%) of the meso-MS-3 compound.

The composition was $C_{33}H_{28}Cl_2SiZr$(Mr=614.79): theoretical value: C, 64.47; H, 4.59; measured value: C, 64.48; H, 4.61.

Synthesis Example 15

Preparation of Aminoalkyl-Containing Silicon Bridged Bisindenyl Zirconocene Compound Me($PhMeNCH_2CH_2$)Si(2-Me-7-$PhC_9H_4)_2ZrCl_2$ (rac-MS-3a)

Rac-MS-3 (1.34 g, 2 mmol) was weighed and dissolved in Tol (100 mL) solvent. PhMeNCH═$CH_2$ (0.293 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.41 g (87.4%) orange-red solid rac-MS-3a.

The composition was $C_{42}H_{39}Cl_2NSiZr$(Mr=747.98): theoretical value: C, 67.44; H, 5.26; N, 1.87; measured value: C, 67.42; H, 5.27; N, 1.86.

Synthesis Example 16

Preparation of Ferrocenylalkenyl-Containing Silicon Bridged Bisindenyl Zirconocene Compound Me($FcCH_2CH_2$)Si(2-Me-7-$PhC_9H_4)_2ZrCl_2$ (rac-MS-3b)

The implementation steps were the same as Synthesis Example 13, wherein PhMeNCH═$CH_2$ was replaced with FcCH═CH$_2$ (0.424 g, 2 mmol), and finally an orange-red solid rac-MS-3b 1.53 g (86.7%) was obtained. In FcCH═CH$_2$, Fc=CpFe($C_5H_4$).

The composition was $C_{45}H_{40}Cl_2FeSiZr$(Mr=826.86): theoretical value: C, 65.37: H, 4.88; measured value: C, 65.36; H, 4.89.

Preparation of Precursors of Synthesis Examples 16 and 17

Preparation of Hydrogen Silicon Bridged Bisfluorenyl Zirconocene Compound $MeHSiFlu_2ZrCl_2$(MS-4)

Fluorene (3.32 g, 20 mmol) was weighed and dissolved in Tol (160 mL) solvent. N-butyllithium (2.4M, 8.5 mL, 20 mmol) was slowly dropwise added into the mixture at −78° C. Then the resulting mixture was gradually warmed to room temperature and reacted overnight to obtain wine red solution. Methyldichlorosilane (1.04 mL, 10 mmol) was slowly added dropwise into the wine red solution at −78° C., and gradually warmed to room temperature and stirred for more than 8 hours to obtain a yellow suspension. The yellow suspension was placed at −78° C., and n-butyllithium (2.4M, 8.5 mL, 20 mmol) was slowly dropwise added into it. After warming to room temperature, stirring was continued for 2 h to obtain an orange-yellow turbid solution. Zirconium tetrachloride (2.33 g, 10 mmol) from a glove box was put into a vial, followed by adding 40 mL of toluene, and being placed under the nitrogen protection. Zirconium tetrachloride was added into the above yellow turbid liquid at room temperature, and soon the color would gradually darken from orange-yellow to brown-black. Reaction was carried out for 1 day. The reaction solution was filtered under the protection of nitrogen, the obtained filtrate was drained of solvent, washed with n-hexane, filtered and drained to obtain a yellow solid. The yellow solid was recrystallized from toluene at −20° C. to obtain 3.89 g (72.8%) of compound MS-4.

The composition was $C_{27}H_{20}Cl_2SiZr$(Mr=534.66): theoretical value: C, 60.66; H, 3.77; measured value: C, 60.64; H, 3.74.

Synthesis Example 17

Preparation of Aminoalkyl-Containing Silicon Bridged Bisferrocenyl Zirconocene Compound $Me(PhMeNCH_2CH_2)SiFlu_2ZrCl_2$ (MS-4a)

MS-4 (1.07 g, 2 mmol) was weighed and dissolved in Tol (100 mL) solvent. PhMeNCH═CH$_2$ (0.293 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain of orange solid MS-4a 1.21 g (90.6%).

The composition was $C_{36}H_3Cl_2NSiZr$(Mr=667.85): theoretical value: C, 64.74; H, 4.68; N, 2.10; measured value: C, 64.73; H, 4.71; N, 2.11.

Synthesis Example 18

Preparation of Ferrocenyl-Containing Alkyl Silicon Bridged Bisfluorenyl Zirconocene Compound $Me(FcCH_2CH_2)SiFlu_2ZrCl_2$ (MS-4b)

The implementation steps were the same as Synthesis Example 17, wherein PhMeNCH═CH$_2$ was replaced with FcCH═CH$_2$ (0.424 g, 2 mmol), and finally an orange-red solid MS-4b 1.32 g (88.4%) was obtained. In FcCH═CH$_2$, Fc=CpFe($C_5H_4$).

The composition was $C_{39}H_{32}Cl_2FeSiZr$(Mr=746.73): theoretical value: C, 62.73; H, 4.32; measured value: C, 62.72; H, 4.31.

Synthesis Example 19

Preparation of Me[(PhMeN$(CH_2)_5$)]Si(2-Me-7-Ph$C_9H_4$)$_2$ZrCl$_2$

Rac-MS-3 (1.34 g, 2 mmol) was weighed and dissolved in Tol (100 mL) solvent. PhMeN($CH_2$); CH═CH$_2$ (0.388 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.49 g (86.2%) of orange-red solid rac-MS-3c.

The composition was $C_{45}H_{45}Cl_2NSiZr$(Mr=790.97): theoretical value: C, 68.41; H, 5.74; N, 1.77; measured value: C, 68.44; H, 5.75; N, 1.76.

Synthesis Example 20

Preparation of Me[PhMeN$(CH_2)_8$]Si(2-Me-7-Ph$C_9H_4$)$_2$ZrCl$_2$

Rac-MS-3 (1.34 g, 2 mmol) was weighed and dissolved in Tol (100 mL) solvent. PhMeN$(CH_2)_6$CH═CH$_2$ (0.480 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.57 g (86.3%) of orange-red solid rac-MS-3d.

The composition was $C_{48}H_{51}Cl_2NSiZr$(Mr=832.15): theoretical value: C, 69.28; H, 6.18; N, 1.68; measured value: C, 69.25; H, 6.16; N, 1.70.

Synthesis Example 21

Preparation of Me[PhMeN$(CH_2)_{12}$]Si(2-Me-7-Ph$C_9H_4$)ZrCl$_2$

Rac-MS-3 (1.34 g, 2 mmol) was weighed and dissolved in Tol (100 mL) solvent. PhMeN$(CH_2)_9$CH═CH$_2$ (0.573 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.72 g (89.9%) of orange-red solid rac-MS-3e.

The composition was $C_{51}H_{57}Cl_2NSiZr$(Mr=874.23): theoretical value: C, 70.07; H, 6.57; N, 1.60; measured value: C, 70.04; H, 6.55; N, 1.60.

Synthesis Example 22

Preparation of Me[PhMeN$(CH_2)_{15}$]Si(2-Me-7-Ph$C_9H_4$)$_2$Zr$Cl_2$

Rac-MS-3 (1.34 g, 2 mmol) was weighed and dissolved in Tol (100 mL) solvent. PhMeN$(CH_2)_{12}$CH=$CH_2$ (0.666 g, 2.2 mmol) and B$(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.83 g (91.2%) of orange-red solid rac-MS-3f.

The composition was $C_{54}H_3Cl_2$NSiZr(Mr=916.31): theoretical value: C, 70.78; H, 6.93; N, 1.53; measured value: C, 70.76; H, 6.95; N, 1.52.

Synthesis Example 23

Preparation of Me[p-Cl$C_6H_4$MeN$(CH_2)_5$]Si(2-Me-7-Ph$C_9H_4$)$_2$Zr$Cl_2$

Rac-MS-3 (1.34 g, 2 mmol) was weighed and dissolved in Tol (100 mL) solvent. p-Cl$C_6H_4$MeN$(CH_2)_3$CH=$CH_2$ (0.461 g, 2.2 mmol) and B$(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.62 g (90.0%) of orange-red solid rac-MS-3 g.

The composition was $C_{45}H_{44}Cl_3$NSiZr(Mr=824.51): theoretical value: C, 65.55; H, 5.38; N, 1.70; measured value: C, 65.56; H, 5.36; N, 1.72.

Synthesis Example 24

Preparation of Me[p-MeO$C_6H_4$MeN$(CH_2)_5$]Si(2-Me-7-Ph$C_9H_4$)$_2$Zr$Cl_2$

Rac-MS-3 (1.34 g, 2 mmol) was weighed and dissolved in Tol (100 mL) solvent. p-MeO$C_6H_4$MeN$(CH_2)_3$CH=$CH_2$ (0.454 g, 2.2 mmol) and B$(C_6F_5)_3$ (0.051 g, 0.1 mmol, usage of 5%) was added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.60 g (89.2%) of orange-red solid rac-MS-3h.

The composition was $C_{46}H_{46}Cl_2$NOSiZr(Mr=819.09): theoretical value: C, 67.45; H, 5.66; N, 1.71; measured value: C, 67.47; H, 5.63; N, 1.72.

Synthesis Example 25

Preparation of Me[Fc$(CH_2)_5$]Si(2-Me-7-Ph$C_9H_4$)$_2$Zr$Cl_2$

Rac-MS-3 (1.34 g, 2 mmol) was weighed and dissolved in Tol (100 mL) solvent. Fc$(CH_2)_3$CH=$CH_2$ (0.559 g, 2.2 mmol) (note: Fc=CpFe$(C_5H_4)$) and B$(C_6F_5)_3$ (0.051 g, 0.1 mmol, 5% usage) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.67 g (87.9%) of orange-red solid rac-MS-3i.

The composition was $C_{48}H_{46}Cl_2$FeSiZr(Mr=868.95): theoretical value: C, 66.35; H, 5.34; measured value: C, 66.36; H, 5.33.

Synthesis Example 26

Preparation of Me(Fc$(CH_2)_8$)Si(2-Me-7-Ph$C_9H_4$)$_2$Zr$Cl_2$

Rac-MS-3 (1.34 g, 2 mmol) was weighed and dissolved in Tol (100 mL) solvent. Fc$(CH_2)_6$CH=$CH_2$ (0.652 g, 2.2 mmol)(note: Fc=CpFe$(C_5H_4)$) and B$(C_6F_5)_3$ (0.051 g, 0.1 mmol, 5% usage) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.72 g (86.3%) of orange-red solid rac-MS-3j.

The composition was $C_{51}H_{52}Cl_2$FeSiZr(Mr=911.03): theoretical value: C, 65.55; H, 5.38; measured value: C, 65.56; H, 5.37.

Synthesis Example 27

Preparation of Me[Fc$(CH_2)_{12}$]Si(2-Me-7-Ph$C_9H_4$)$_2$Zr$Cl_2$

Rac-MS-3 (1.34 g, 2 mmol) was weighed and dissolved in Tol (100 mL) solvent. Fc$(CH_2)_{10}$CH=$CH_2$ (0.775 g, 2.2 mmol) (note: Fc=CpFe$(C_5H_4)$) and B$(C_6F_5)_3$ (0.051 g, 0.1 mmol, usage of 5%) was added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.98 g (93.6%) of orange-red solid rac-MS-3k.

The composition was $C_{55}H_{60}Cl_2$FeSiZr(Mr=967.14): theoretical value: C, 68.31; H, 6.25; measured value: C, 68.34; H, 6.27.

Synthesis Example 28

Preparation of Me[Fc$(CH_2)_{15}$]Si(2-Me-7-Ph$C_9H_4$)$_2$Zr$Cl_2$

Rac-MS-3 (1.34 g, 2 mmol) was weighed and dissolved in Tol (100 mL) solvent. Fc$(CH_2)_{13}$CH=$CH_2$ (0.868 g, 2.2 mmol) (note: Fc=CpFe$(C_5H_4)$) and B$(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. After vacuum drying for 6 hours, 2.02 g (91.5%) of orange-red solid rac-MS-31 was obtained.

The composition was $C_{58}H_{66}Cl_2$FeSiZr(Mr=1009.22): theoretical value: C, 69.03; H, 6.59; measured value: C, 69.04; H, 6.57.

Synthesis Example 29

The metallocene compound with $R^I$ being methyl group and $R^{II}$ being an alkyl group can be synthesized by referring to the bridged SiH group addition method.

Preparation of MenBuSi(2-Me-7-$PhC_9H_4)_2ZrCl_2$

Rac-MS-3 (1.34 g, 2 mmol) was weighed and dissolved in Tol (100 mL) solvent. $CH_3CH_2CH{=}CH_2$ (0.123 g, 2.2 mmol) and $B(C_6F_5)_3$ (0.051 g, 0.1 mmol, usage of 5%) was added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. It was dried in vacuum for 6 hours to obtain 1.12 g (76.6%) of orange-red solid rac-MS-3m.

The composition was $C_{37}H_{36}Cl_2SiZr$(Mr=670.90): theoretical value: C, 66.24; H, 5.41; measured value: C, 66.23; H, 5.40.

Synthesis Example 30

Preparation of Me[n-$CH_3(CH_2)_7$]Si(2-Me-7-$PhC_9H_4)_2ZrCl_2$

Rac-MS-3 (1.34 g, 2 mmol) was weighed and dissolved in Tol (100 mL) solvent. $CH_3(CH_2)_5CH{=}CH_2$ (0.247 g, 2.2 mmol) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. After vacuum drying for 6 hours, 1.23 g (77.5%) of orange-red solid rac-MS-3n was obtained.

The composition was $C_{41}H_{44}Cl_2SiZr$(Mr=727.01): theoretical value: C, 67.74; H, 6.10; measured value: C, 67.72; H, 6.11.

Synthesis Example 31

Preparation of MeHSi(4-Ph-2-$MeC_9H_4$)(NtBu)$ZrCl_2$ 4-phenyl-2-methylindene (2.06 g, 10 mmol) was weighed and dissolved in Tol (80 ml) solvent. N-butyllithium (2.4M, 4.25 mL, 10 mmol) was slowly dropwise added into the mixture at −78° C., gradually warmed to room temperature and reacted overnight to obtain a wine-red solution. Methyldichlorosilane (1.04 mL, 10 mmol) was slowly dropwise added into the wine-red solution at −78° C., after gradually warming to room temperature, stirred for more than 8 hours to obtain a yellow suspension. The yellow suspension was placed at −78° C., and lithium tert-butylamine (0.79 g, 10 mmol) was slowly dropwise added into the suspension, and the stirring was continued for 2 h after returning to room temperature to obtain an orange-yellow turbid liquid. The orange-yellow turbid liquid was placed at −78° C., and n-butyllithium (2.4M, 8.5 mL, 20 mmol) was slowly dropwise added into the liquid. After returning to room temperature, stirring was continued for 2 h to obtain an orange-yellow turbid liquid. Zirconium tetrachloride (2.33 g, 10 mmol) from a glove box was put into a vial, followed by adding 40 mL of toluene, and being placed under the nitrogen protection. Zirconium tetrachloride was added into the above yellow turbid liquid at room temperature, and soon the color would gradually darken from orange-yellow to dark red. Reaction was carried out for 1 day. The reaction solution was filtered under the protection of nitrogen, the obtained filtrate was drained of solvent, washed with n-hexane, filtered and drained to obtain a red solid. The red solid was recrystallized in multiple steps at −20° C. from toluene to obtain the compound MeHSi(4-Ph-2-MeC9H4)(NtBu)$ZrCl_2$ 2.88 g (60.0%).

The composition was $C_{21}H_{25}Cl_2NSiZr$(Mr=481.65): theoretical value: C, 52.37; H, 5.23; N, 2.91; measured value: C, 52.40; H, 5.21; N, 2.90.

Synthesis Example 32

Preparation of Me[$Fc(CH_2)_5$]Si(4-Ph-2-$MeC_9H_4$)(NtBu)$ZrCl_2$ 的

MeHSi(4-Ph-2-$MeC_9H_4$)(NtBu)$ZrCl_2$ (0.96 g, 2 mmol) was weighed and dissolved in Tol (100 mL) solvent. $Fc(CH_2)_3CH{=}CH_2$ (0.559 g, 2.2 mmol)(note: Fc=CpFe($C_5H_4$)) and $B(C_6F_5)_3$ (0.051 g, 0.1 mmol, usage of 5%) were added into the mixture, heated to 50° C. and reacted for 24 h. All the volatile components were removed by vacuuming at room temperature, and the remaining solid was washed with a small amount (approximately 1.5 mL each time) n-hexane for 2 to 4 times. Vacuum drying for 6 hours. A dark red solid Me[$Fc(CH_2)_5$]Si(4-Ph-2-$MeC_9H_4$)(NtBu)$ZrCl_2$ 1.21 g (82.1%) was obtained.

The composition was $C_{36}H_{44}Cl_2FeNSiZr$(Mr=736.81): theoretical value: C, 58.68; H, 6.02; N, 1.90; measured value: C, 58.66; H, 6.03; N, 1.92.

B. Preparation of Metallocene Catalysts

Preparation Example 1

2 g of silica gel calcined at 600° C. was weighed, and 10 mL of 10% MAO toluene (weight percentage) was added into the silica gel, and heated to 80° C. After uniformly stirring, a toluene solution of the metallocene compound shown in formula 1 was added into the mixture, the Al/Zr ratio was controlled to be 200:1, and the reaction was carried out overnight. The solid was collected by filtration and washed with toluene solvent until the washed solvent was colorless, and the solid was dried under vacuum for 24 hours to obtain a solid powder, which was stored in a glove box for later use (this reaction operation method was used unless otherwise specified). Through the measurement and calculation of the feed amount and the metal content of the washing liquid, the catalyst SC-1 with a determined metal content could be obtained, and the zirconium content was 0.268% (29.4 μmol/g).

formula 1

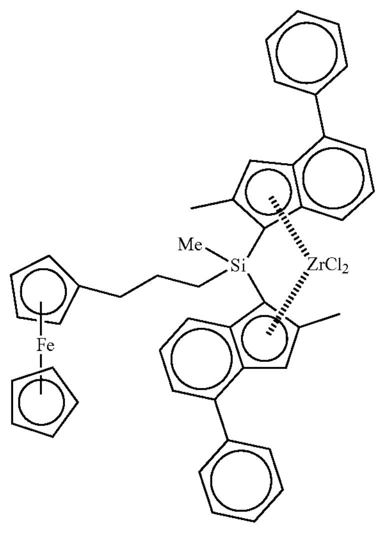

Preparation Example 2

2 g of silica gel calcined at 600° C. was weighed, 10 mL 10% MAO in toluene (weight percentage) and pure toluene solvent were added into the mixture, heated to 80° C., stirred for 24 h and then filtered. The solid was collected and washed with toluene solvent for 3 times. The solid was under vacuum drying for 24 h, and MAO-silica gel was obtained as a solid powder.

A certain amount of MAO-silica gel was weighed, toluene solvent was added to form a suspension. A toluene solution of zirconocene compound was added into the suspension under uniform stirring, and reacted overnight. The solid was collected by filtration and washed with toluene solvent until the washed solvent was colorless. The solid was vacuum dried for 24 hours to obtain a solid powder, which was stored in a glove box for later use. After the feed amount and the zirconium content of the washing liquid were measured and calculated, a catalyst with a certain zirconium content can be obtained.

The zirconocene compound of formula 1 was selected, with controlling the Al/Zr ratio to be 50:1, 100:1, and 150:1 to prepare catalysts SC-2A (zirconium content 0.846%, 100.2 μmol/g), SC-2B (zirconium content 0.430%, 47.2 μmol/g), SC-2C (zirconium content 0.282%, 32.2 μmol/g).

Preparation Example 3

Preparation steps were the same as those in Preparation Example 2. The metallocene compound as shown in formula 2 was used and the Al/Zr ratio was controlled to be 193:1, 227:1, 340:1, to obtain catalysts SC-3A (zirconium content 0.40%, 28.4 μmol/g), SC-3B (zirconium content 0.30%, 25.0 μmol/g), SC-3C (zirconium content 0.20%, 16.7 μmol/g) respectively.

formula 2

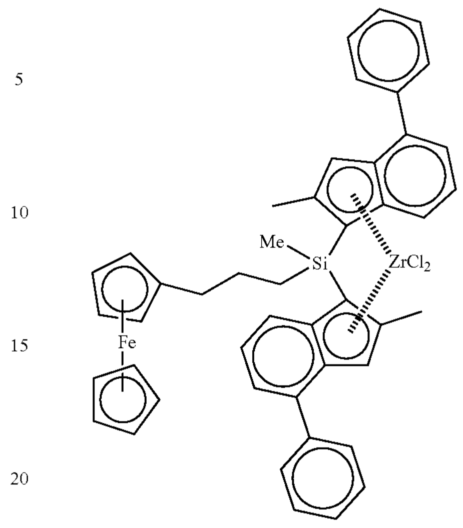

Preparation Example 4

Preparation steps were the same as those in Preparation Example 2. The metallocene compound as shown in formula 1 was used and the Al/Zr ratio was controlled to be 193:1, 194:1, 195:1, to obtain catalysts SC-4A (zirconium content 0.40%, 28.4 μmol/g), SC-4B (zirconium content 0.40%, 28.5 μmol/g), SC-4C (zirconium content 0.40%, 28.7 μmol/g) respectively.

Preparation Example 5

Preparation steps were the same as those in Preparation Example 2. The metallocene compound as shown in formula 3 was used and the Al/Zr ratio was controlled to be 50:1, 100:1, 200:1, to obtain catalysts SC-5A (zirconium content 0.854%, 106.3 μmol/g), SC-5B(zirconium content 0.441%, 49.2 μmol/g), SC-5C(zirconium content 0.277%, 30.8 μmol/g) respectively.

formula 3

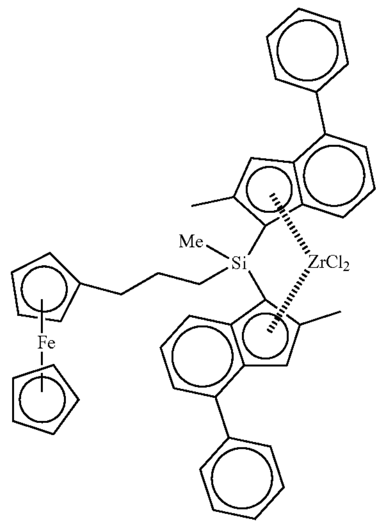

Preparation Example 6

Preparation steps were the same as those in Preparation Example 2. The metallocene compound as shown in formula 4 was used and the Al/Zr ratio was controlled to be 100:1, to obtain a catalyst SC-6 (zirconium content 0.453%, 51.2 μmol/g).

formula 4

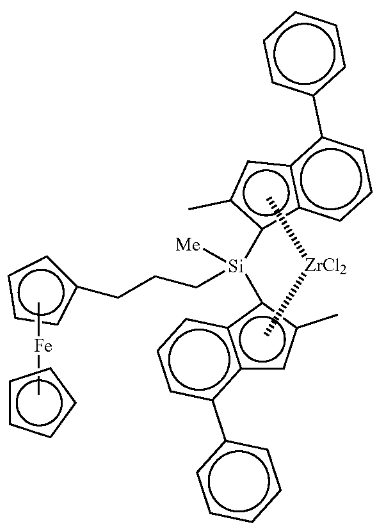

Preparation Example 7

Preparation steps were the same as those in Preparation Example 2. The metallocene compound as shown in formula 5 was used and the Al/Zr ratio was controlled to be 100:1, to obtain a catalyst SC-7 (zirconium content 0.441%, 48.7 μmol/g).

formula 5

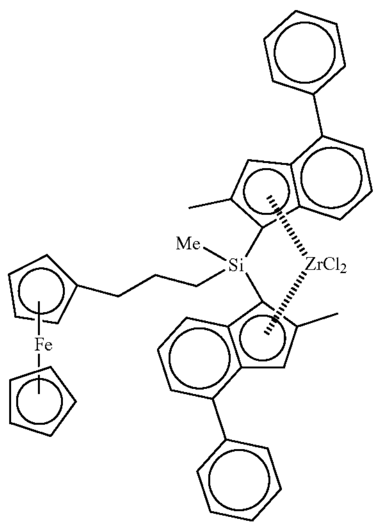

Preparation Example 8

Preparation steps were the same as those in Preparation Example 2. The metallocene compound as shown in formula 6 was used and the Al/Zr ratio was controlled to be 100:1, to obtain a catalyst SC-8 (zirconium content 0.437%, 50.7 μmol/g).

formula 6

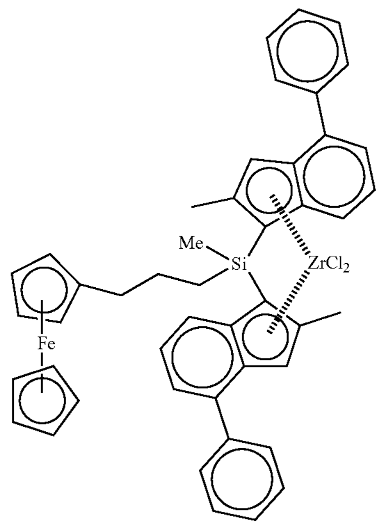

Preparation Example 9

Preparation steps were the same as those in Preparation Example 2. The metallocene compound as shown in formula 7 was used and the Al/Zr ratio was controlled to be 100:1, to obtain a catalyst SC-9 (zirconium content 0.463%, 52.4 μmol/g).

formula 7

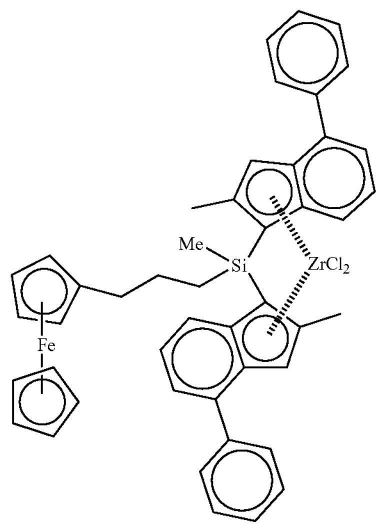

Preparation Example 10

Preparation steps were the same as those in Preparation Example 2. The metallocene compound as shown in formula 8 was used and the Al/Zr ratio was controlled to be 100:1, to obtain a catalyst SC-10 (zirconium content 0.425%, 47.1 μmol/g).

formula 8

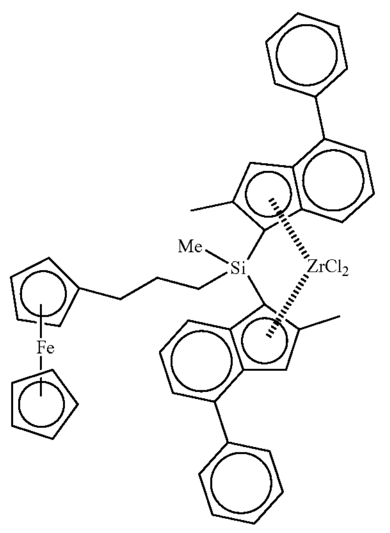

Preparation Example 11

Preparation steps were the same as those in Preparation Example 2. The metallocene compound as shown in formula 9 was used and the Al/Zr ratio was controlled to be 100:1, to obtain a catalyst SC-11 (zirconium content 0.439%, 48.3 μmol/g).

formula 9

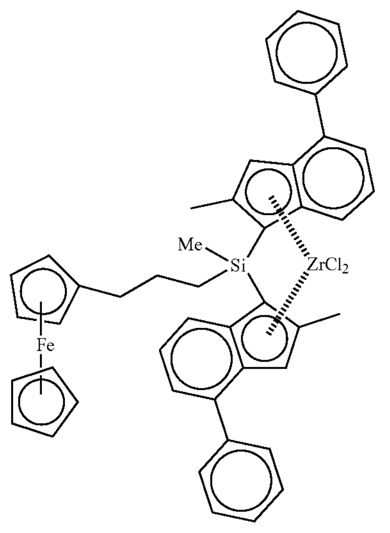

Preparation Example 12

Preparation steps were the same as those in Preparation Example 2. The metallocene compound as shown in formula 10 was used and the Al/Zr ratio was controlled to be 100:1, to obtain a catalyst SC-12 (zirconium content 0.482%, 52.1 μmol/g).

formula 10

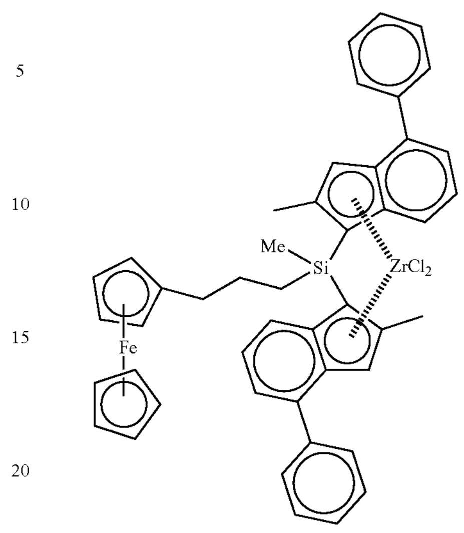

Preparation Example 13

Preparation steps were the same as those in Preparation Example 2. The metallocene compound as shown in formula 11 was used and the Al/Zr ratio was controlled to be 100:1, to obtain a catalyst SC-13 (zirconium content 0.501%, 54.3 μmol/g).

formula 11

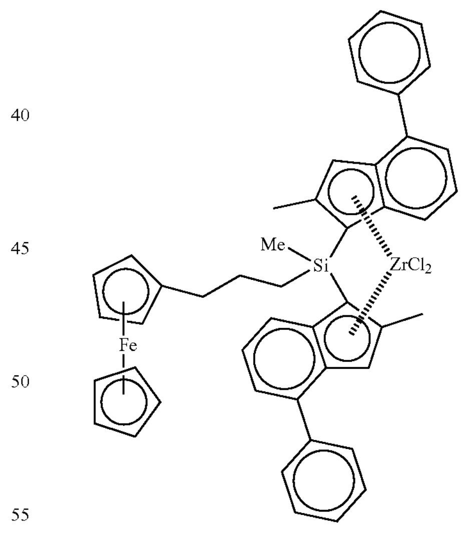

Preparation Example 14

Preparation steps were the same as those in Preparation Example 2. The metallocene compound as shown in formula 12 was used and the Al/Zr ratio was controlled to be 100:1, to obtain a catalyst SC-14 (zirconium content 0.410%, 44.6 μmol/g).

formula 12

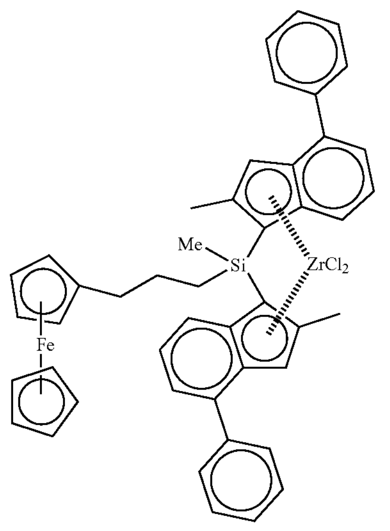

Preparation Example 15

2 g of silica gel calcined at 600° C. was weighed, 10 mL of 10% (weight percentage) MAO in toluene was added into it, 0.30 g of tetrakis (pentafluorophenyl) borate dioctadecyl methyl ammonium salt was added into the mixture. and then 10 mL of toluene was added into the mixture, and heated to 80° C., stirred for 24 h. The resulting mixture was filtered, and the solid was collected and washed with toluene solvent for 3 times. The solid was vacuum dried for 24 h to obtain 3.1 g of solid powdered carrier silica gel.

2 g of the treated carrier silica gel was weighed and 20 mL of toluene solvent was added into the carrier silica gel to form a suspension. 5 mL of toluene solution prepared by adding 100 mg of the zirconocene compound shown in Formula 12 was added into the suspension under uniformly stirring, and stirred at room temperature overnight. The solid was collected by filtration and washed with toluene solvent until the washed solvent was colorless. The solid was vacuum dried for 24 hours to obtain a solid catalyst powder (SC-15) with a Zr content of 0.390% by mass (42.39 μmol/g), which was stored in a glove box for later use.

Preparation Example 16

The only difference from Preparation Example 15 is that tris(pentafluorophenyl)borane of the same quality was used to replace tetrakis(pentafluorophenyl)borate dioctadecylmethylammonium salt and other conditions remained unchanged to obtain a solid catalyst 3.2 g, which has a tested zirconium content of 0.45% by mass.

Preparation Example 17

Preparation steps were the same as those in Preparation Example 2. The metallocene compound as shown in formula 13 was used and the Al/Zr ratio was controlled to be 100:1, to obtain a catalyst SC-16 (zirconium content 0.406%, 43.7 μmol/g).

formula 13

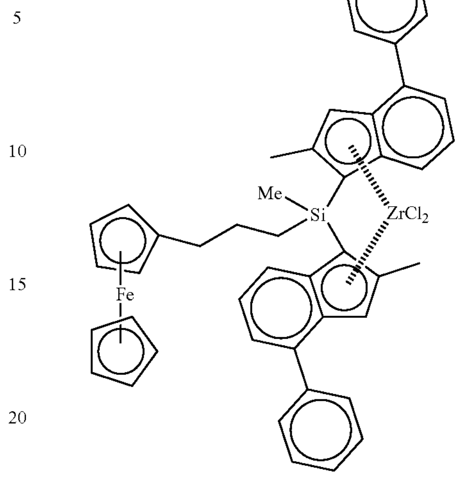

Preparation Example 18

Preparation steps were the same as those in Preparation Example 2. The metallocene compound as shown in formula 14 was used and the Al/Zr ratio was controlled to be 100:1, to obtain a catalyst SC-17 (zirconium content 0.415%, 45.9 μmol/g).

formula 14

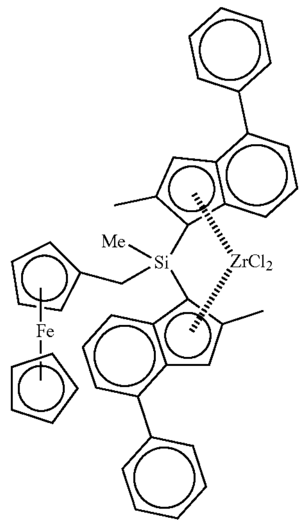

Preparation Example 19

Preparation steps were the same as those in Preparation Example 2. The metallocene compound as shown in formula 15 was used and the Al/Zr ratio was controlled to be 100:1, to obtain a catalyst SC-18 (zirconium content 0.371%, 40.2 μmol/g).

formula 15

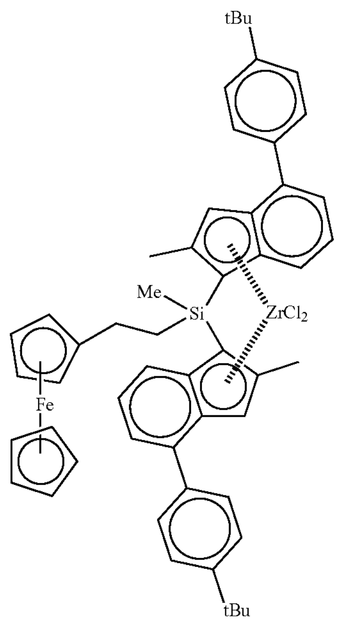

Preparation Example 20

Some of the metallocene compounds in Synthesis Examples 2-18 were taken to prepare catalysts for olefin polymerization. The preparation process was as follows:

2 g of silica gel calcined at 600° C. was weighed, 10 mL 10% (weight percentage) MAO in toluene and pure toluene solvent 40-100 mL was added in it, heated to 80° C., and stirred for 24 h. The resulting mixture was filtered, and the solid was collected and washed with toluene solvent for three times. Next, the solid was dried under vacuum for 24 hours to obtain a solid powder of MAO-silica gel.

A certain amount of MAO-silica gel was weighed, toluene solvent was added into it to form a suspension. A part of the toluene solution of the zirconocene compound of the examples was added into the suspension under uniformly stirring, and reacted overnight. The solid was collected by filtration and washed with toluene solvent until the washed solvent was colorless, and the solid was vacuum dried for 24 hours to obtain a solid powder, which was stored in a glove box for later use. After the feed amount and the zirconium content of the washing liquid were measured and calculated, a catalyst with a certain zirconium content could be obtained.

Among them:

Al/Zr ratio was controlled to be 200:1 and zirconocene compound rac-MS-1b was taken, to obtain a catalyst rac-MS-1b-C, wherein zirconium content was 0.268% (29.4 μmol/g).

Al/Zr ratio was controlled to be 50:1 and zirconocene compound rac-MS-1j was taken, to obtain a catalyst rac-MS-1j-C, wherein zirconium content was 0.846% (100.2 μmol/g).

Al/Zr ratio was controlled to be 100:1 and zirconocene compound rac-MS-3a was taken, to obtain a catalyst rac-MS-3a-C, wherein zirconium content was 0.430% (47.2 μmol/g).

Al/Zr ratio was controlled to be 200:1 and zirconocene compound rac-MS-3b was taken, to obtain a catalyst rac-MS-3b-C, wherein zirconium content was 0.268% (29.4 μmol/g).

Al/Zr ratio was controlled to be 200:1 and zirconocene compound rac-MS-4a was taken, to obtain a catalyst rac-MS-4a-C, wherein zirconium content was 0.268% (29.4 μmol/g).

Al/Zr ratio was controlled to be 200:1 and zirconocene compound rac-MS-4b was taken, to obtain a catalyst rac-MS-4b-C, wherein zirconium content was 0.268% (29.4 μmol/g).

Preparation Example 21

The metallocene compounds prepared in Synthesis Examples 19-32 were used to prepare the catalyst for olefin polymerization. The preparation process was as follows:

2 g of silica gel calcined at 600° C. was weighed, 10 mL 10% (weight percentage) MAO in toluene and pure toluene solvent 40-100 mL was added into it, heated to 80° C. and stirred for 24 h. The resulting mixture was filtered, and the solid was collected and washed with toluene solvent three times. Next, the solid was dried under vacuum for 24 hours to obtain a solid powder of MAO-silica gel.

A certain amount of MAO-silica gel was weighed, toluene solvent was added to form a suspension. A part of the toluene solution of the zirconocene compound of the examples was added into the mixture under uniformly stirring, and react overnight. The solid was collected by filtration and washed with toluene solvent until the washed solvent was colorless, and the solid was vacuum dried for 24 hours to obtain a solid powder, which was stored in a glove box for later use. After the feed amount and the zirconium content of the washing liquid were measured and calculated, a catalyst with a certain zirconium content could be obtained.

Among them:

Al/Zr ratio was controlled to be 200:1 and zirconocene compound $Me[(PhMeN(CH_2)_5)]Si(2\text{-}Me\text{-}7\text{-}PhC_9H_4)_2ZrCl_2$ was taken, to obtain a catalyst rac-MS-3c-C, wherein zirconium content was 0.268% (29.4 μmol/g).

Al/Zr ratio was controlled to be 200:1 and zirconocene compound $Me[PhMeN(CH_2)_5]Si(2\text{-}Me\text{-}7\text{-}PhC_9H_4)_2ZrC_2$ was taken, to obtain a catalyst rac-MS-3d-C, wherein zirconium content was 0.268% (29.4 μmol/g).

Al/Zr ratio was controlled to be 200:1 and zirconocene compound $Me[PhMeN(CH_2)_{12}]Si(2\text{-}Me\text{-}7\text{-}PhC_9H_4)_2ZrCl_2$ was taken, to obtain a catalyst rac-MS-3e-C, wherein zirconium content was 0.268% (29.4 μmol/g).

Al/Zr ratio was controlled to be 200:1 and zirconocene compound $Me[PhMeN(CH_2)_{15}]Si(2\text{-}Me\text{-}7\text{-}PhC_9H_4)_2ZrCl_2$ was taken, to obtain a catalyst rac-MS-3f-C, wherein zirconium content was 0.268% (29.4 μmol/g).

Al/Zr ratio was controlled to be 200:1 and zirconocene compound $Me[p\text{-}ClC_6H_4MeN(CH_2)_5]Si(2\text{-}Me\text{-}7\text{-}PhC_9H_4)_2ZrCl_2$ was taken, to obtain a catalyst rac-MS-3 g-C, wherein zirconium content was 0.268% (29.4 μmol/g).

Al/Zr ratio was controlled to be 200:1 and zirconocene compound $Me[p\text{-}MeOC_6H_4MeN(CH_2)_5]Si(2\text{-}Me\text{-}7\text{-}PhC_9H_4)\ ZrCl_2$ was taken, to obtain a catalyst rac-MS-3h-C, wherein zirconium content was 0.268% (29.4 μmol/g).

Al/Zr ratio was controlled to be 200:1 and zirconocene compound $Me[Fc(CH_2)_5]Si(2\text{-}Me\text{-}7\text{-}PhC_9H_4)_2ZrCl_2$ was taken, to obtain a catalyst rac-MS-3i, wherein zirconium content was 0.268% (29.4 μmol/g).

Al/Zr ratio was controlled to be 200:1 and zirconocene compound $Me(Fc(CH_2)_5)Si(2\text{-}Me\text{-}7\text{-}PhC_9H_4)_2ZrCl_2$ was taken, to obtain a catalyst rac-MS-3j, wherein zirconium content was 0.268% (29.4 μmol/g).

Al/Zr ratio was controlled to be 200:1 and zirconocene compound $Me[Fc(CH_2)_{12}]Si(2-Me-7-PhC_9H_4)_2ZrCl_2$ was taken, to obtain a catalyst rac-MS-3k-C, wherein zirconium content was 0.268% (29.4 μmol/g).

Al/Zr ratio was controlled to be 200:1 and zirconocene compound $Me[Fc(CH_2)_{15}]Si(2-Me-7-PhC_9H_4)_2ZrCl_2$ was taken, to obtain a catalyst rac-MS-3l, wherein zirconium content was 0.268% (29.4 μmol/g).

Al/Zr ratio was controlled to be 200:1 and zirconocene compound $MenBuSi(2-Me-7-PhC_9H_4)_2ZrCl_2$ was taken, to obtain a catalyst rac-MS-3m-C, wherein zirconium content was 0.268% (29.4 μmol/g).

Al/Zr ratio was controlled to be 200:1 and zirconocene compound $Me[n-CH_3(CH_2);]Si(2-Me-7-PhC_9H_4)_2ZrCl_2$ was taken, to obtain a catalyst rac-MS-3n-C, wherein zirconium content was 0.268% (29.4 μmol/g).

Al/Zr ratio was controlled to be 200:1 and compound $MeHSi(4-Ph-2-MeC_9H_4)(NtBu)ZrCl_2$ was taken, to obtain a catalyst rac-MS-3o-C, wherein zirconium content was 0.268% (29.4 μmol/g).

Al/Zr ratio was controlled to be 200:1 and zirconocene compound $Me[Fc(CH_2)_5]Si(4-Ph-2-MeC_9H_4)(NtBu)ZrCl_2$ was taken, to obtain a catalyst rac-MS-3p-C, wherein zirconium content was 0.268% (29.4 μmol/g).

C. Catalytic Reaction

Example 1

A 300 mL autoclave was selected, vacuumed in an oil bath at 100° C., and replaced with nitrogen for 3 times before use.

The pressurized catalyst adding device was dried and transferred into a glove box, added a measured amount of catalyst, and added a small amount of solvent to mix well. The device was took out from the glove box, and attached to the autoclave device to start the polymerization experiment.

The polymerization experiment conditions are as follows: setting a certain temperature, pressure and reaction time. Taking into account the industrial production and application, the polymerization experiments that have been completed gave priority to the choice of co-catalysts, that is, avoiding or minimizing the use of expensive MAO, and switching to using cheaper alkyl aluminum reagents. (If there was no special instructions below, this reaction method was used.)

200 mg of SC-1 catalyst was used, without using solvent, the reaction time was 30 minutes, the reaction temperature was 80° C., and 50 g of propylene was pressed into the device.

Finally, 23.5 g of polymer was obtained, and the calculated activity was $2.35\times10^6$ g(PP)·mol$^{-1}$(Zr)·h$^{-1}$.

Example 2

A 2000 mL autoclave was selected, vacuumed in an oil bath at 100° C., and replaced with nitrogen for 3 times before use.

105 mg of SC-2A catalyst and 8 mL of triisobutyl aluminum (concentration of 150 μmol/mL, aluminum-zirconium ratio of about 500:1) were used, the reaction time was 180 minutes, the reaction temperature was 75° C., and the pressure of propylene >3.9 MPa.

Finally, 92 g of polymer was obtained, and the calculated polymerization activity was $4.00\times10^7$ g(PP)·mol$^{-1}$(Zr)·h$^{-1}$. The Mn was 131324, the Mw was 325745, and the PDI value was 2.48, all of them were measured by the high temperature GPC; the isotacticity measured by the high temperature $^{13}$C NMR spectrum was [mmmm] 99.4%. The melting point test value was 151.33° C. (Note: PP analysis was selective.)

Example 3

A 2000 mL autoclave was selected, vacuumed in an oil bath at 100° C., and replaced with nitrogen for 3 times before use.

105 mg of SC-2B catalyst and 3.2 mL of triisobutyl aluminum (concentration of 150 μmol/mL, aluminum-zirconium ratio of about 200:1) were used, the reaction time was 180 minutes, the reaction temperature was 75° C., and the pressure of propylene >3.9 MPa.

Finally, 64 g of polymer was obtained, and the calculated polymerization activity was $2.78\times10^7$ g(PP)·mol$^{-1}$(Zr)·h$^{-1}$.

Example 4

A 2000 mL autoclave was selected, vacuumed in an oil bath at 100° C., and replaced with nitrogen for 3 times before use.

106 mg of SC-2C catalyst, triisobutyl aluminum 3.2 mL (concentration of 150 μmol/mL, aluminum-zirconium ratio of about 200:1) were used, the reaction time was 180 minutes, the reaction temperature was 75° C., and the pressure of propylene >3.9 MPa.

Finally, 57 g of polymer was obtained, and the calculated polymerization activity was $2.45\times10^7$ g(PP)·mol$^{-1}$(Zr)·h$^{-1}$.

Example 5

A 2000 mL autoclave was selected, vacuumed in an oil bath at 100° C., and replaced with nitrogen for 3 times before use.

105 mg of SC-3A catalyst and 8 mL of triisobutyl aluminum (concentration of 150 μmol/mL, aluminum-zirconium ratio of about 500:1) were used, the reaction time was 180 minutes, the reaction temperature was 75° C., and the pressure of propylene >3.9 MPa.

Finally, 80 g of polymer was obtained, and the calculated polymerization activity was $3.48\times10^7$ g(PP)·mol$^{-1}$(Zr)·h$^{-1}$. The Mn was 133064, the Mw was 313745, and the PDI value was 2.36, all of them were measured by the high temperature GPC; and the isotacticity measured by the high temperature $^{13}$C NMR spectrum was [mmmm] 99.3%. The melting point test value was 149.43° C.

Example 6

A 2000 mL autoclave was selected, vacuumed in an oil bath at 100° C., and replaced with nitrogen for 3 times before use.

105 mg of SC-3B catalyst and 3.2 mL of triisobutyl aluminum (concentration of 150 μmol/mL, aluminum-zirconium ratio of about 200:1) were used, the reaction time was 180 minutes, the reaction temperature was 75° C., and the pressure of propylene >3.9 MPa.

Finally, 52 g of polymer was obtained, and the calculated polymerization activity was $2.26\times10^7$ g(PP)·mol$^{-1}$(Zr)·h$^{-1}$.

Example 7

A 2000 mL autoclave was selected, vacuumed in an oil bath at 100° C., and replaced with nitrogen for 3 times before use.

SC-3C catalyst 106 mg and triisobutyl aluminum 3.2 mL (concentration of 150 μmol/mL, aluminum-zirconium ratio of about 200:1) were used, the reaction time was 180 minutes, the reaction temperature was 75° C., and the pressure of propylene >3.9 MPa.

Finally, 43 g of polymer was obtained, and the calculated polymerization activity was $1.85\times10^7$ g(PP)·$mol^{-1}$(Zr)·$h^{-1}$.

Example 8

A 2000 mL autoclave was selected, vacuumed in an oil bath at 100° C., and replaced with nitrogen for 3 times before use.

98 mg of SC-4A catalyst and 15 mL of triisobutyl aluminum (concentration of 150 mol/mL, aluminum-zirconium ratio of about 549:1) were used, the reaction time was 240 minutes, the reaction temperature was 75° C., and the amount of propylene was 528.7 g.

Finally, 450 g of polymer was obtained, and the calculated polymerization activity was $1.098\times10^8$ g(PP)·$mol^{-1}$(Zr)·$h^{-1}$. Mn was 162913, Mw was 377577, and PDI value was 2.317, all of them were measured by the high temperature GPC; the isotacticity measured by high temperature $^{13}C$ NMR spectrum was [mmmm] 99.6%. The melting point test value was 151.4° C.

Example 9

A 2000 mL autoclave was selected, vacuumed in an oil bath at 100° C., and replaced with nitrogen for 3 times before use.

SC-4A catalyst 60 mg and triisobutyl aluminum 15 mL (concentration of 150 μmol/mL, aluminum-zirconium ratio of about 896:1 amount) were used, the reaction time was 330 minutes, the reaction temperature was 75° C., and the amount of propylene was 518 g.

Finally, 860 g of polymer was obtained, and the calculated polymerization activity was $1.772\times10^8$ g(PP)·$mol^{-1}$(Zr)·$h^{-1}$. The Mn was 104205, the Mw was 226218, and the PDI value was 2.17, all of them were measured by the high temperature GPC; the isotacticity measured by the high temperature $^{13}C$ NMR spectrum was [mmmm] 98.4%. The melting point test value was 152.2/161.4° C.

Example 10

A 2000 mL autoclave was selected, vacuumed in an oil bath at 100° C., and replaced with nitrogen for 3 times before use.

SC-4A catalyst 60 mg and triethylaluminum 3 mL (concentration of 100 μmol/mL, aluminum-zirconium ratio of about 1195:1) were used, the reaction time was 180 minutes, the reaction temperature was 75° C., the amount of propylene 538 g, and the amount of hydrogen was 0.02 g.

Finally, 80 g of polymer was obtained, and the calculated polymerization activity was $3.186\times10^7$ g(PP)·$mol^{-1}$(Zr)·$h^{-1}$.

Example 11

A 2000 mL autoclave was selected, vacuumed in an oil bath at 100° C., and replaced with nitrogen for 3 times before use.

35 mg of SC-4A catalyst and 2.5 mL of triethylaluminum (concentration of 100 μmol/mL, aluminum-zirconium ratio of about 1707:1) were used, the reaction time was 180 minutes, the reaction temperature was 75° C., the amount of propylene was 512 g, and the amount of hydrogen was 0.02 g.

Finally, 35 g of polymer was obtained, and the calculated polymerization activity was $2.389\times10^7$ g(PP)·$mol^{-1}$(Zr)·$h^{-1}$.

Example 12

A 2000 mL autoclave was selected, vacuumed in an oil bath at 100° C., and replaced with nitrogen for 3 times before use.

SC-4A catalyst 65 mg and triisobutyl aluminum 20 mL (concentration of 150 μmol/mL, and aluminum zirconium ratio of about 1792:1 amount) were used, the reaction time was 270 minutes, the reaction temperature was 75° C., the amount of propylene was 659 g, the amount of hydrogen was 0.026 g.

Finally, 600 g of polymer was obtained, and the calculated polymerization activity was $2.206\times10^8$ g(PP)·$mol^{-1}$(Zr)·$h^{-1}$. The Mn was 80551, the Mw was 188015, and the PDI value was 2.33, all of them were measured by the high temperature GPC; the isotacticity measured by the high temperature $^{13}C$ NMR spectrum was [mmmm] 99.7%. The melting point test value was 151.83/152.2° C.

Example 13

A 2000 mL autoclave was selected, vacuumed in an oil bath at 100° C., and replaced with nitrogen for 3 times before use.

40 mg SC-4A catalyst and triisobutyl aluminum 20 mL (concentration of 150 μmol/mL, aluminum-zirconium ratio of about 1707:1 volume) were used, the reaction time was 180 minutes, the reaction temperature was 75° C., the amount of propylene was 628.6 g, and the amount of hydrogen was 1.365 g.

Finally, 270 g of polymer was obtained, and the calculated polymerization activity was $1.613\times10^8$ g(PP)·$mol^{-1}$(Zr)·$h^{-1}$.

Example 14

A 2000 mL autoclave was selected, vacuumed in an oil bath at 100° C., and replaced with nitrogen for 3 times before use.

SC-4A catalyst 30 mg, triisobutyl aluminum 20 mL (concentration of 150 μmol/mL, aluminum-zirconium ratio of about 2389:1 volume) were used, the reaction time was 360 minutes, the reaction temperature was 75° C., the amount of propylene was 658.8 g, and the amount of hydrogen was 0.052 g.

Finally, 390 g of polymer was obtained, and the calculated polymerization activity was $3.106\times10^8$ g(PP)·$mol^{-1}$(Zr)·$h^{-1}$. Mn was 47736, Mw was 146937, and PDI value was 3.08, all of them were measured by the high temperature GPC.

Example 15

A 2000 mL autoclave was selected, vacuumed in an oil bath at 100° C., and replaced with nitrogen for 3 times before use.

SC-4A catalyst 30 mg and triisobutyl aluminum 20 mL (concentration of 150 μmol/mL, aluminum-zirconium ratio of about 2389:1 volume) were used, the reaction time was 180 minutes, the reaction temperature was 75° C., the amount of propylene is 357.2 g, and the amount of hydrogen was 0.06 g.

Finally, 205 g of polymer was obtained, and the calculated polymerization activity was $1.633\times10^8$ g(PP)·mol$^{-1}$(Zr)·h$^{-1}$. The melting point test value was 154.03° C.

Example 16

A 2000 mL autoclave was selected, vacuumed in an oil bath at 100° C., and replaced with nitrogen for 3 times before use.

SC-4A catalyst 30 mg, triisobutyl aluminum 10 mL (concentration of 150 μmol/mL, aluminum-zirconium ratio of about 1195.1) were used, the reaction time was 420 minutes, the reaction temperature was 75° C., the amount of propylene was 682 g, and the amount of hydrogen was 0.06 g.

Finally, 540 g of polymer was obtained, and the calculated polymerization activity was $4.301\times10^8$ g(PP)·mol$^{-1}$(Zr)·h$^{-1}$.

Example 17

A 2000 mL autoclave was selected, vacuumed in an oil bath at 100° C., and replaced with nitrogen for 3 times before use.

SC-4A catalyst 20 mg and triisobutyl aluminum 3.5 mL (concentration of 150 μmol/mL, aluminum-zirconium ratio of about 627:1) were used, the reaction time was 180 minutes, the reaction temperature was 75° C., the amount of propylene was 657 g, and the amount of hydrogen was 0.06 g.

Finally, 10 g of polymer was obtained, and the calculated polymerization activity was $1.195\times10^7$ g(PP)·mol$^{-1}$(Zr)·h$^{-1}$.

Example 18

A 2000 mL autoclave was selected, vacuumed in an oil bath at 100° C., and replaced with nitrogen for 3 times before use.

SC-4A catalyst 20 mg and triisobutyl aluminum 7 mL (concentration of 150 μmol/mL, aluminum-zirconium ratio of about 1254:1) were used, the reaction time was 180 minutes, the reaction temperature was 75° C., the amount of propylene was 651 g, and the amount of hydrogen was 0.06 g.

Finally, 45 g of polymer was obtained, and the calculated polymerization activity was $5.376\times10^7$ g(PP)·mol$^{-1}$(Zr)·h$^{-1}$.

Example 19

A 2000 mL autoclave was selected, vacuumed in an oil bath at 100° C., and replaced with nitrogen for 3 times before use.

SC-4A catalyst 20 mg, triisobutyl aluminum 10 mL (concentration of 150 μl mol/mL, aluminum-zirconium ratio of about 1792:1 amount), the reaction time was 180 minutes, the reaction temperature was 75° C., the amount of propylene was 654 g, the amount of hydrogen was 0.06 g.

Finally, 82 g of polymer was obtained, and the calculated polymerization activity was $9.797\times10^7$ g(PP)·mol$^{-1}$(Zr)·h$^{-1}$.

Example 20

A 2000 mL autoclave was selected, vacuumed in an oil bath at 100° C., and replaced with nitrogen for 3 times before use.

SC-4A catalyst 20 mg and triisobutyl aluminum 10 mL (concentration of 150 μmol/mL, aluminum-zirconium ratio of about 1792:1 amount) were used, the reaction time was 180 minutes, the reaction temperature was 75° C., the amount of propylene was 652 g, and the amount of hydrogen was 0.06 g.

Finally, 92 g of polymer was obtained, and the calculated polymerization activity was $1.099\times10^8$ g(PP)·mol$^{-1}$(Zr)·h$^{-1}$.

Example 21

A 2000 mL autoclave was selected, vacuumed in an oil bath at 100° C., and replaced with nitrogen for 3 times before use.

SC-4A catalyst 30 mg and triisobutyl aluminum 10 mL (concentration of 150 μmol/mL, aluminum-zirconium ratio of about 1195:1 volume) were used, the reaction time was 420 minutes, the reaction temperature was 75° C., the amount of propylene was 670 g, and the amount of hydrogen was 0.06 g.

Finally, 530 g of polymer was obtained, and the calculated polymerization activity was $4.221\times10^8$ g(PP)·mol$^{-1}$(Zr)·h$^{-1}$.

Example 22

A 2000 mL autoclave was selected, vacuumed in an oil bath at 100° C., and replaced with nitrogen for 3 times before use.

SC-4B catalyst 30 mg and triisobutyl aluminum 10 mL (concentration of 150 μmol/mL, aluminum-zirconium ratio of about 1195:1) were used, the reaction time was 480 minutes, the reaction temperature was 75° C., the amount of propylene was 684 g, and the amount of hydrogen was 0.06 g.

Finally, 610 g of polymer was obtained, and the calculated polymerization activity was $4.859\times10^8$ g(PP)·mol$^{-1}$(Zr)·h$^{-1}$.

Example 23

A 2000 mL autoclave was selected, vacuumed in an oil bath at 100° C., and replaced with nitrogen for 3 times before use.

SC-4B catalyst 30 mg and triisobutyl aluminum 10 mL (concentration of 150 μmol/mL, aluminum-zirconium ratio of about 1195:1) were used, the reaction time was 240 minutes, reaction temperature was 75° C., the amount of propylene was 687.5 g, and the amount of hydrogen was 0.06 g.

Finally, 533 g of polymer was obtained, and the calculated polymerization activity was $4.245\times10^8$ g(PP)·mol$^{-1}$(Zr)·h$^{-1}$. The melting point test value was 155.46° C.

Example 24

A 2000 mL autoclave was selected, vacuumed in an oil bath at 100° C., and replaced with nitrogen for 3 times before use.

SC-4B catalyst 30 mg and triisobutyl aluminum 10 mL (concentration of 150 μmol/mL, aluminum-zirconium ratio of about 1195:1) were used, the reaction time was 240 minutes, the reaction temperature was 75° C., the amount of propylene was 688.6 g, and the amount of hydrogen was 0.06 g.

Finally, 405 g of polymer was obtained, and the calculated polymerization activity was $3.226\times10^8$ g(PP)·mol$^{-1}$(Zr)·h$^{-1}$.

Example 25

A 2000 mL autoclave was selected, vacuumed in an oil bath at 100° C., and replaced with nitrogen for 3 times before use.

SC-4C catalyst 30 mg and triisobutyl aluminum 10 mL (concentration of 150 μmol/mL, aluminum-zirconium ratio of about 1195:1) were used, the reaction time was 180 minutes, the reaction temperature was 75° C., the amount of propylene was 680 g, and the amount of hydrogen was 0.06 g.

Finally, 530 g of polymer was obtained, and the calculated polymerization activity was $4.221\times10^8$ g(PP)·$mol^{-1}$(Zr)·$h^{-1}$.

Example 26

A 2000 mL autoclave was selected, vacuumed in an oil bath at 100° C., and replaced with nitrogen for 3 times before use.

SC-4C catalyst 20 mg and triisobutyl aluminum 10 mL (concentration of 150 μmol/mL, aluminum-zirconium ratio of about 1792:1) were used, the reaction time was 180 minutes, the reaction temperature was 75° C., the amount of propylene was 681 g, and the amount of hydrogen was 0.06 g.

Finally, 145 g of polymer was obtained, and the calculated polymerization activity was $1.732\times10^8$ g(PP)·$mol^{-1}$(Zr)·$h^{-1}$.

Example 27

A 2000 mL autoclave was selected, vacuumed in an oil bath at 100° C., and replaced with nitrogen for 3 times before use.

98 mg of SC-5A catalyst and 15 mL of triisobutyl aluminum (concentration of 150 μmol/mL, aluminum to zirconium ratio of about 549:1 amount) were used, the reaction time was 240 minutes, the reaction temperature was 75° C., and the amount of propylene amount was 523 g.

Finally, 461 g of polymer was obtained, and the calculated polymerization activity was $1.106\times10^7$ g(PP)·$mol^{-1}$(Zr)·h. The Mn was 174912, the Mw was 366583, and the PDI value was 2.09, all of them were measured by the high temperature GPC; the isotacticity measured by the high temperature $^{13}C$ NMR spectrum was [mmmm] 98.4%. The melting point test value was 153.1° C.

Example 28

A 2000 mL autoclave was selected, vacuumed in an oil bath at 100° C., and replaced with nitrogen for 3 times before use.

SC-5B catalyst 60 mg and triisobutyl aluminum 15 mL (concentration of 150 μmol/mL, aluminum-zirconium ratio of about 896:1 amount) were used, the reaction time was 330 minutes, the reaction temperature was 75° C., and the amount of propylene was 521 g.

Finally, 451 g of polymer was obtained, and the calculated polymerization activity was $2.788\times10^7$ g(PP)·$mol^{-1}$(Zr)·$h^{-1}$. The Mn was 115708, the Mw was 236654, and the PDI value was 2.045, all of them were measured by the high temperature GPC; the isotacticity measured by the high temperature $^{13}C$ NMR spectrum was [mmmm] 99.1%. The melting point test value was 154.9° C.

Example 29

A 2000 mL autoclave was selected, vacuumed in an oil bath at 100° C., and replaced with nitrogen for 3 times before use.

SC-5C catalyst 60 mg and triethylaluminum 3 mL (concentration 100 μmol/mL, aluminum-zirconium ratio of about 1195:1) were used, the reaction time was 180 minutes, the reaction temperature was 75° C., the amount of propylene was 534 g, and the amount of hydrogen was 0.02 g.

Finally, 91 g of polymer was obtained, and the calculated polymerization activity was $1.641\times10^7$ g(PP)·$mol^{-1}$(Zr)·$h^{-1}$.

Example 30

A 2000 mL autoclave was selected, vacuumed in an oil bath at 100° C., and replaced with nitrogen for 3 times before use.

98 mg of SC-6 catalyst and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 541 g.

Finally, 424 g of polymer was obtained, and the calculated polymerization activity was $2.112\times10^7$ g(PP)·$mol^{-1}$(Zr)·$h^{-1}$. Mn was 168742, Mw was 368213, and PDI value was 2.18, all of them were measured by the high temperature GPC; the isotacticity measured by high temperature $^{13}C$ NMR spectrum was [mmmm] 98.9%. The melting point test value was 155.4° C.

Example 31

A 2000 mL autoclave was selected, vacuumed in an oil bath at 100° C., and replaced with nitrogen for 3 times before use.

100 mg of SC-7 catalyst and 15 mL of triisobutyl aluminum (concentration of 150 mol/mL, aluminum-zirconium ratio of about 549:1) were used, the reaction time was 240 minutes, the reaction temperature was 75° C., and the amount of propylene was 539 g.

Finally, 447 g of polymer was obtained, and the calculated polymerization activity was $2.294\times10^7$ g(PP)·$mol^{-1}$(Zr)·$h^{-1}$. The Mn was 19,863, the Mw was 398423, and the PDI value was 2.01, all of them were measured by the high temperature GPC; the isotacticity measured by the high temperature $^{13}C$ NMR spectrum was [mmmm] 99.2%. The melting point test value was 157.1° C.

Example 32

A 2000 mL autoclave was selected, vacuumed in an oil bath at 100° C., and replaced with nitrogen for 3 times before use.

100 mg of SC-8 catalyst, and 15 mL of triisobutyl aluminum (concentration of 150 μmol/mL, aluminum-zirconium ratio of about 549:1) were used, the reaction time was 240 minutes, the reaction temperature was 75° C., and the amount of propylene amount was 534 g.

Finally, 451 g of polymer was obtained, and the calculated polymerization activity was $2.223\times10^7$ g(PP)·$mol^{-1}$(Zr)·$h^{-1}$. The Mn was 215821, the Mw was 439429, and the PDI value was 2.036, all of them were measured by the high temperature GPC; the isotacticity measured by the high temperature $^{13}C$ NMR spectrum was [mmmm] 99.4%. The melting point test value was 159.1° C.

Example 33

A 2000 mL autoclave was selected, vacuumed in an oil bath at 100° C., and replaced with nitrogen for 3 times before use.

100 mg of SC-9 catalyst and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 544 g.

Finally, 472 g of polymer was obtained, and the calculated polymerization activity was $2.252\times10^7$ g(PP)·mol$^{-1}$(Zr)·h$^{-1}$. The Mn was 175941, the Mw was 419745, and the PDI value was 2.386, all of them were measured by the high temperature GPC; the isotacticity measured by the high temperature $^{13}$C NMR spectrum was [mmmm] 99.5%. The melting point test value was 161.4° C.

Example 34

A 2000 mL autoclave was selected, vacuumed in an oil bath at 100° C., and replaced with nitrogen for 3 times before use.

100 mg of SC-10 catalyst and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 521 g.

Finally, 469 g of polymer was obtained, and the calculated polymerization activity was $2.489\times10^7$ g(PP)·mol$^{-1}$(Zr)·h$^{-1}$. The Mn was 155967, the Mw was 430741, and the PDI value was 2.762, all of them were measured by the high temperature GPC; the isotacticity measured by the high temperature $^{13}$C NMR spectrum was [mmmm] 97.2%. The melting point test value was 147.9° C.

Example 35

A 2000 mL autoclave was selected, vacuumed in an oil bath at 100° C., and replaced with nitrogen for 3 times before use.

100 mg of SC-11 catalyst and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 521 g.

Finally, 471 g of polymer was obtained, and the calculated polymerization activity was $2.437\times10^7$ g(PP)·mol$^{-1}$(Zr)·h$^{-1}$. The Mn was 152134, the Mw was 416572, and the PDI value was 2.738, all of them were measured by the high temperature GPC; the isotacticity measured by the high temperature 13C NMR spectrum was [mmmm] 97.5%. The melting point test value was 148.1° C.

Example 36

A 2000 mL autoclave was selected, vacuumed in an oil bath at 100° C., and replaced with nitrogen for 3 times before use.

100 mg of SC-12 catalyst and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 529 g.

Finally, 487 g of polymer was obtained, and the calculated polymerization activity was $2.336\times10^7$ g(PP)·mol$^{-1}$(Zr)·h$^{-1}$. The Mn was 142879, the Mw was 396654, and the PDI value was 2.776, all of them were measured by the high temperature GPC; the isotacticity measured by the high temperature $^{13}$C NMR spectrum was [mmmm] 96.6%. The melting point test value was 144.7° C.

Example 37

A 2000 mL autoclave was selected, vacuumed in an oil bath at 100° C., and replaced with nitrogen for 3 times before use.

100 mg of SC-13 catalyst, and 15 mL of triisobutyl aluminum (concentration of 150 μmol/mL, aluminum-zirconium ratio of about 549:1) were used, the reaction time was 240 minutes, the reaction temperature was 75° C., and the amount of propylene was 542 g.

Finally, 469 g of polymer was obtained, and the calculated polymerization activity was $2.159\times10^7$ g(PP)·mol$^{-1}$(Zr)·h$^{-1}$. The Mn was 162678, the Mw was 396789, and the PDI value was 2.439, all of them were measured by the high temperature GPC; the isotacticity measured by the high temperature $^{13}$C NMR spectrum was [mmmm] 97.6%. The melting point test value was 152.9° C.

Example 38

A 2000 mL autoclave was selected, vacuumed in an oil bath at 100° C., and replaced with nitrogen for 3 times before use.

100 mg of SC-14 catalyst, and 15 mL of triisobutyl aluminum (concentration of 150 μmol/mL) were used, the reaction time was 240 minutes, the reaction temperature was 75° C., and the amount of propylene was 582 g.

Finally, 459 g of polymer was obtained, and the calculated polymerization activity was $2.573\times10^7$ g(PP)·mol$^{-1}$(Zr)·h$^{-1}$. Mn was 182668, Mw was 406769, and PDI value was 2.226, all of them were measured by the high temperature GPC; the isotacticity measured by high temperature $^{13}$C NMR spectrum was [mmmm] 95.6%. The melting point test value was 147.9° C.

Example 39

A 2000 mL autoclave was selected, vacuumed in an oil bath at 100° C., and replaced with nitrogen for 3 times before use.

100 mg of SC-15 catalyst, and 15 mL of triisobutyl aluminum (concentration of 150 μmol/mL) were used, the reaction time was 240 minutes, the reaction temperature was 75° C., and the amount of propylene was 552 g.

Finally, 485 g of polymer was obtained. The PDI value measured by high temperature GPC was 2.028; the isotacticity measured by high temperature $^{13}$C NMR spectrum was [mmmm] 96.3%. The melting point test value was 148.5° C.

Example 40

The evaluation conditions were the same as in Example 39, and the catalyst prepared in Example 16 was used. 560 g of propylene was used and 300 g of polypropylene powder was obtained. The PDI measured by GPC was 2.678, and the isotacticity measured by the high temperature $^{13}$C NMR spectrum was [mmmm] 92.6%. The melting point test value was 145.1° C.

Example 41

A 2000 mL autoclave was selected, vacuumed in an oil bath at 100° C., and replaced with nitrogen for 3 times before use.

100 mg of SC-16 catalyst and 15 mL of triisobutyl aluminum (concentration of 150 μmol/mL) were used, the reaction time was 240 minutes, the reaction temperature was 75° C., and the amount of propylene was 582 g.

Finally, 418 g of polymer was obtained, and the calculated polymerization activity was $2.434\times10^7$ g(PP)·mol$^{-1}$(Zr)·h$^{-1}$. The Mn was 172761, the Mw was 435432, and the PDI value was 2.520, all of them were measured by the high temperature GPC; the isotacticity measured by the high temperature $^{13}C$ NMR spectrum was [mmmm] 96.7%. The melting point test value was 148.8° C.

Example 42

A 2000 mL autoclave was selected, vacuumed in an oil bath at 100° C., and replaced with nitrogen for 3 times before use.

100 mg of SC-17 catalyst, and 15 mL of triisobutyl aluminum (concentration of 150 μmol/mL) were used, the reaction time was 240 minutes, the reaction temperature was 75° C., and the amount of propylene was 582 g.

Finally, 401 g of polymer was obtained, and the calculated polymerization activity was $2.248\times10^7$ g(PP)·$mol^{-1}$(Zr)·$h^{-1}$. The Mn was 123758, the Mw was 467327, and the PDI value was 3.776, all of them were measured by the high temperature GPC; the isotacticity measured by the high temperature $^{13}C$ NMR spectrum was [mmmm] 92.4%. The tested melting point was 140.2° C.

Example 43

A 2000 mL autoclave was selected, vacuumed in an oil bath at 100° C., and replaced with nitrogen for 3 times before use.

100 mg of SC-18 catalyst, and 15 mL of triisobutyl aluminum (concentration of 150 μmol/mL) were used, the reaction time was 240 minutes, the reaction temperature was 75° C., and the amount of propylene was 582 g.

Finally, 491 g of polymer was obtained, and the calculated polymerization activity was $2.752\times10^7$ g(PP) $mol^{-1}$(Zr)·$h^{-1}$. The Mn was 186469, the Mw was 404219, and the PDI value was 2.168, all of them were measured by the high temperature GPC; the isotacticity measured by the high temperature $^{13}C$ NMR spectrum was [mmmm] 97.2%. The melting point test value was 148.7° C.

Example 44

A 300 mL autoclave was used for the polymerization reaction (300 mL reactor was used in the following examples unless otherwise specified), vacuumed in an oil bath at 100° C., and replaced with nitrogen for 3 times before use.

The pressurized catalyst adding device was dried and transferred into a glove box, added a measured amount of catalyst, and added a small amount of solvent to mix well. The device was took out from the glove box, and attached to the autoclave device to start the polymerization experiment.

The polymerization experiment conditions are as follows: setting a certain temperature, pressure and reaction time. Taking into account the industrial production and application, the polymerization experiments that have been completed gave priority to the choice of co-catalysts, that is, avoiding or minimizing the use of expensive MAO, and switching to using cheaper alkyl aluminum reagents.

50 mg of rac-MS-1b-C catalyst and 2 mL of triisobutyl aluminum (concentration of 150 μmol/mL, aluminum/zirconium ratio of about 200) were used, the reaction time was 60 minutes, the reaction temperature was 50° C., and the ethylene pressure in the autoclave was 1 MPa.

Finally, 10 g of polymer was obtained, and the calculated polymerization activity was $6.8\times10^6$ g(PE)·$mol^{-1}$(Zr)·$h^{-1}$.

Example 45

The polymerization conditions were basically the same as in Example 44, except that 50 mg of rac-MS-1b-C catalyst and 2 mL of triisobutyl aluminum (concentration of 150 μmol/mL, aluminum/zirconium ratio of about 200), the reaction time was 60 minutes, the reaction temperature was 50° C., and the ethylene pressure was 2 MPa.

Finally, 16 g of polymer was obtained, and the calculated polymerization activity was $1.08\times10^7$ g(PE)·$mol^{-1}$(Zr)·$h^{-1}$.

Example 46

The polymerization conditions were basically the same as those in Example 44, except that 150 mg of rac-MS-1b-C catalyst and 0.2 mL of MAO (10% by mass in Tol, aluminum/zirconium ratio of about 200:1) were used, the reaction time was 60 minutes, the reaction temperature was 50° C., and the ethylene pressure was 1 MPa.

Finally, 35 g of polymer was obtained, and the calculated polymerization activity was 6.99'$10^6$ g(PE)·$mol^{-1}$(Zr)·$h^{-1}$.

Example 47

The polymerization conditions were basically the same as those in Example 44, except that: 113 mg of rac-MS-1j-C catalyst and 15 mL of triisobutyl aluminum solution (concentration of 150 μmol/mL, aluminum/zirconium ratio of about 200:1) were used, the reaction time was 60 minutes, the reaction temperature was 50° C., and the ethylene pressure was 1 MPa.

Finally, 10 g of polymer was obtained, and the calculated polymerization activity was $0.88\times10^6$ g(PE)·$mol^{-1}$(Zr)·$h^{-1}$.

Example 48

The polymerization conditions were basically the same as those in Example 44, except that: 150 mg of rac-MS-3a-C catalyst and 6.3 mL of triisobutyl aluminum (concentration of 150 μmol/mL, aluminum/zirconium ratio of about 200:1) were used, the reaction time was 60 minutes, the reaction temperature was 50° C., and the ethylene pressure was 1 MPa.

Finally, 21 g of polymer was obtained, and the calculated polymerization activity was $4.45\times10^6$ g(PE)·$mol^{-1}$(Zr)·$h^{-1}$.

Example 49

The polymerization conditions were basically the same as those in Example 44, except that 150 mg of rac-MS-3b-C catalyst and 1.75 mL of triisobutyl aluminum (concentration of 150 μmol/mL, aluminum-zirconium ratio of about 200:1) were used, the reaction time was 60 minutes, the reaction temperature was 50° C., and the ethylene pressure was 1 MPa.

Finally, 36 g of polymer was obtained, and the calculated polymerization activity was $2.74\times10^7$ g(PE)·$mol^{-1}$(Zr)·$h^{-1}$.

Example 50

The polymerization conditions were basically the same as those in Example 44, except that 150 mg of rac-MS-4a-C catalyst and 6.3 mL of triisobutyl aluminum (concentration of 150 μmol/mL, aluminum/zirconium ratio of about 200:1) were used, the reaction time was 60 minutes, the reaction temperature was 50° C., and the ethylene pressure was 1 MPa.

Finally, 54 g of polymer was obtained, and the calculated polymerization activity was $1.22\times10^7$ g(PE)·$mol^{-1}$(Zr)·$h^{-1}$.

Example 51

The polymerization conditions were basically the same as those in Example 44, except that 150 mg of rac-MS-4b-C catalyst and 3.75 mL of triisobutyl aluminum (concentration of 150 μmol/mL, aluminum-zirconium ratio of about 200:1) were used, the reaction time was 60 minutes, the reaction temperature was 50° C., and the ethylene pressure was 2 MPa.

Finally, 62 g of polymer was obtained, and the calculated polymerization activity was $1.41\times10^7$ g(PE)·$mol^{-1}$(Zr)·$h^{-1}$.

Example 52

A 2000 mL autoclave was selected, vacuumed in an oil bath at 100° C., and replaced with nitrogen for 3 times before use.

112 mg of rac-MS-1b-C catalyst and 8 mL of triisobutyl aluminum (concentration of 150 μmol/mL, aluminum-zirconium ratio of about 500:1) were used, the reaction time was 180 minutes, the reaction temperature was 75° C., the propylene pressure>3.9 MPa.

Finally, 91 g of the polymer was obtained, and the calculated polymerization activity was $9.20\times10^6$ g(PP)·$mol^{-1}$(Zr)·$h^{-1}$. The Mn was 133945, the Mw was 342375, and the PDI value was 2.57, all of them were measured by the high temperature GPC; the isotacticity measured by the high temperature $^{13}C$ NMR spectrum was [mmmm] 99.3%. The melting point test value was 157.63° C.

Example 53

A 2000 mL autoclave was selected, vacuumed in an oil bath at 100° C., and replaced with nitrogen for 3 times before use.

101 mg of rac-MS-1j-C catalyst and 3.2 mL of triisobutylaluminum (concentration of 150 μmol/mL, aluminum-zirconium ratio of about 200:1) were used, the reaction time was 180 minutes, the reaction temperature was 75° C., and the propylene pressure >3.9 MPa.

Finally, 132 g of polymer was obtained, and the calculated polymerization activity was $4.33\times10^6$ g(PP)·$mol^{-1}$(Zr)·$h^{-1}$. The Mn was 127361, the Mw was 36.431, and the PDI value was 2.83, all of them were measured by the high temperature GPC; the isotacticity measured by the high temperature $^{13}C$ NMR spectrum was [mmmm] 98.6%. The melting point test value was 152.3° C.

Example 54

A 2000 mL autoclave was selected, vacuumed in an oil bath at 100° C., and replaced with nitrogen for 3 times before use.

104 mg of rac-MS-1b-C catalyst and 15 mL of triisobutylaluminum (concentration of 150 μmol/mL, aluminum-zirconium ratio of about 549:1) were used, the reaction time was 240 minutes, the reaction temperature was 75° C., and the amount of propylene was 528.7 g.

Finally, 412 g of polymer was obtained, and the calculated polymerization activity was $3.37\times10^7$ g(PP)·$mol^{-1}$(Zr)·$h^{-1}$. The Mn was 173453, the Mw was 394257, and the PDI value was 2.273, all of them were measured by the high temperature GPC; the isotacticity measured by the high temperature $^{13}C$ NMR spectrum was [mmmm] 99.1%. The melting point test value was 154.4° C.

Example 55

A 2000 mL autoclave was selected, vacuumed in an oil bath at 100° C., and replaced with nitrogen for 3 times before use.

104 mg of rac-MS-1b-C catalyst and 15 mL of triethylaluminum (concentration of 150 μmol/mL, aluminum-zirconium ratio of about 549:1) were used, the reaction time was 240 minutes, the reaction temperature was 75° C., the amount of propylene was 538 g, and the amount of hydrogen was 0.02 g.

Finally, 478 g of polymer was obtained, and the calculated polymerization activity was $1.54\times10^7$ g(PP)·$mol^{-1}$(Zr)·$h^{-1}$. The Mn was 135427, the Mw was 397892, and the PDI value was 2.938, all of them were measured by the high temperature GPC; the isotacticity measured by the high temperature $^{13}C$ NMR spectrum was [mmmm] 98.4%. The melting point test value was 153.2° C.

Example 56

A 2000 mL autoclave was selected, vacuumed in an oil bath at 100° C., and replaced with nitrogen for 3 times before use.

35 mg of rac-MS-1j-C catalyst and 2.5 mL of triethylaluminum (concentration of 100 μmol/mL, aluminum-zirconium ratio of about 1707:1) were used, the reaction time was 180 minutes, the reaction temperature was 75° C., the amount of propylene was 512 g, and the amount of hydrogen was 0.02 g.

Finally, 135 g of polymer was obtained, and the calculated polymerization activity was $4.37\times10^7$ g(PP)·$mol^{-1}$(Zr)·$h^{-1}$. The Mn was 82451, the Mw was 213509, and the PDI value was 2.59, all of them were measured by the high temperature GPC; the isotacticity measured by the high temperature $^{13}C$ NMR spectrum was [mmmm] 96.7%. The melting point test value was 147.83/150.2° C.

Example 57

A 2000 mL autoclave was selected, vacuumed in an oil bath at 100° C., and replaced with nitrogen for 3 times before use.

35 mg of rac-MS-3c-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 469 g of polymer was obtained, and the calculated polymerization activity was $1.52\times10^8$ g(PP)·$mol^{-1}$(Zr)·$h^{-1}$.

Example 58

A 2000 mL autoclave was selected, vacuumed in an oil bath at 100° C., and replaced with nitrogen for 3 times before use.

35 mg of rac-MS-3d-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 455 g of polymer was obtained, and the calculated polymerization activity was $1.47\times10^8$ g(PP)·$mol^{-1}$(Zr)·$h^{-1}$.

Example 59

A 2000 mL autoclave was selected, vacuumed in an oil bath at 100° C., and replaced with nitrogen for 3 times before use.

35 mg of rac-MS-3e-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 492 g of polymer was obtained, and the calculated polymerization activity was $1.59\times10^8$ g(PP)·mol$^{-1}$(Zr)·h$^{-1}$.

Example 60

A 2000 mL autoclave was selected, vacuumed in an oil bath at 100° C., and replaced with nitrogen for 3 times before use.

35 mg of rac-MS-3f-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 421 g of polymer was obtained, and the calculated polymerization activity was $1.36\times10^8$ g(PP)·mol$^{-1}$(Zr)·h$^{-1}$.

Example 61

A 2000 mL autoclave was selected, vacuumed in an oil bath at 100° C., and replaced with nitrogen for 3 times before use.

35 mg of rac-MS-3 g-C catalyst and 2.5 mL of triethylaluminum (concentration of 100 μmol/mL, aluminum-zirconium ratio of about 1200:1), the reaction time was 180 minutes, the reaction temperature was 75° C., the amount of propylene is 512 g, and the amount of hydrogen was 0.02 g.

Finally, 387 g of polymer was obtained, and the calculated polymerization activity was $1.25\times10^8$ g(PP)·mol$^{-1}$(Zr)·h$^{-1}$.

Example 62

A 2000 mL autoclave was selected, vacuumed in an oil bath at 100° C., and replaced with nitrogen for 3 times before use.

35 mg of rac-MS-3h-C catalyst, 2.5 mL of triethylaluminum (concentration of 100 μmol/mL, the ratio of aluminum to zirconium was about 1200:1) were used, the reaction time was 180 minutes, the reaction temperature was 75° C., the amount of propylene is 512 g, and the amount of hydrogen was 0.02 g.

Finally, 418 g of polymer was obtained, and the calculated polymerization activity was $1.35\times10^8$ g(PP)·mol$^{-1}$(Zr)·h$^{-1}$.

Example 63

A 2000 mL autoclave was selected, vacuumed in an oil bath at 100° C., and replaced with nitrogen for 3 times before use.

35 mg of rac-MS-3i-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 441 g of polymer was obtained, and the calculated polymerization activity was $1.43\times10^8$ g(PP)·mol$^{-1}$(Zr)·h$^{-1}$.

Example 64

A 2000 mL autoclave was selected, vacuumed in an oil bath at 100° C., and replaced with nitrogen for 3 times before use.

35 mg of rac-MS-3j-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 427 g of polymer was obtained, and the calculated polymerization activity was $1.38\times10^8$ g(PP)·mol$^{-1}$(Zr)·h$^{-1}$.

Example 65

A 2000 mL autoclave was selected, vacuumed in an oil bath at 100° C., and replaced with nitrogen for 3 times before use.

35 mg of rac-MS-3k-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 434 g of polymer was obtained, and the calculated polymerization activity was $1.41\times10^8$ g(PP)·mol$^{-1}$(Zr)·h$^{-1}$.

Example 66

A 2000 mL autoclave was selected, vacuumed in an oil bath at 100° C., and replaced with nitrogen for 3 times before use.

35 mg of rac-MS-3l-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 395 g of polymer was obtained, and the calculated polymerization activity was $1.27\times10^8$ g(PP)·mol$^{-1}$(Zr)·h$^{-1}$.

Example 67

A 2000 mL autoclave was selected, vacuumed in an oil bath at 100° C., and replaced with nitrogen for 3 times before use.

35 mg of rac-MS-3p-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 352 g of polymer was obtained, and the calculated polymerization activity was $1.14'10^8$ g(PP)·mol$^{-1}$(Zr)·h$^{-1}$.

Comparative Example 1

A 2000 mL autoclave was selected, vacuumed in an oil bath at 100° C., and replaced with nitrogen for 3 times before use.

35 mg of rac-MS-3m-C catalyst and 2.5 mL of triethylaluminum (concentration of 100 μmol/mL, aluminum-zirconium ratio of about 1200:1), the reaction time was 180 minutes, the reaction temperature was 75° C., the amount of propylene was 512 g, and the amount of hydrogen was 0.02 g.

Finally, 425 g of polymer was obtained, and the calculated polymerization activity was $1.38\times10^8$ g(PP)·mol$^{-1}$(Zr)·h$^{-1}$.

Comparative Example 2

A 2000 mL autoclave was selected, vacuumed in an oil bath at 100° C., and replaced with nitrogen for 3 times before use.

35 mg of rac-MS-3n-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 420 g of polymer was obtained, and the calculated polymerization activity was $1.36\times10^{8}$ g(PP)·$mol^{-1}$(Zr)·$h^{-1}$.

Comparative Example 3

A 2000 mL autoclave was selected, vacuumed in an oil bath at 100° C., and replaced with nitrogen for 3 times before use.

35 mg of rac-MS-3o-C catalyst and 2.5 mL of triethylaluminum (concentration of 100 μmol/mL, aluminum-zirconium ratio of about 1200:1) were used, the reaction time was 180 minutes, the reaction temperature was 75° C., the amount of propylene was 512 g, and the amount of hydrogen was 0.02 g.

Finally, 268 g of polymer was obtained, and the calculated polymerization activity was $8.68\times10^{7}$ g(PP)·$mol^{-1}$(Zr)·$h^{-1}$.

For easy comparison and analysis, the above experimental data are summarized in the following tables.

TABLE 1

| | | | | | | | | Polymerization product properties | | | | |
|---|---|---|---|---|---|---|---|---|---|---|---|---|
| | | Catalyst Al/Zr | Reaction Al/Zr | Metallocene compound | | | Catalyst | | | | | Melting point |
| Item | Catalyst | ratio | ratio | $R^I$ | $R^{II}$ | $(Cp^{III})_n(E)_{2-n}$ | Activity | Mn | Mw | PDIvvalue | Isotacticity (%) | (° C.) |
| Example 1 | SC-1 | 200:1 | — | Me | $PhMeNH_2CH_2CH_2C$ | $(4\text{-}Ph\text{-}2\text{-}MeC_9H_4)_2$ | 2.35 | — | — | — | — | — |
| Example 2 | SC-2A | 50:1 | 500:1 | Me | $PhMeNH_2CH_2CH_2C$ | $(4\text{-}Ph\text{-}2\text{-}MeC_9H_4)_2$ | 40 | 131324 | 325745 | 2.48 | 99.4 | 151.33 |
| Example 3 | SC-2B | 100:1 | 200:1 | Me | $PhMeNH_2CH_2CH_2C$ | $(4\text{-}Ph\text{-}2\text{-}MeC_9H_4)_2$ | 27.8 | — | — | — | — | — |
| Example 4 | SC-2C | 150:1 | 200:1 | Me | $PhMeNH_2CH_2CH_2C$ | $(4\text{-}Ph\text{-}2\text{-}MeC_9H_4)_2$ | 24.5 | — | — | — | — | — |
| Example 5 | SC-3A | 193:1 | 500:1 | Me | $PhMeNH_2CH_2CH_2CH_2C$ | $(4\text{-}Ph\text{-}2\text{-}MeC_9H_4)_2$ | 34.8 | 133064 | 313745 | 2.36 | 99.3 | 149.43 |
| Example 6 | SC-3B | 227:1 | 200:1 | Me | $PhMeNH_2CH_2CH_2CH_2C$ | $(4\text{-}Ph\text{-}2\text{-}MeC_9H_4)_2$ | 22.6 | — | — | — | — | — |
| Example 7 | SC-3C | 340:1 | 200:1 | Me | $PhMeNH_2CH_2CH_2CH_2C$ | $(4\text{-}Ph\text{-}2\text{-}MeC_9H_4)_2$ | 18.5 | — | — | — | — | — |
| Example 8 | SC-4A | 193:1 | 549:1 | Me | $PhMeNH_2CH_2CH_2C$ | $(4\text{-}Ph\text{-}2\text{-}MeC_9H_4)_2$ | 109.8 | 162913 | 377577 | 2.317 | 99.6 | 151.4 |
| Example 9 | SC-4A | 193:1 | 896:1 | Me | $PhMeNH_2CH_2CH_2C$ | $(4\text{-}Ph\text{-}2\text{-}MeC_9H_4)_2$ | 177.2 | 104205 | 226218 | 2.17 | 98.4 | 161.4 |
| Example 10 | SC-4A | 193:1 | 1195:1 | Me | $PhMeNH_2CH_2CH_2C$ | $(4\text{-}Ph\text{-}2\text{-}MeC_9H_4)_2$ | 31.86 | — | — | — | — | — |
| Example 11 | SC-4A | 193:1 | 1707:1 | Me | $PhMeNH_2CH_2CH_2C$ | $(4\text{-}Ph\text{-}2\text{-}MeC_9H_4)_2$ | 23.89 | — | — | — | — | — |
| Example 12 | SC-4A | 193:1 | 1792:1 | Me | $PhMeNH_2CH_2CH_2C$ | $(4\text{-}Ph\text{-}2\text{-}MeC_9H_4)_2$ | 220.6 | 80551 | 188015 | 2.33 | 99.7 | 152.2 |
| Example 13 | SC-4A | 193:1 | 1707:1 | Me | $PhMeNH_2CH_2CH_2C$ | $(4\text{-}Ph\text{-}2\text{-}MeC_9H_4)_2$ | 161.3 | — | — | — | — | — |
| Example 14 | SC-4A | 193:1 | 2389:1 | Me | $PhMeNH_2CH_2CH_2C$ | $(4\text{-}Ph\text{-}2\text{-}MeC_9H_4)_2$ | 310.6 | 47736 | 146937 | 3.08 | — | — |
| Example 15 | SC-4A | 193:1 | 2389:1 | Me | $PhMeNH_2CH_2CH_2C$ | $(4\text{-}Ph\text{-}2\text{-}MeC_9H_4)_2$ | 163.3 | — | — | — | — | 154.03 |
| Example 16 | SC-4A | 193:1 | 1195:1 | Me | $PhMeNH_2CH_2CH_2C$ | $(4\text{-}Ph\text{-}2\text{-}MeC_9H_4)_2$ | 430.1 | — | — | — | — | — |

TABLE 2

| | | | | Metallocene compound | | | | Polymerization product properties | | | | |
|---|---|---|---|---|---|---|---|---|---|---|---|---|
| Item | Catalyst | Catalyst Al/Zr ratio | Reaction Al/Zr ratio | $R^I$ | $R^{II}$ | $(Cp^{III})_n(E)_{2-n}$ | Catalyst activity | Mn | Mw | PD value | Isotacticity (%) | Melting point (° C.) |
| Example 17 | SC-4A | 193:1 | 627:1 | Me | $PhMeNH_2CH_2CH_2C$ | $(4-Ph-2-MeC_9H_4)_2$ | 11.95 | — | — | — | — | — |
| Example 18 | SC-4A | 193:1 | 1254:1 | Me | $PhMeNH_2CH_2CH_2C$ | $(4-Ph-2-MeC_9H_4)_2$ | 53.76 | — | — | — | — | — |
| Example 19 | SC-4A | 193:1 | 1792:1 | Me | $PhMeNH_2CH_2CH_2C$ | $(4-Ph-2-MeC_9H_4)_2$ | 97.97 | — | — | — | — | — |
| Example 20 | SC-4A | 193:1 | 1792:1 | Me | $PhMeNH_2CH_2CH_2C$ | $(4-Ph-2-MeC_9H_4)_2$ | 109.9 | — | — | — | — | — |
| Example 21 | SC-4A | 193:1 | 1195:1 | Me | $PhMeNH_2CH_2CH_2C$ | $(4-Ph-2-MeC_9H_4)_2$ | 422.1 | — | — | — | — | — |
| Example 22 | SC-4B | 194:1 | 1195:1 | Me | $PhMeNH_2CH_2CH_2C$ | $(4-Ph-2-MeC_9H_4)_2$ | 485.9 | — | — | — | — | — |
| Example 23 | SC-4B | 194:1 | 1195:1 | Me | $PhMeNH_2CH_2CH_2C$ | $(4-Ph-2-MeC_9H_4)_2$ | 424.5 | — | — | — | — | 155.46 |
| Example 24 | SC-4B | 194:1 | 1195:1 | Me | $PhMeNH_2CH_2CH_2C$ | $(4-Ph-2-MeC_9H_4)_2$ | 322.6 | — | — | — | — | — |
| Example 25 | SC-4C | 195:1 | 1195:1 | Me | $PhMeNH_2CH_2CH_2C$ | $(4-Ph-2-MeC_9H_4)_2$ | 422.1 | — | — | — | — | — |
| Example 26 | SC-4C | 195:1 | 1792:1 | Me | $PhMeNH_2CH_2CH_2C$ | $(4-Ph-2-MeC_9H_4)_2$ | 173.2 | — | — | — | — | — |
| Example 27 | SC-5A | 50:1 | 549:1 | Me | $Me_2NH_2CH_2CH_2CH_2C$ | $(4-Ph-2-MeC_9H_4)_2$ | 11.06 | 174912 | 366583 | 2.09 | 98.4 | 153.1 |
| Example 28 | SC-5B | 100:1 | 896:1 | Me | $Me_2NH_2CH_2CH_2CH_2C$ | $(4-Ph-2-MeC_9H_4)_2$ | 27.88 | 115708 | 236654 | 2.045 | 99.1 | 154.9 |
| Example 29 | SC-5C | 200:1 | 1195:1 | Me | $Me_2NH_2CH_2CH_2CH_2C$ | $(4-Ph-2-MeC_9H_4)_2$ | 16.41 | — | — | — | — | — |
| Example 30 | SC-6 | 100:1 | 549:1 | Me | $Me_2NH_2CH_2C$ | $(4-Ph-2-MeC_9H_4)_2$ | 21.12 | 168742 | 368213 | 2.18 | 98.9 | 155.4 |
| Example 31 | SC-7 | 100:1 | 549:1 | Me | $(Me_2NH_2CH_2CH_2C$ | $(4-Ph-2-MeC_9H_4)_2$ | 22.94 | 198563 | 398423 | 2.01 | 99.2 | 157.1 |
| Example 32 | SC-8 | 100:1 | 549:1 | Me | $NH_2Pr_2NH_2CH_2CH_2C$ | $(4-Ph-2-MeC_9H_4)_2$ | 22.23 | 215821 | 439429 | 2.036 | 99.4 | 159.1 |

TABLE 3

| | | | | Metallocene compound | | | | Polymerization product properties | | | | |
|---|---|---|---|---|---|---|---|---|---|---|---|---|
| Item | Catalyst | Catalyst Al/Zr ratio | Reaction Al/Zr ratio | $R^I$ | $R^{II}$ | $(Cp^{III})_n(E)_{2-n}$ | Catalyst activity | Mn | Mw | PDI value | Isotacticity (%) | Melting point (° C.) |
| Example 33 | SC-9 | 100:1 | 549:1 | Me | $iPr_2NH_2CH_2CH_2C$ | $(4-Ph-2-MeC_9H_4)_2$ | 22.52 | 175941 | 419745 | 2.386 | 99.5 | 161.4 |
| Example 34 | SC-10 | 100:1 | 549:1 | Me | $iBuMeNH_2CH_2CH_2C$ | $(4-Ph-2-MeC_9H_4)_2$ | 24.89 | 155967 | 430741 | 2.762 | 97.2 | 147.9 |
| Example 35 | SC-11 | 100:1 | 549:1 | Me | $iBuEtNH_2CH_2CH_2C$ | $(4-Ph-2-MeC_9H_4)_2$ | 24.37 | 152134 | 416572 | 2.738 | 97.5 | 148.1 |
| Example 36 | SC-12 | 100:1 | 549:1 | Me | $iPrEtNH_2CH_2CH_2C$ | $(4-Ph-2-MeC_9H_4)_2$ | 23.36 | 142879 | 396654 | 2.776 | 96.6 | 144.7 |
| Example 37 | SC-13 | 100:1 | 549:1 | $Me_2NH_2CH_2C$ | $iBuMeNH_2CH_2CH_2C$ | $(4-Ph-2-MeC_9H_4)_2$ | 21.59 | 162678 | 396789 | 2.439 | 97.6 | 152.9 |
| Example 38 | SC-14 | 100:1 | — | Me | $FcCH_2CH_2$ | $(4-Ph-2-MeC_9H_4)_2$ | 25.73 | 182668 | 406769 | 2.226 | 95.6 | 147.9 |
| Example 39 | SC-15 | — | — | Me | $FcCH_2CH_2$ | $(4-Ph-2-MeC_9H_4)_2$ | — | — | — | 2.028 | 96.3 | 148.5 |
| Example 40 | Preparation Example 16 | — | — | Me | $FcCH_2CH_2$ | $(4-Ph-2-MeC_9H_4)_2$ | — | — | — | 2.678 | 92.6 | 145.1 |
| Example 41 | SC-16 | 100:1 | — | Me | $FcCH_2CH_2CH_2$ | $(4-Ph-2-MeC_9H_4)_2$ | 24.34 | 172761 | 435432 | 2.520 | 96.7 | 148.8 |
| Example 42 | SC-17 | 100:1 | — | Me | $FcCH_2$ | $(4-Ph-2-MeC_9H_4)_2$ | 22.48 | 123758 | 467327 | 3.776 | 92.4 | 140.2 |

TABLE 3-continued

| Item | Catalyst | Catalyst Al/Zr ratio | Reaction Al/Zr ratio | Metallocene compound $R^I$ | $R^{II}$ | $(Cp^{III})_n(E)_{2-n}$ | Catalyst activity | Polymerization product properties Mn | Mw | PDI value | Isotacticity (%) | Melting point (° C.) |
|---|---|---|---|---|---|---|---|---|---|---|---|---|
| Example 43 | SC-18 | 100:1 | — | Me | $FcCH_2CH_2$ | $(4\text{-}(4\text{-}tBuC_6H_4)\text{-}2\text{-}MeC_9H_4)_2$ | 27.52 | 186469 | 404219 | 2.168 | 97.2 | 148.7 |

Note:

In Tables 1-3, the unit of catalyst activity in Examples 1-43 is $10^6$ g(PP) · mol − 1(Zr) · $h^{-1}$.

"—"means there is no such data.

According to the data in Tables 1-3:

1)When the substituents on the bridging atoms in the metallocene compound include amine-substituted $C_2$-$C_4$ groups or metallocene-substituted $C_1$-$C_3$ groups, the prepared catalyst has higher catalytic activity for the polymerization of propylene and obtained polymerization products with suitable molecular weights, PDI values, isotacticity and melting points.
2)By adjusting the types of substituents on the bridging atoms in the metallocene compound, polymerization products with different molecular weights and different melting points can be obtained.
3)The polymerization activity of the catalyst can be further optimized by adjusting the test conditions such as Al/Zr ratio of the catalyst and/or the Al/Zr ratio of the polymerization system, as illustrated by Examples 1-4, and Examples 8-11.

TABLE 4

| Item | Catalyst | Catalyst Al/Zr ratio | Reaction Al/Zr ratio | Metallocene Compound $R^I$ | $R^{II}$ | $(Cp^{III})_n(E)_{2-n}$ | Catalyst activity |
|---|---|---|---|---|---|---|---|
| Example 44 | rac-MS-1b-C | 200:1 | 200:1 | Me | $PhMeNCH_2CH_2$ | $(2\text{-}Me\text{-}7\text{-}p\text{-}tBuC_6H_4C_9H_4)_2$ | 6.8 |
| Example 45 | rac-MS-1b-C | 200:1 | 200:1 | Me | $PhMeNCH_2CH_2$ | $(2\text{-}Me\text{-}7\text{-}p\text{-}tBuC_6H_4C_9H_4)_2$ | 10.8 |
| Example 46 | rac-MS-1b-C | 200:1 | 200:1 | Me | $PhMeNCH_2CH_2$ | $(2\text{-}Me\text{-}7\text{-}p\text{-}tBuC_6H_4C_9H_4)_2$ | 6.99 |
| Example 47 | rac-MS-1j-C | 50:1 | 200:1 | Me | $FcCH_2CH_2$ | $(2\text{-}Me\text{-}7\text{-}p\text{-}tBuC_6H_4C_9H_4)_2$ | 0.88 |
| Example 48 | rac-MS-3a-C | 100:1 | 200:1 | Me | $PhMeNCH_2CH_2$ | $(2\text{-}Me\text{-}7\text{-}PhC_9H_4)_2$ | 4.45 |
| Example 49 | rac-MS-3b-C | 200:1 | 200:1 | Me | $FcCH_2CH_2$ | $(2\text{-}Me\text{-}7\text{-}PhC_9H_4)_2$ | 27.4 |
| Example 50 | rac-MS-4a-C | 200:1 | 200:1 | Me | $PhMeNCH_2CH_2$ | $Flu_2$ | 12.2 |
| Example 51 | rac-MS-4b-C | 200:1 | 200:1 | Me | $FcCH_2CH_2$ | $Flu_2$ | 14.1 |

Note:

The unit of catalyst activity in Examples 44-51 is $10^6$ g(PE) · $mol^{-1}$(Zr) · $h^{-1}$.

According to the data in Table 4:

1)When the substituent on the bridging atom in the metallocene compound contains an amine-substituted $C_2$ group or a metallocene-substituted $C_2$ group, the prepared catalyst has higher catalytic activity for the polymerization of ethylene.
2)The polymerization activity of the catalyst can be further optimized by adjusting the test conditions such as Al/Zr ratio of the catalyst and/or the Al/Zr ratio of the polymerization system, as illustrated by Examples 44-45.

45

TABLE 5

| Item | Catalyst | Catalyst ratio Al/Zr | Reaction ratio Al/Zr | Metallocene compound $R^I$ | $R^{II}$ | $(Cp^{III})_n(E)_{2-n}$ | Catalyst activity | Polymerization product property Mn | Mw | PDI value | Isotacticity (%) | Melting point (° C.) |
|---|---|---|---|---|---|---|---|---|---|---|---|---|
| Example 52 | rac-MS-1b-C | 200:1 | 500:1 | Me | $PhMeNCH_2CH_2$ | $(2\text{-}Me\text{-}7\text{-}p\text{-}tBuC_6H_4C_9H_4)_2$ | 9.2 | 133945 | 342375 | 2.57 | 99.3 | 157.63 |
| Example 53 | rac-MS-1j-C | 200:1 | 200:1 | Me | $FcCH_2CH_2$ | $(2\text{-}Me\text{-}7\text{-}p\text{-}tBuC_6H_4C_9H_4)_2$ | 4.33 | 127361 | 36.431 | 2.83 | 98.6 | 152.3 |
| Example 54 | rac-MS-1b-C | 200:1 | 549:1 | Me | $PhMeNCH_2CH_2$ | $(2\text{-}Me\text{-}7\text{-}p\text{-}tBuC_6H_4C_9H_4)_2$ | 33.7 | 173453 | 394257 | 2.273 | 99.1 | 154.4 |
| Example 55 | rac-MS-1b-C | 200:1 | 549:1 | Me | $PhMeNCH_2CH_2$ | $(2\text{-}Me\text{-}7\text{-}p\text{-}tBuC_6H_4C_9H_4)_2$ | 154 | 135427 | 397892 | 2.938 | 98.4 | 153.2 |
| Example | rac-MS-1j- | 200:1 | 1707:1 | Me | $FcCH_2CH_2$ | $(2\text{-}Me\text{-}7\text{-}p\text{-}$ | 43.7 | 82451 | 213509 | 2.59 | 96.7 | 150.2 |

TABLE 5-continued

| Item | Catalyst | Catalyst ratio Al/Zr | Reaction ratio Al/Zr | Metallocene compound $R^I$ | $R^{II}$ | $(Cp^{III})_n(E)_{2-n}$ | Catalyst activity | Polymerization product property Mn | Mw | PDI value | Isotacticity (%) | Melting point (° C.) |
|---|---|---|---|---|---|---|---|---|---|---|---|---|
| 56 | C | | | | | $tBuC_6H_4C_9H_4)_2$ | | | | | | |

Note:
In Table 5, the unit of catayst activity in Examples 52-58 is $10^6$ g(PP) · $mol^{-1}$(Zr) · $h^{-1}$.
According to the data in Table 5:
1)When the substituent on the bridging atom in the metallocene compound contains an amine-substituted $C_2$ group or a metallocene-substituted $C_2$ group, the prepared catalyst has higher catalytic activity for the polymerization of propylene..
2)The polymerization activity of the catalyst can be further optimized by adjusting the test conditions such as Al/Zr ratio of the catalyst and/or the Al/Zr ratio of the polymerization system, as illustrated by Examples 52, 54, and 56.

$C_1$-$C_6$ halohydrocarbyl, amino-substituted $C_1$-$C_6$

TABLE 6

| Item | Catalyst | Catalyst Al/Zr ratio | Reaction Al/Zr ratio | Metallocene Compound $R^I$ | $R^{II}$ | $(Cp^{III})_n(E)_{2-n}$ | Catalyst activity |
|---|---|---|---|---|---|---|---|
| Example 57 | rac-MS-3c-C | 200:1 | 1200:1 | Me | $PhMeN(CH_2)_5$ | $(2-Me-7-PhC_9H_4)_2$ | 152 |
| Example 58 | rac-MS-3d-C | 200:1 | 1200:1 | Me | $PhMeN(CH_2)_8$ | $(2-Me-7-PhC_9H_4)_2$ | 147 |
| Example 59 | rac-MS-3e-C | 200:1 | 1200:1 | Me | $PhMeN(CH_2)_{12}$ | $(2-Me-7-PhC_9H_4)_2$ | 159 |
| Example 60 | rac-MS-3f-C | 200:1 | 1200:1 | Me | $PhMeN(CH_2)_{15}$ | $(2-Me-7-PhC_9H_4)_2$ | 136 |
| Example 61 | rac-MS-3g-C | 200:1 | 1200:1 | Me | $p-ClC_6H_4MeN(CH_2)_5$ | $(2-Me-7-PhC_9H_4)_2$ | 125 |
| Example 62 | rac-MS-3h-C | 200:1 | 1200:1 | Me | $p-MeOC_6H_4MeN(CH_2)_5$ | $(2-Me-7-PhC_9H_4)_2$ | 135 |
| Example 63 | rac-MS-3i-C | 200:1 | 1200:1 | Me | $Fc(CH_2)_5$ | $(2-Me-7-PhC_9H_4)_2$ | 143 |
| Example 64 | rac-MS-3j-C | 200:1 | 1200:1 | Me | $Fc(CH_2)_8$ | $(2-Me-7-PhC_9H_4)_2$ | 138 |
| Example 65 | rac-MS-3k-C | 200:1 | 1200:1 | Me | $Fc(CH_2)_{12}$ | $(2-Me-7-PhC_9H_4)_2$ | 141 |
| Example 66 | rac-MS-3l-C | 200:1 | 1200:1 | Me | $Fc(CH_2)_{18}$ | $(2-Me-7-PhC_9H_4)_2$ | 127 |
| Example 67 | rac-MS-3p-C | 200:1 | 1200:1 | Me | $Fc(CH_2)_5$ | $(4-Ph-2-MeC_9H_4)(NtBu)$ | 114 |
| Comparative Example 1 | rac-MS-3m-C | 200:1 | 1200:1 | Me | nBu | $(2-Me-7-PhC_9H_4)_2$ | 138 |
| Comparative Example2 | rac-MS-3n-C | 200:1 | 1200:1 | Me | $n-CH_3(CH_2)_7$ | $(2-Me-7-PhC_9H_4)_2$ | 136 |
| Example 67 | rac-MS-3o-C | 200:1 | 1200:1 | Me | H | $(4-Ph-2-MeC_9H_4)(NtBu)$ | 86.8 |

Note:
In Table 6, the unit of catalyst activity in Examples 57-67 is $10^6$ g(PP) · $mol^{-1}$(Zr) · $h^{-1}$.
"--" means there is no such data.

According to the data in Table 6:

When the substituent on the bridging atom in the metallocene compound is a $C_5$-$C_{15}$ group substituted with an amine group or a $C_5$-$C_{15}$ group substituted with a metallocene group, the prepared catalyst has higher catalytic activity for the polymerization of propylene.

According to the data in Tables 1-6:

Compared with the substituent on the bridging atom in the metallocene compound that do not contain an amine-substituted group or a metallocene-substituted group, when the substituent on the bridging atom in the metallocene compound is the amine-substituted group or the metallocene-substituted group, the prepared catalyst has higher catalytic activity for the polymerization of propylene.

The invention claimed is:

1. A metallocene compound, having a structure of formula (I):

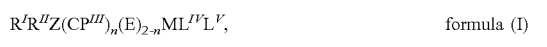

$R^IR^{II}Z(CP^{III})_n(E)_{2-n}ML^{IV}L^V$, formula (I)

wherein in formula (I), $R^I$ and $R^{II}$ are the same or different, each independently selected from amino-substituted $C_1$-$C_6$ hydrocarbyl, amino-substituted $C_1$-$C_6$ halohydrocarbyl, amino-substituted $C_1$-$C_6$ alkoxy, and amino-substituted $C_6$-$C_8$ phenolic group;

or one of $R^I$ and $R^{II}$ is selected from selected from amino-substituted $C_1$-$C_6$ hydrocarbyl, amino-substituted alkoxy, and amino-substituted $C_6$-$C_8$ phenolic group, and the other is a $C_1$-$C_6$ hydrocarbyl;

Z is selected from carbon, silicon, germanium, and tin;

$Cp^{III}$ is cyclopentadienyl containing a substituent, indenyl containing a substituent, or fluorenyl containing a substituent, as shown in formula (II), wherein $R^i$, $R^{ii}$, and $R^{iii}$ are substituents in the corresponding rings;

Formula (II)

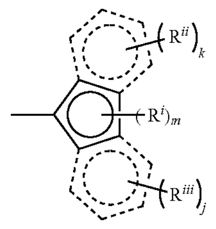

(k = 0-4)
(m = 0-4)
(j = 0-4)

$R^i$, $R^{ii}$ and $R^{iii}$ are the same or different, and each independently selected from hydrogen, and linear or branched, saturated or unsaturated $C_1$-$C_{20}$ hydrocarbyl with or without a heteroatom; and $R^i$, $R^{ii}$ and $R^{iii}$ are not hydrogen at the same time;

E is $NR^{iv}$ or $PR^{iv}$;

$R^{iv}$ is selected from hydrogen and linear or branched, saturated or unsaturated $C_1$-$C_{20}$ hydrocarbyl with or without a heteroatom;

M is selected from Ti, Zr, and Hf;

$L^{IV}$ and $L^{V}$ are the same or different, and each independently selected from hydrogen, chlorine, dimethylamino, and linear or branched, saturated or unsaturated $C_1$-$C_{20}$ hydrocarbyl with or without a heteroatom; and n is 1 or 2.

2. The metallocene compound according to claim 1, wherein the amino is of formula (III):

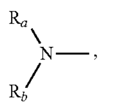

formula (III)

wherein in formula (III), $R_a$ and $R_b$ are the same or different, and each independently selected from $C_1$-$C_6$ alkyl, $C_6$-$C_{12}$ aryl, and $C_7$-$C_{10}$ arylalkyl.

3. The metallocene compound according to claim 1, wherein in formula (II), $R^i$, $R^{ii}$ and $R^{iii}$ are the same or different, and each independently selected from hydrogen, $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl; and $R^i$, $R^{ii}$ and $R^{iii}$ are not hydrogen at the same time; and/or $R^{iv}$ is selected from hydrogen and linear or branched, saturated or unsaturated $C_1$-$C_{10}$ hydrocarbyl with or without a heteroatom; and/or in formula (I), $L^{IV}$ and $L^{V}$ are the same and selected from hydrogen, chlorine, methyl, phenyl, benzyl, and dimethylamino.

4. A preparation method of a metallocene compound of formula (I):

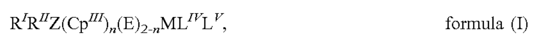

$R^IR^{II}Z(Cp^{III})_n(E)_{2-n}ML^{IV}L^V$, formula (I)

wherein in formula (I), $R^I$ and $R^{II}$ are the same or different, and both of $R^I$ and $R^{II}$ are selected from amino-substituted $C_1$-$C_6$ hydrocarbyl, amino-substituted $C_1$-$C_6$ halohydrocarbyl, amino-substituted $C_1$-$C_6$ alkoxy, amino-substituted $C_6$-$C_8$ phenolic group, metallocene group-substituted $C_1$-$C_6$ hydrocarbyl, metallocene group-substituted $C_1$-$C_6$ halohydrocarbyl, metallocene group-substituted $C_1$-$C_6$ alkoxy, and metallocene group-substituted $C_6$-$C_8$ phenolic group;

or, one of $R^I$ and $R^{II}$ is selected from amino-substituted $C_1$-$C_6$ hydrocarbyl, amino-substituted $C_1$-$C_6$ halohydrocarbyl, amino-substituted $C_1$-$C_6$ alkoxy, and amino-substituted $C_6$-$C_8$ phenolic group, metallocene group-substituted $C_1$-$C_6$ hydrocarbyl, metallocene group-substituted $C_1$-$C_6$ halohydrocarbyl, metallocene group-substituted $C_1$-$C_6$ alkoxy, and metallocene group-substituted $C_6$-$C_8$ phenolic group, and the other is a $C_1$-$C_6$ hydrocarbyl;

Z is selected from carbon, silicon, germanium, and tin;

$Cp^{III}$ is cyclopentadienyl containing a substituent, indenyl containing a substituent, or fluorenyl containing a substituent, as shown in formula (II), wherein $R^i$, $R^{ii}$, and $R^{iii}$ are substituents in the corresponding rings;

Formula (II)

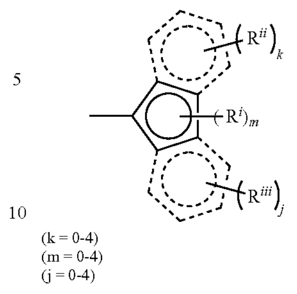

(k = 0-4)
(m = 0-4)
(j = 0-4)

$R^i$, $R^{ii}$ and $R^{iii}$ are the same or different, and each independently selected from hydrogen, and linear or branched, saturated or unsaturated $C_1$-$C_{20}$ hydrocarbyl with or without a heteroatom; and $R^i$, $R^{ii}$ and $R^{iii}$ are not hydrogen at the same time;

E is $NR^{iv}$ or $PR^{iv}$;

$R^{iv}$ is selected from hydrogen and linear or branched, saturated or unsaturated $C_1$-$C_{20}$ hydrocarbyl with or without a heteroatom;

M is selected from Ti, Zr, and Hf;

$L^{IV}$ and $L^{V}$ are the same or different, and each independently selected from hydrogen, chlorine, dimethylamino, and linear or branched, saturated or unsaturated $C_1$-$C_{20}$ hydrocarbyl with or without a heteroatom; and n is 1 or 2;

when n is 2, the preparation method comprises:

S1. reacting a $H_2(Cp^{III})$ with an alkali metal-organic compound to form a corresponding $[H(Cp^{III})]^-$ alkali metal salt;

S2. reacting the $[H(Cp^{III})]^-$ alkali metal salt with a $R^IR^{II}ZX_2$ to form a $R^IR^{II}Z[H(Cp^{III})]_2$;

S3. reacting the $R^IR^{II}Z[H(Cp^{III})]2$ with an alkali metal-organic compound to form a corresponding $R^IR^{II}Z(Cp^{III})_2^{2-}$ alkali metal salt;

S4. reacting the $R^IR^{II}Z(Cp^{III})_2^{2-}$ alkali metal salt with an $X_2ML^{IV}L^V$ for salt elimination reaction, to obtain a $R^IR^{II}Z(Cp^{III})_2ML^{IV}L^V$; and when n is 1, the preparation method comprises:

S1. reacting a $H_2(Cp^{III})$ and a $H_2(E)$ with an alkali metal-organic compound respectively, to form a corresponding $[H(Cp^{III})]^-$ alkali metal salt and a corresponding $[H(E)]^-$ alkali metal salt;

S2. reacting the $[H(Cp^{III})]^-$ alkali metal salt and the $[H(E)]^-$ alkali metal salt with a $R^IR^{II}ZX_2$ to form a $R^IR^{II}Z[H(Cp^{III})][H(E)]$;

S3. reacting the $R^IR^{II}Z[H(Cp^{III})][H(E)]$ with an alkali metal-organic compound to form a corresponding $R^IR^{II}Z(Cp^{III})(E)^{2-}$ alkali metal salt;

S4. reacting the $R^IR^{II}Z(Cp^{III})(E)^{2-}$ alkali metal salt with an $X_2ML^{IV}L^V$ for salt elimination reaction, to obtain a $R^IR^{II}ZCp^{III}EML^{IV}L^V$;

wherein X is selected from Cl, Br and I; and wherein, in S4, the $R^IR^{II}Z(Cp^{III})_2^{2-}$ alkali metal salt or $R^IR^{II}Z(Cp^{III})(E)^{2-}$ alkali metal salt, without separation, directly reacts with the $X_2ML^{IV}L^V$ for salt elimination reaction.

5. A preparation method of a metallocene compound of formula (I)

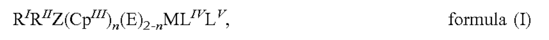

$R^IR^{II}Z(Cp^{III})_n(E)_{2-n}ML^{IV}L^V$, formula (I)

wherein in formula (I), $R^I$ and $R^{II}$ are the same or different, and both $R^I$ and $R^{II}$ are selected from amino-substituted $C_1$-$C_6$ hydrocarbyl, amino-substituted $C_1$-$C_6$ halohydrocarbyl, amino-substituted $C_1$-$C_6$ alkoxy, amino-substituted $C_6$-$C_8$ phenolic group, metallocene group-substituted $C_1$-$C_6$ hydrocarbyl, metallocene group-substituted $C_1$-$C_6$ halohydrocarbyl, metallocene group-substituted $C_1$-$C_6$ alkoxy, and metallocene group-substituted $C_6$-$C_8$ phenolic group; or one of $R^I$ and $R^{II}$ is selected from selected from amino-substituted $C_1$-$C_6$ hydrocarbyl, amino-substituted $C_1$-$C_6$ halohydrocarbyl, amino-substituted $C_1$-$C_6$ alkoxy, amino-substituted $C_6$-$C_8$ phenolic group, metallocene group-substituted $C_1$-$C_6$ hydrocarbyl, metallocene group-substituted $C_1$-$C_6$ halohydrocarbyl, metallocene group-substituted $C_1$-$C_6$ alkoxy, and metallocene group-substituted $C_6$-$C_8$ phenolic group, the other group is a $C_1$-$C_6$ hydrocarbyl;

Z is selected from carbon, silicon, germanium, and tin;

$Cp^{III}$ is cyclopentadienyl containing a substituent, indenyl containing a substituent, or fluorenyl containing a substituent, as shown in formula (II), wherein $R^i$, $R^{ii}$, and $R^{iii}$ are substituents in the corresponding rings;

Formula (II)

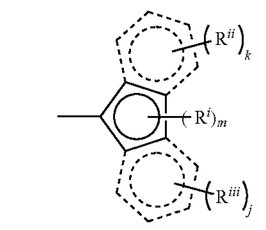

(k = 0-4)
(m = 0-4)
(j = 0-4)

$R^i$, $R^{ii}$ and $R^{iii}$ are the same or different, and each independently selected from hydrogen, and linear or branched, saturated or unsaturated $C_1$-$C_{20}$ hydrocarbyl with or without a heteroatom; and $R^i$, $R^{ii}$ and $R^{iii}$ are not hydrogen at the same time;

E is $NR^{iv}$ or $PR^{iv}$;

$R^{iv}$ is selected from hydrogen and linear or branched, saturated or unsaturated $C_1$-$C_{20}$ hydrocarbyl with or without a heteroatom;

M is selected from Ti, Zr, and Hf;

$L^{IV}$ and $L^V$ are the same or different, and each independently selected from hydrogen, chlorine, dimethylamino, and linear or branched, saturated or unsaturated $C_1$-$C_{20}$ hydrocarbyl with or without a heteroatom; and n is 1 or 2;

the preparation method comprises:

preparing the metallocene compound by carrying out a Z hydrogenation reaction between a precursor $R^IHZ(Cp^{III})_n(E)_{2-n}ML^{IV}L^V$ and a precursor of the $R^{II}$;

wherein the precursor of the $R^{II}$ is a molecule containing a multiple bond, wherein the molecule containing a multiple bond is selected from organic multiple bond molecules, CO and $CO_2$, wherein the multiple bond is one or more bonds of C═C, C≡C, C═N, C≡N, C═O, C≡P, N═N, C═S, C═C═C, C═C═N, C═C═O, and N═C═N.

6. The preparation method according to claim 5, wherein the Z hydrogenation reaction is carried out in the presence of a catalyst, and the catalyst is one or more selected from transition metal catalysts and Lewis acid catalysts;

and/or, an amount of the catalyst used in the Z hydrogenation reaction is 0.00001-50% of the total mass of the reactants;

and/or, a temperature of the Z hydrogenation reaction is −30 to 140° C.;

and/or, a reaction time of the Z hydrogenation reaction is greater than 0.1h;

and/or, the obtained precursor is separated or purified by recrystallization, and a solvent for the recrystallization is a non-protic solvent that is one or more selected from linear or branched alkane compounds, cycloalkane compounds, aromatic hydrocarbons, halogenated hydrocarbon compounds, ether compounds, and cyclic ether compounds.

7. The preparation method according to claim 5, wherein the precursor $R^IHZ(Cp^{III})_n(E)_{2-n}ML^{IV}L^V$ is prepared by one-pot method of chemical reaction; wherein, when n is 2, the preparation method of the precursor $R^IHZ(Cp^{III})_n(E)_{2-n}ML^{IV}L^V$ comprises:

step 1), reacting a $H_2(Cp^{III})$ with an alkali metal-organic compound to form a corresponding $[H(Cp^{III})]^-$ alkali metal salt;

step 2), reacting the $[H(Cp^{III})]^-$ alkali metal salt with a $R^IHZX_2$ to form a $R^IHZ[H(Cp^{III})]_2$;

step 3), directly reacting the $R^IHZ[H(Cp^{III})]_2$ without separation, with a $L^{viii}L^{viv}ML^{IV}L^V$ for eliminating a stable small molecule $L^{viii}$ or $L^{viv}$, to obtain the precursor $R^IHZ(Cp^{III})_2ML^{IV}L^V$;

and/or, directly reacting the $R^IHZ[H(Cp^{III})]_2$ without separation, with an alkali metal-organic compound to form an alkali metal salt; the obtained alkali metal salt is then reacted with an $X_2ML^{IV}L^V$ for salt elimination reaction, to obtain the precursor $R^IHZ(Cp^{III})_2ML^{IV}L^V$; and when n is 1, the preparation method of the precursor $R^IHZ(Cp^{III})_n(E)_{2-n}ML^{IV}L^V$ comprises:

step 1), reacting a $H_2(Cp^{III})$ and a $H_2(E)$ respectively with an alkali metal-organic compound to form a corresponding $[H(Cp^{III})]^-$ alkali metal salt and a corresponding $[H(E)]^-$ alkali metal salt;

step 2), reacting the $[H(Cp^{III})]^-$ alkali metal salt and the $[H(E)]^-$ alkali metal salt with $R^IHZX_2$ to form a $R^IHZ[H(Cp^{III})][H(E)]$;

step 3), directly reacting the $R^IHZ[H(Cp^{III})][H(E)]$ without separation, with a $L^{viii}L^{viv}ML^{IV}L^V$ by eliminating a stable small molecule $L^{viii}$ or $L^{viv}$, to obtain the precursor $R^IHZCp^{III}EML^{IV}L^V$;

and/or, directly reacting the $R^IHZ[H(Cp^{III})][H(E)]$ without separation, with an alkali metal-organic compound to form an alkali metal salt; then reacting the obtained alkali metal salt with a $X_2ML^{IV}L^V$ for salt elimination reaction, to obtain the precursor $R^IHZCp^{III}EML^{IV}L^V$;

wherein X is selected from Cl, Br and I.

8. The preparation method according to claim 4, wherein in each step, a reaction temperature of the reaction is in a range from −100° C. to 140° C.; and/or, and a reaction time is more than 0.016h.

9. The preparation method according to claim 4, wherein in each step, the reaction is carried out in an non-protic acid solvent that is one or more selected from linear or branched alkane compounds, cycloalkane compounds, aromatic compounds, halogenated hydrocarbon compounds, ether compounds and cyclic ether compounds;

and/or the alkali metal-organic compound is selected from hydrogenated metal, alkyl metal, alkenyl metal, aromatic metal, and amine metal;

and/or, the alkali metal is selected from Li, Na and K.

10. A catalyst for α-olefin polymerization reaction, comprising: the metallocene compound of claim 1, a cocatalyst, and a carrier.

11. The catalyst according to claim 10, wherein the cocatalyst is one or more selected from a Lewis acid, and an ionic compound containing a non-coordination anion and a Lewis acid or containing a non-coordination anion and a Bronsted acid cation.

12. The catalyst according to claim 10, wherein in the catalyst, a content of the metallocene compound, calculated based on the M element, is 0.001 mass % to 10 mass %; and/or a molar ratio of Al element in the cocatalyst and M element in the metallocene compound is (1 to 500):1.

13. A preparation method of the catalyst according to claim 10, comprises: combining the metallocene compound, the cocatalyst, and the carrier under the action of a solvent to form the catalyst, wherein a combining condition comprises: a combining temperature being −40° C. to 200° C.; and a combining time being greater than 0.016h.

14. The preparation method according to claim 13, wherein the solvent is one or more selected from linear hydrocarbons, branched hydrocarbons, cyclic saturated hydrocarbons and aromatic hydrocarbons.

15. A method for α-olefin polymerization carried out in the presence of the metallocene compound according to claim 1.

16. The method according to claim 15, wherein the polymerization reaction is carried out without a solvent.

17. The method according to claim 15, wherein conditions of the polymerization reaction comprises: reaction temperature being −50° C. to 200° C.; and the reaction time being 0.01 h to 60h, and/or, wherein relative to per gram of α-olefin, the usage of the metallocene catalyst or metallocene catalyst system is 0.001 mg to 1000 mg, and/or, wherein the α-olefin comprises $C_2$-$C_{20}$ α-olefin.

18. The preparation method according to claim 7, wherein in each step, a reaction temperature of the reaction is in a range from −100° C. to 140° C.; and/or, and a reaction time is more than 0.016 h.

19. The preparation method according to claim 7, wherein in each step, c the reaction is carried out in an non-protic acid solvent selected from linear or branched alkane compounds, cycloalkane compounds, aromatic compounds, halogenated hydrocarbon compounds, ether compounds, cyclic ether compounds, and mixtures thereof;

and/or the alkali metal-organic compound is selected from hydrogenated metal, alkyl metal, alkenyl metal, aromatic metal, and amine metal;

and/or, the alkali metal is selected from Li, Na and K.

20. The metallocene compound according to claim 2, wherein in formula (III), $R_a$ and $R_b$ are the same or different, and each independently selected from $C_1$-$C_4$ alkyl, phenyl, and $C_7$-$C_9$ arylalkyl.

21. The preparation method according to claim 4, wherein the amino is of formula (III):

formula (III)

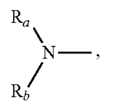

wherein in formula (III), $R_a$ and $R_b$ are the same or different, and each independently selected from $C_1$-$C_6$ alkyl, $C_6$-$C_{12}$ aryl, and $C_7$-$C_{10}$ arylalkyl; and/or the metal in the metallocene group is Fe, and the metallocene group is ferrocenyl.

22. The preparation method according to claim 4, wherein in formula (II), $R^i$, $R^{ii}$ and $R^{iii}$ are the same or different, and each independently selected from hydrogen, $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl; and $R^i$, $R^{ii}$ and $R^{iii}$ are not hydrogen at the same time; and/or $R^{iv}$ is selected from hydrogen and linear or branched, saturated or unsaturated $C_1$-$C_{10}$ hydrocarbyl with or without a heteroatom; and/or in formula (I), $L^{IV}$ and $L^V$ are the same and selected from hydrogen, chlorine, methyl, phenyl, benzyl, and dimethylamino.

23. The preparation method according to claim 5, wherein the amino is of formula (III):

Formula (II)

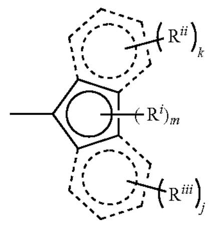

(k = 0-4)
(m = 0-4)
(j = 0-4)

wherein in formula (III), $R_a$ and $R_b$ are the same or different, and each independently selected from $C_1$-$C_6$ alkyl, $C_6$-$C_{12}$ aryl, and $C_7$-$C_{10}$ arylalkyl; and/or the metal in the metallocene group is Fe, and the metallocene group is ferrocenyl.

24. The preparation method according to claim 5, wherein in formula (II), $R^i$, $R^{ii}$ and $R^{iii}$ are the same or different, and each independently selected from hydrogen, $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl; and $R^i$, $R^{ii}$ and $R^{iii}$ are not hydrogen at the same time; and/or $R^{iv}$ is selected from hydrogen and linear or branched, saturated or unsaturated $C_1$-$C_{10}$ hydrocarbyl with or without a heteroatom; and/or in formula (I), $L^{IV}$ and $L^V$ are the same and selected from hydrogen, chlorine, methyl, phenyl, benzyl, and dimethylamino.

25. The preparation method according to claim 6, wherein the catalyst is one or more selected from platinum catalysts of the transition metal catalysts and $B(C_6F_5)_3$ catalysts of the Lewis acid;

and/or, the amount of the catalyst used in the Z hydrogenation reaction is 0.01-20% of the total mass of the reactants;

and/or, the temperature of the Z hydrogenation reaction is 0 to 90° C.;

and/or, the reaction time of the Z hydrogenation reaction is 2 to 50 h;

and/or, the solvent for the recrystallization is one or more selected from toluene, xylene, hexane, heptane, cyclohexane, and methylcyclohexane.

26. The preparation method according to claim 9, wherein the non-protic acid solvent is one or more selected from toluene, xylene, chlorobenzene, heptane, cyclohexane, methylcyclohexane, dichloromethane, chloroform, tetrahydrofuran, ether, and dioxane;

and/or the alkali metal-organic compound is a $C_1$-$C_6$ alkyl metal;

and/or, the alkali metal is Li.

27. The catalyst according to claim 11, wherein the Lewis acid comprises one or more of alkyl aluminum, alkyl aluminoxane, and organic borides; and/or the ionic compound containing a non-coordination anion and a Lewis acid or containing a non-coordination anion and a Bronsted acid cation is selected from compounds containing 1-4 perfluoroaryl substituted borate anions.

28. The catalyst according to claim 27, wherein the alkyl aluminum comprises trimethyl aluminum, triethyl aluminum, triisopropyl aluminum, tri-n-propyl aluminum, tri-n-butyl aluminum, tri-n-butyl aluminum, tri-isoamyl aluminum, tri-n-amyl aluminum, tri-isohexyl aluminum, tri-n-hexyl aluminum, tri-isoheptyl aluminum, tri-n-heptyl aluminum, tri-isooctyl aluminum, tri-n-octyl aluminum, tri-isononyl aluminum, tri-n-nonyl aluminum, tri-isodecyl aluminum and tri-n-decyl aluminum; and/or the alkyl aluminoxane comprises methyl aluminoxane, ethyl aluminoxane and butyl modified aluminoxane; and/or the organic borides comprise trifluoroborane, triphenylborane, tris (4-fluorophenyl) borane, tris (pentafluorophenyl) borane, tris (3,5-difluorophenyl) borane and tris (2,4,6-trifluorophenyl) borane; and/or the perfluoroaryl group is selected from perfluorophenyl, perfluoronaphthyl, perfluoro biphenyl, and perfluoroalkyl phenyl, and the cation is selected from N, N-dimethylphenylammonium ion, triphenylcarbonium ion, trialkyl ammonium ion, and triarylammonium ion.

29. The preparation method according to claim 14, wherein the solvent is one or more selected from toluene, xylene, n-butane, n-pentane, isopentane, neopentane, cyclopentane, methylcyclopentane, n-hexane, n-heptane, cyclohexane, methylcyclohexane, petroleum ether, isoheptane, and neoheptane.

30. The method according to claim 17, wherein the conditions of the polymerization reaction comprises: reaction temperature being 30° C. to 100° C.; and the reaction time being 0.1 h to 10 h, and/or, wherein relative to per gram of $\alpha$-olefin, the usage of the metallocene catalyst or metallocene catalyst system is 0.1 mg to 20 mg, and/or, wherein the $\alpha$-olefin comprises ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-heptadiene, 1-octadecene and 1-eicosene.

31. The preparation method according to claim 19, wherein the non-protic acid solvent is one or more selected from toluene, xylene, chlorobenzene, heptane, cyclohexane, methylcyclohexane, dichloromethane, chloroform, tetrahydrofuran, ether, and dioxane; and/or the alkali metal-organic compound is a $C_1$-$C_6$ alkyl metal; and/or, the alkali metal is Li.

* * * * *